# (12) United States Patent
Matsutani et al.

(10) Patent No.: US 7,003,325 B2
(45) Date of Patent: Feb. 21, 2006

(54) MOBILE COMMUNICATION SYSTEM AND METHOD OF ESTIMATING LOCATION OF MOBILE STATION

(75) Inventors: Hideyuki Matsutani, Yokosuka (JP); Hideo Matsuki, Yokosuka (JP); Tetsuro Imai, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 575 days.

(21) Appl. No.: 10/317,058

(22) Filed: Dec. 12, 2002

(65) Prior Publication Data

US 2003/0125058 A1 Jul. 3, 2003

(30) Foreign Application Priority Data

Dec. 12, 2001 (JP) .......................... P2001-379101

(51) Int. Cl.
*H04Q 7/20* (2006.01)

(52) U.S. Cl. ............................ 455/562.1; 455/456.1; 342/465

(58) Field of Classification Search ............ 455/562.1, 455/561, 524, 9, 10, 456.1–456.6; 342/465, 342/453
See application file for complete search history.

(56) References Cited

U.S. PATENT DOCUMENTS 6,643,526 B1 * 11/2003 Katz ..................... 455/562.1

OTHER PUBLICATIONS

Hightower, Borriello, Location Systems for Ubiquitous Computing, Computer, vol. 34, Issue 8, Aug. 2001, pp. 57-66 (IEEE).*
Hightower, Borriello, Spoton: An Indoor 3D Location Sensing Technology Based on RF Signal Strenght, UW CSE Technical Report #2000-02-02, Feb. 18, 2000.*

* cited by examiner

*Primary Examiner*—Edan Orgad
*Assistant Examiner*—Philip J. Sobutka
(74) *Attorney, Agent, or Firm*—Oblon, Spivak, McClelland, Maier & Neustadt, P.C.

(57) ABSTRACT

Signals received from mobile station by respective slave units each are attenuated by a combination of attenuation factors set for the respective slave units, the attenuated signals thereafter are combined into a resultant signal in master unit, and the combination of attenuation factors is changed based on a predetermined rule. Then information about magnitudes of powers of signals received from the mobile station by the respective slave units is acquired based on change of information about a power of the resultant signal occurring with change in the combination of attenuation factors. At this time, the signal received from the mobile station by each slave unit increases its power with decreasing distance of the slave unit to the mobile station; therefore, distances from the mobile station to the respective slave units are estimated based on the information about the magnitudes of the powers, and the location of the mobile station is suitably estimated thereby.

40 Claims, 47 Drawing Sheets

*Fig.6*

| ID NUMBER i FOR COMBINATION OF ATTENUATION FACTORS | INTERVAL | COMBINATION OF ATTENUATION FACTORS D(i) |
|---|---|---|
| 1 | $T_1$ | {1,0,0} |
| 2 | $T_2$ | {0,1,0} |
| 3 | $T_3$ | {0,0,1} |

Fig. 14

| ID NUMBER i FOR COMBINATION OF ATTENUATION FACTORS | INTERVAL | COMBINATION OF ATTENUATION FACTORS D(i) |
|---|---|---|
| 1 | T1 | {0, 1, 1} |
| 2 | T2 | {1, 0, 1} |
| 3 | T3 | {1, 1, 0} |

MOBILE COMMUNICATION SYSTEM AND METHOD OF ESTIMATING LOCATION OF MOBILE STATION

BACKGROUND OF THE INVENTION

1. Field of the Invention

The present invention relates to a mobile communication system and a method of estimating a location of a mobile station.

2. Related Background Art

Among the conventional location estimation methods of the mobile station in the mobile communication system is, for example, a method in which a mobile station, receiving a downlink signal transmitted from a slave unit coupled to a base station, informs the base station through the slave unit, of a base station identification code included in the downlink signal and peculiarly allocated to each base station and in which the base station estimates the location of the mobile station to be the installation location of the base station associated with the base station identification code.

SUMMARY OF THE INVENTION

However, the installation spacing between base stations can range even up to several km and the location estimation accuracy of the mobile station can heavily degrade if the location of the mobile station is estimated to be the installation location of the base station.

The present invention has been accomplished in view of the above problem and an object of the invention is to provide a mobile communication system and a location estimating method of the mobile station that permit the location of the mobile station to be estimated with better accuracy.

Among the mobile communication systems is a mobile communication system wherein a signal from a base station is once put into a master unit to which a plurality of slave units are coupled, the master unit delivers the signal to the plurality of slave units, the plurality of slave units transmit their respective signals to the mobile station, the slave units receive signals from the mobile station, and the master unit combines the signals into a resultant signal and transmits the resultant signal to the base station.

In this mobile communication system, the plurality of slave units coupled to the master unit are installed in a two-dimensional spread in a communication area around the base station. Then the Inventors contemplated that it should be feasible to estimate the location of the mobile station with higher accuracy, by estimating the location of the mobile station by making use of the slave units in the above mobile communication system.

Namely, a mobile communication system of the present invention is a mobile communication system comprising a plurality of slave units spaced from each other in a predetermined area and configured to radio-receive respective signals from a mobile station, and a master unit configured to combine the signals received by the respective slave units and transmit a resultant signal thereof to a base station, the mobile communication system comprising: attenuating means for attenuating each of the signals from the slave units by a combination of attenuation factors set for the respective slave units and allowing the attenuated signals to be combined into the resultant signal; attenuation factor changing means for changing the combination of attenuation factors on the basis of a predetermined rule; power measuring means for measuring information about a power of the resultant signal under each combination of attenuation factors thus changed; and mobile station location estimating means for estimating a location of the mobile station on the basis of change of the information about the power occurring with change in the combination of attenuation factors.

According to the mobile communication system of the present invention, the signals received from the mobile station by the respective slave units are attenuated by the combination of attenuation factors set for the respective slave units, the attenuated signals thereafter are combined in the master unit, and the combination of attenuation factors is changed based on the predetermined rule. Then information about magnitudes of powers of the signals received from the mobile station by the respective slave units is acquired based on change of information about the power of the resultant signal occurring with change in the combination of attenuation factors. Since at this time the signal received from the mobile station by each slave unit increases its power with decreasing distance between the slave unit and the mobile station, the distances from the mobile station to the respective slave units are estimated based on the information about the magnitudes of the powers, whereby the location of the mobile station is estimated.

In the system herein, preferably, the attenuation factor changing means changes the combination of attenuation factors so that an attenuation factor for a signal associated with one slave unit selected in order from the plurality of slave units becomes higher than an attenuation factor for a signal associated with any other slave unit, as the predetermined rule.

In this configuration, only the signal received by one slave unit selected in order out of the plurality of slave units is attenuated more than the signals received by the other slave units, at every change in the combination of attenuation factors and the signals thus attenuated are combined into a resultant signal. The greater the power of the signal received by the slave unit selected in the attenuation than the powers of the signals received by the other slave units, i.e., the nearer the selected slave unit to the mobile station, the relatively smaller the magnitude of the power of each resultant signal obtained in this way becomes. Therefore, the magnitude relation of the powers received by the respective slave units is readily obtained by comparing the information about the powers of the resultant signals with each other.

Preferably, the mobile station location estimating means comprises: minimum-correspondent slave unit identifying means for acquiring a minimum of the powers under the respective combinations of attenuation factors and identifying one slave unit selected by the attenuation factor changing means when the minimum is acquired; and mobile station location acquiring means for acquiring a location of the identified slave unit as the location of the mobile station.

In this configuration, the minimum is acquired out of the powers of the resultant signals under the respective combinations of attenuation factors, and one slave unit with an attenuation factor higher than that of any other slave unit is identified when the minimum is acquired. Since it can then be determined that the power of the signal received from the mobile station by the identified slave unit is the largest and thus the identified slave unit is nearest to the mobile station, the location of the mobile station is suitably estimated by regarding the location of the identified slave unit as the location of the mobile station.

The system may be configured so as to comprise a sub-slave unit coupled to one of the slave units and configured to radio-receive a signal from the mobile station and transmit the signal through the slave unit to the master unit, and so that the mobile station location acquiring means acquires an average location of locations of a slave unit identified by the minimum-correspondent slave unit identifying means and a sub-slave unit coupled to the slave unit and acquires the average location as the location of the mobile station.

This configuration permits the location of the mobile station to be acquired with better accuracy in the mobile communication system having the sub-slave unit.

The attenuation factor changing means may change the combination of attenuation factors so that an attenuation factor for a signal associated with one slave unit selected in order from the plurality of slave units becomes lower than an attenuation factor for a signal associated with any other slave unit, as the predetermined rule.

In this configuration, only the signal received by one slave unit selected in order out of the plurality of slave units is less attenuated than the signals received by the other slave units, at every change in the combination of attenuation factors and the signals thus attenuated are combined into a resultant signal. The greater the power of the signal received by the slave unit selected in the attenuation than the powers of the signals received by the other slave units, i.e., the nearer the selected slave unit to the mobile station, the relatively larger the magnitude of the power of each resultant signal obtained in this way becomes. Therefore, the magnitude relation of the powers received by the respective slave units is readily obtained by comparing the information about the powers of the resultant signals with each other.

In the configuration herein, preferably, the mobile station location estimating means comprises: maximum-correspondent slave unit identifying means for acquiring a maximum of the powers under the respective combinations of attenuation factors and identifying one slave unit selected by the attenuation factor changing means when the maximum is acquired; and mobile station location acquiring means for acquiring a location of the identified slave unit as the location of the mobile station.

In this configuration, the maximum is acquired out of the powers of the resultant signals under the respective combinations of attenuation factors, and one slave unit with an attenuation factor lower than that of any other slave unit is identified when the maximum is acquired. Since it can then be determined that the power of the signal received from the mobile station by the identified slave unit is the largest and thus the identified slave unit is nearest to the mobile station, the location of the mobile station is suitably estimated by regarding the location of the identified slave unit as the location of the mobile station.

The system may be configured so as to comprise a sub-slave unit coupled to one of the slave units and configured to radio-receive a signal from the mobile station and transmit the signal through the slave unit to the master unit, and so that the mobile station location acquiring means acquires an average location of locations of a slave unit identified by the maximum-correspondent slave unit identifying means and a sub-slave unit coupled to the slave unit and acquires the average location as the location of the mobile station.

This configuration permits the location of the mobile station to be acquired with better accuracy in the mobile communication system having the sub-slave unit.

The system is preferably configured so as to comprise location-specific power change storage means in which the change of the information about the power under each combination of attenuation factors changed is preliminarily stored in correspondence with locations of the mobile station in the area, and so that the mobile station location estimating means compares the change of the information about the power measured by the power measuring means, with the change of the information about the power stored in the location-specific power change storage means and estimates the location of the mobile station in the area.

In this configuration the change of the power of the resultant signal due to the change in the combination of attenuation factors is preliminarily stored in correspondence with every location of the mobile station in the form of a database and the change of the power measured with the mobile station at an unknown location is compared with this database, whereby the location of the mobile station can be readily estimated.

Preferably, the attenuating means attenuates the signals received by the slave units, on a hardware basis.

This permits the attenuation of the signals to be suitably performed in the mobile communication system of the present invention.

The attenuating means may attenuate the signals received by the slave units, on a software basis.

This also permits the attenuation of the signals to be suitably performed in the mobile communication system of the present invention.

Another mobile communication system according to the present invention is a mobile communication system comprising a master unit configured to receive a signal from a base station and deliver a plurality of signals, and a plurality of slave units spaced from each other in a predetermined area and configured to receive the respective signals delivered from the master unit, radio-transmit the signals to a mobile station, and radio-receive signals from the mobile station, the mobile communication system comprising: attenuating means for attenuating each of the signals delivered in the master unit, by a combination of attenuation factors set for the respective slave units and transmitting the attenuated signals to the respective slave units; attenuation factor changing means for changing the combination of attenuation factors on the basis of a predetermined rule; power acquiring means for acquiring information about a power of a resultant signal of signals received from the plurality of slave units by the mobile station under each combination of attenuation factors thus changed, the information being transmitted from the mobile station; and mobile station location estimating means for estimating a location of the mobile station on the basis of change of the information about the power occurring with change in the combination of attenuation factors.

According to the mobile communication system of the present invention, the signals delivered from the master unit are individually attenuated by the combination of attenuation factors set for the respective slave units, the attenuated signals thereafter are transmitted to the respective slave units and then transmitted to the mobile station, and this combination of attenuation factors is changed. In the mobile station, the information about the power of the resultant signal of these attenuated signals is measured and transmitted as to each combination of attenuation factors, and the power acquiring means acquires the information about the power transmitted from the mobile station. Then information about magnitudes of powers of the signals received from the respective slave units by the mobile station is obtained based on change of the information about the power of the resultant signal occurring with change in the combination of attenuation factors. Since in this configuration the signal received from each slave unit by the mobile station increases its power with decreasing distance between the slave unit and the mobile station, the distances from the mobile station to the slave units are estimated based on the information about the magnitudes of the powers, whereby the location of the mobile station is estimated.

Preferably, the attenuation factor changing means changes the combination of attenuation factors so that an attenuation factor for a signal transmitted to one slave unit selected in order from the plurality of slave units becomes higher than an attenuation factor for a signal transmitted to any other slave unit, as the predetermined rule.

In this configuration, only a signal to one slave unit, selected in order out of the signals delivered to the plurality of slave units, is attenuated more than the signals to the other slave units, at every change in the combination of attenuation factors and the signals thus attenuated are combined into a resultant signal in the mobile station. The nearer the slave unit selected in the attenuation, to the mobile station, the relatively smaller the magnitude of the power of each resultant signal obtained in this way becomes. Therefore, the distances from the mobile station to the slave units are readily estimated by comparing the information about the powers of the resultant signals with each other.

Preferably, the mobile station location estimating means comprises: minimum-correspondent slave unit identifying means for acquiring a minimum of the powers under the respective combinations of attenuation factors and identifying one slave unit selected by the attenuation factor changing means when the minimum is acquired; and mobile station location acquiring means for acquiring a location of the identified slave unit as the location of the mobile station.

In this configuration, the minimum is acquired out of the powers of the resultant signals under the respective combinations of attenuation factors, and one slave unit with an attenuation factor higher than that of any other slave unit is identified when the minimum is acquired. Since it can then be determined that the power of the signal received from the identified slave unit by the mobile station is the largest and thus the identified slave unit is nearest to the mobile station, the location of the mobile station is suitably estimated by regarding the location of the identified slave unit as the location of the mobile station.

The system may be configured so as to comprise a sub-slave unit coupled to one of the slave units and configured to relay a signal transmitted from the slave unit and radio-transmit the signal to the mobile station, and so that the mobile station location acquiring means acquires an average location of locations of a slave unit identified by the minimum-correspondent slave unit identifying means and a sub-slave unit coupled to the slave unit and acquires the average location as the location of the mobile station.

This configuration permits the location of the mobile station to be acquired with better accuracy in the mobile communication system having the sub-slave unit.

The attenuation factor changing means may change the combination of attenuation factors so that an attenuation factor for a signal transmitted to one slave unit selected in order from the plurality of slave units becomes lower than an attenuation factor for a signal transmitted to any other slave unit, as the predetermined rule.

In this configuration, only a signal to one slave unit selected in order out of the signals delivered to the plurality of slave units is less attenuated than the signals to the other slave units, at every change in the combination of attenuation factors. The nearer the slave unit selected in the attenuation, to the mobile station, the relatively larger the magnitude of the power of each resultant signal obtained in this way becomes. Therefore, the distances from the mobile station to the slave units are readily estimated by comparing the information about the powers of the resultant signals with each other.

In the configuration herein, preferably, the mobile station location estimating means comprises: maximum-correspondent slave unit identifying means for acquiring a maximum of the powers under the respective combinations of attenuation factors and identifying one slave unit selected by the attenuation factor changing means when the maximum is acquired; and mobile station location acquiring means for acquiring a location of the identified slave unit as the location of the mobile station.

In this configuration, the maximum is acquired out of the powers of the resultant signals under the respective combinations of attenuation factors, and one slave unit with an attenuation factor lower than that of any other slave unit is identified when the maximum is acquired. Since it can then be determined that the power of the signal received from the identified slave unit by the mobile station is the largest and thus the identified slave unit is nearest to the mobile station, the location of the mobile station is suitably estimated by regarding the location of the identified slave unit as the location of the mobile station.

The system may be configured so as to comprise a sub-slave unit coupled to one of the slave units and configured to relay a signal transmitted from the slave unit and radio-transmit the signal to the mobile station, and so that the mobile station location acquiring means acquires an average location of locations of a slave unit identified by the maximum-correspondent slave unit identifying means and a sub-slave unit coupled to the slave unit and acquires the average location as the location of the mobile station.

This configuration permits the location of the mobile station to be acquired with better accuracy in the mobile communication system having the sub-slave unit.

The system is preferably configured so as to comprise location-specific power change storage means in which the change of the information about the power under each combination of attenuation factors changed is preliminarily stored in correspondence with locations of the mobile station in the area, and so that the mobile station location estimating means compares the change of the information about the power acquired by the power acquiring means, with the change of the information about the power stored in the location-specific power change storage means and estimates the location of the mobile station in the area.

In this configuration the change of the power of the resultant signal due to the change in the combination of attenuation factors is preliminarily stored in correspondence with every location of the mobile station in the form of a database and the change of the power measured with the mobile station at an unknown location is compared with this database, whereby the location of the mobile station can be readily estimated.

Preferably, the attenuating means attenuates the signals delivered by the master unit, on a hardware basis.

This permits the attenuation of the signals to be suitably performed in the mobile communication system of the present invention.

The attenuating means may attenuate the signals delivered by the master unit, on a software basis.

This permits the attenuation of the signals to be suitably performed in the mobile communication system of the present invention.

A location estimating method of a mobile station according to the present invention is a method of estimating a location of a mobile station in a mobile communication system comprising a plurality of slave units spaced from each other in a predetermined area and configured to radio-receive respective signals from the mobile station, and a master unit configured to combine the signals received by the respective slave units, into a resultant signal and transmit the resultant signal to a base station, the method comprising: an attenuating step of attenuating each of the signals from the slave units by a combination of attenuation factors set for the respective slave units and allowing the attenuated signals to be combined into the resultant signal; an attenuation factor changing step of changing the combination of attenuation factors on the basis of a predetermined rule; a power measuring step of measuring information about a power of the resultant signal under each combination of attenuation factors thus changed; and a mobile station location estimating step of estimating a location of the mobile station on the basis of change of the information about the power occurring with change in the combination of attenuation factors.

According to the location estimating method of the mobile station of the present invention, the signals received from the mobile station by the respective slave units are attenuated by the combination of attenuation factors set for the respective slave units, the attenuated signals thereafter are combined in the master unit, and the combination of attenuation factors is changed based on the predetermined rule. Then information about magnitudes of powers of the signals received from the mobile station by the respective slave units is acquired based on change of information about the power of the resultant signal occurring with change in the combination of attenuation factors. Since at this time the signal received from the mobile station by each slave unit increases its power with decreasing distance between the slave unit and the mobile station, the distances from the mobile station to the respective slave units are estimated based on the information about the magnitudes of the powers, whereby the location of the mobile station is estimated.

In the configuration herein, preferably, the attenuation factor changing step is to change the combination of attenuation factors so that an attenuation factor for a signal associated with one slave unit selected in order from the plurality of slave units becomes higher than an attenuation factor for a signal associated with any other slave unit, as the predetermined rule.

In this configuration, only the signal received by one slave unit selected in order out of the plurality of slave units is attenuated more than the signals received by the other slave units, at every change in the combination of attenuation factors and the signals thus attenuated are combined into a resultant signal. The greater the power of the signal received by the slave unit selected in the attenuation than the powers of the signals received by the other slave units, i.e., the nearer the selected slave unit to the mobile station, the relatively smaller the magnitude of the power of each resultant signal obtained in this way becomes. Therefore, the magnitude relation of the powers received by the respective slave units is readily obtained by comparing the information about the powers of the resultant signals with each other.

Preferably, the mobile station location estimating step comprises: a minimum-correspondent slave unit identifying step of acquiring a minimum of the powers under the respective combinations of attenuation factors and identifying one slave unit selected in the attenuation factor changing step when the minimum is acquired; and a mobile station location acquiring step of acquiring a location of the identified slave unit as the location of the mobile station.

This permits the minimum to be acquired out of the powers of the resultant signals under the respective combinations of attenuation factors and identifies one slave unit with an attenuation factor higher than that of any other slave unit when the minimum is acquired; therefore, it is found that the power of the signal received by the identified slave unit is the largest. Since the identified slave unit is nearest to the mobile station, the location of the mobile station is suitably estimated by regarding the location of the identified slave unit as the location of the mobile station.

In the above method, the system may be configured so as to comprise a sub-slave unit coupled to one of the slave units and configured to radio-receive a signal from the mobile station and transmit the signal through the slave unit to the master unit, and the mobile station location acquiring step may be configured to acquire an average location of locations of a slave unit identified in the minimum-correspondent slave unit identifying step and a sub-slave unit coupled to the slave unit and acquire the average location as the location of the mobile station.

This configuration permits the location of the mobile station to be acquired with better accuracy in the mobile communication system having the sub-slave unit.

The attenuation factor changing step maybe configured to change the combination of attenuation factors so that an attenuation factor for a signal associated with one slave unit selected in order from the plurality of slave units becomes lower than an attenuation factor for a signal associated with any other slave unit, as the predetermined rule.

In this configuration, only the signal received by one slave unit selected in order out of the plurality of slave units is less attenuated than the signals received by the other slave units, at every change in the combination of attenuation factors and the signals thus attenuated are combined into a resultant signal. The greater the power of the signal received by the slave unit selected in the attenuation than the powers of the signals received by the other slave units, i.e., the nearer the selected slave unit to the mobile station, the relatively larger the magnitude of the power of each resultant signal obtained in this way becomes. Therefore, the magnitude relation of the powers received by the respective slave units is readily obtained by comparing the information about the powers of the resultant signals with each other.

In the configuration herein, preferably, the mobile station location estimating step comprises: a maximum-correspondent slave unit identifying step of acquiring a maximum of the powers under the respective combinations of attenuation factors and identifying one slave unit selected in the attenuation factor changing step when the maximum is acquired; and a mobile station location acquiring step of acquiring a location of the identified slave unit as the location of the mobile station.

This permits the maximum to be acquired out of the powers of the resultant signals under the respective combinations of attenuation factors and identifies one slave unit with an attenuation factor lower than that of any other slave unit when the maximum is acquired; therefore, it is found that the power of the signal received by the identified slave unit is the largest. Since the identified slave unit is nearest to the mobile station, the location of the mobile station is suitably estimated by regarding the location of the identified slave unit as the location of the mobile station.

In the above method, the system may be configured so as to comprise a sub-slave unit coupled to one of the slave units and configured to radio-receive a signal from the mobile station and transmit the signal through the slave unit to the master unit, and the method may be configured so that the mobile station location acquiring step is to acquire an average location of locations of a slave unit identified in the maximum-correspondent slave unit identifying step and a sub-slave unit coupled to the slave unit and acquire the average location as the location of the mobile station.

This configuration permits the location of the mobile station to be acquired with better accuracy in the mobile communication system having the sub-slave unit.

The method may be configured so as to comprise a location-specific power change storage step in which the change of the information about the power under each combination of attenuation factors changed is preliminarily stored in correspondence with locations of the mobile station in the area, and so that the mobile station location estimating step is to compare the change of the information about the power measured in the power measuring step, with the change of the information about the power stored in the location-specific power change storage step and estimate the location of the mobile station in the area.

In this configuration the change of the power of the resultant signal due to the change in the combination of attenuation factors is preliminarily stored in correspondence with every location of the mobile station in the form of a database and the change of the power measured with the mobile station at an unknown location is compared with this database, whereby the location of the mobile station can be readily estimated.

Preferably, the attenuating step is to attenuate the signals received by the slave units, on a hardware basis.

This permits the attenuation of the signals to be suitably performed in the location estimating method of the mobile station according to the present invention.

The attenuating step may attenuate the signals received by the slave units, on a software basis.

This also permits the attenuation of the signals to be suitably performed in the location estimating method of the mobile station according to the present invention.

Another location estimating method of a mobile station according to the present invention is a method of estimating a location of a mobile station in a mobile communication system comprising a master unit configured to receive a signal from a base station and deliver a plurality of signals, and a plurality of slave units spaced from each other in a predetermined area and configured to receive the respective signals delivered from the master unit, radio-transmit the signals to a mobile station, and radio-receive signals from the mobile station, the method comprising: an attenuating step of attenuating each of the signals delivered in the master unit, by a combination of attenuation factors set for the respective slave units and transmitting the attenuated signals to the respective slave units; an attenuation factor changing step of changing the combination of attenuation factors on the basis of a predetermined rule; a power acquiring step of acquiring information about a power of a resultant signal of signals received from the plurality of slave units by the mobile station under each combination of attenuation factors thus changed, the information being transmitted from the mobile station; and a mobile station location estimating step of estimating a location of the mobile station on the basis of change of the information about the power occurring with change in the combination of attenuation factors.

According to the location estimating method of the mobile station of the present invention, the signals delivered from the master unit are individually attenuated by the combination of attenuation factors set for the respective slave units, the attenuated signals thereafter are transmitted to the respective slave units and then transmitted to the mobile station, and this combination of attenuation factors is changed. In the mobile station, the information about the power of the resultant signal of these attenuated signals is measured and transmitted as to each combination of attenuation factors, and the information about the power transmitted from the mobile station is acquired in the power acquiring step. Then information about magnitudes of powers of the signals received from the respective slave units by the mobile station is obtained based on change of the information about the power of the resultant signal occurring with change in the combination of attenuation factors. Since in this configuration the signal received from each slave unit by the mobile station increases its power with decreasing distance between the slave unit and the mobile station, the distances from the mobile station to the slave units are estimated based on the information about the magnitudes of the powers, whereby the location of the mobile station is estimated.

In the configuration herein, preferably, the attenuation factor changing step is to change the combination of attenuation factors so that an attenuation factor for a signal transmitted to one slave unit selected in order from the plurality of slave units becomes higher than an attenuation factor for a signal transmitted to any other slave unit, as the predetermined rule.

In this configuration, only a signal to one slave unit, selected in order out of the signals delivered to the plurality of slave units, is attenuated more than the signals to the other slave units, at every change in the combination of attenuation factors and the signals thus attenuated are combined into a resultant signal in the mobile station. The nearer the slave unit selected in the attenuation, to the mobile station, the relatively smaller the magnitude of the power of each resultant signal obtained in this way becomes. Therefore, the distances from the mobile station to the slave units are readily estimated by comparing the information about the powers of the resultant signals with each other.

Preferably, the mobile station location estimating step comprises: a minimum-correspondent slave unit identifying step of acquiring a minimum of the powers under the respective combinations of attenuation factors and identifying one slave unit selected in the attenuation factor changing step when the minimum is acquired; and a mobile station location acquiring step of acquiring a location of the identified slave unit as the location of the mobile station.

This permits the minimum to be acquired out of the powers of the resultant signals under the respective combinations of attenuation factors and identifies one slave unit with an attenuation factor higher than that of any other slave unit when the minimum is acquired; therefore, it is found that the power of the signal received from the identified slave unit by the mobile station is the largest. Since the identified slave unit is nearest to the mobile station, the location of the mobile station is suitably estimated by regarding the location of the identified slave unit as the location of the mobile station.

In the above method, the system may be configured so as to comprise a sub-slave unit coupled to one of the slave units and configured to relay a signal transmitted from the slave unit and radio-transmit the signal to the mobile station, and the method may be configured so that the mobile station location acquiring step is to acquire an average location of locations of a slave unit identified in the minimum-correspondent slave unit identifying step and a sub-slave unit coupled to the slave unit and acquire the average location as the location of the mobile station.

This configuration permits the location of the mobile station to be acquired with better accuracy in the mobile communication system having the sub-slave unit.

The attenuation factor changing step may be to change the combination of attenuation factors so that an attenuation factor for a signal transmitted to one slave unit selected in order from the plurality of slave units becomes lower than an attenuation factor for a signal transmitted to any other slave unit, as the predetermined rule.

In this configuration, only a signal to one slave unit selected in order out of the signals delivered to the plurality of slave units is less attenuated than the signals to the other slave units, at every change in the combination of attenuation factors. The nearer the slave unit selected in the attenuation, to the mobile station, the relatively larger the magnitude of the power of each resultant signal obtained in this way becomes. Therefore, the distances from the mobile station to the slave units are readily estimated by comparing the information about the powers of the resultant signals with each other.

In the configuration herein, preferably, the mobile station location estimating step comprises: a maximum-correspondent slave unit identifying step of acquiring a maximum of the powers under the respective combinations of attenuation factors and identifying one slave unit selected in the attenuation factor changing step when the maximum is acquired; and a mobile station location acquiring step of acquiring a location of the identified slave unit as the location of the mobile station.

This permits the maximum to be acquired out of the powers of the resultant signals under the respective combinations of attenuation factors and identifies one slave unit with an attenuation factor lower than that of any other slave unit when the maximum is acquired; therefore, it is found that the power of the signal received from the identified slave unit by the mobile station is the largest. Since the identified slave unit is nearest to the mobile station, the location of the mobile station is suitably estimated by regarding the location of the identified slave unit as the location of the mobile station.

The system may be configured so as to comprise a sub-slave unit coupled to one of the slave units and configured to relay a signal transmitted from the slave unit and radio-transmit the signal to the mobile station, and the method may be configured so that the mobile station location acquiring step is to acquire an average location of locations of a slave unit identified in the maximum-correspondent slave unit identifying step and a sub-slave unit coupled to the slave unit and acquire the average location as the location of the mobile station.

This configuration permits the location of the mobile station to be acquired with better accuracy in the mobile communication system having the sub-slave unit.

The method may be configured so as to comprise a location-specific power change storage step in which the change of the information about the power under each combination of attenuation factors changed is preliminarily stored in correspondence with locations of the mobile station in the area, and so that the mobile station location estimating step is to compare the change of the information about the power acquired in the power acquiring step, with the change of the information about the power stored in the location-specific power change storage step and estimate the location of the mobile station in the area.

In this configuration the change of the power of the resultant signal due to the change in the combination of attenuation factors is preliminarily stored in correspondence with every location of the mobile station in the form of a database and the change of the power measured with the mobile station at an unknown location is compared with this database, whereby the location of the mobile station can be readily estimated.

Preferably, the attenuating step is to attenuate the signals delivered by the master unit, on a hardware basis.

This permits the attenuation of the signals to be suitably performed in the location estimating method of the mobile station according to the present invention.

The attenuating step may be to attenuate the signals delivered by the master unit, on a software basis.

This permits the attenuation of the signals to be suitably performed in the location estimating method of the mobile station according to the present invention.

Since the location of presence of the mobile station can be estimated in units of a plurality of slave units installed in a two-dimensional spread around the base station, the invention described above permits the location of the mobile station to be estimated with better accuracy than in the case of estimating the location of the mobile station in units of base stations. Since the system is configured to measure the change of the power of the resultant signal due to the change in the combination of attenuation factors, it is not necessary to allocate identification codes for identifying the respective slave units, to signals between the slave units and the mobile station, and the invention is also readily applicable to the mobile communication systems in which only an identification code of each base station is transmitted and received between the slave units and the mobile station as being the case under the present circumstances.

The present invention will become more fully understood from the detailed description given hereinbelow and the accompanying drawings, which are given by way of illustration only and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 6 is a diagram showing the combinations of attenuation factors set by the pattern 1 attenuation factor changer in the mobile communication system of FIG. 5.

FIG. 14 is a diagram showing the combinations of attenuation factors set by the pattern 2 attenuation factor changer in the mobile communication system of FIG. 13.

DESCRIPTION OF THE PREFERRED EMBODIMENTS

Embodiments of the present invention will be described below in detail with reference to the drawings.

(First Embodiment)

Figure 1:
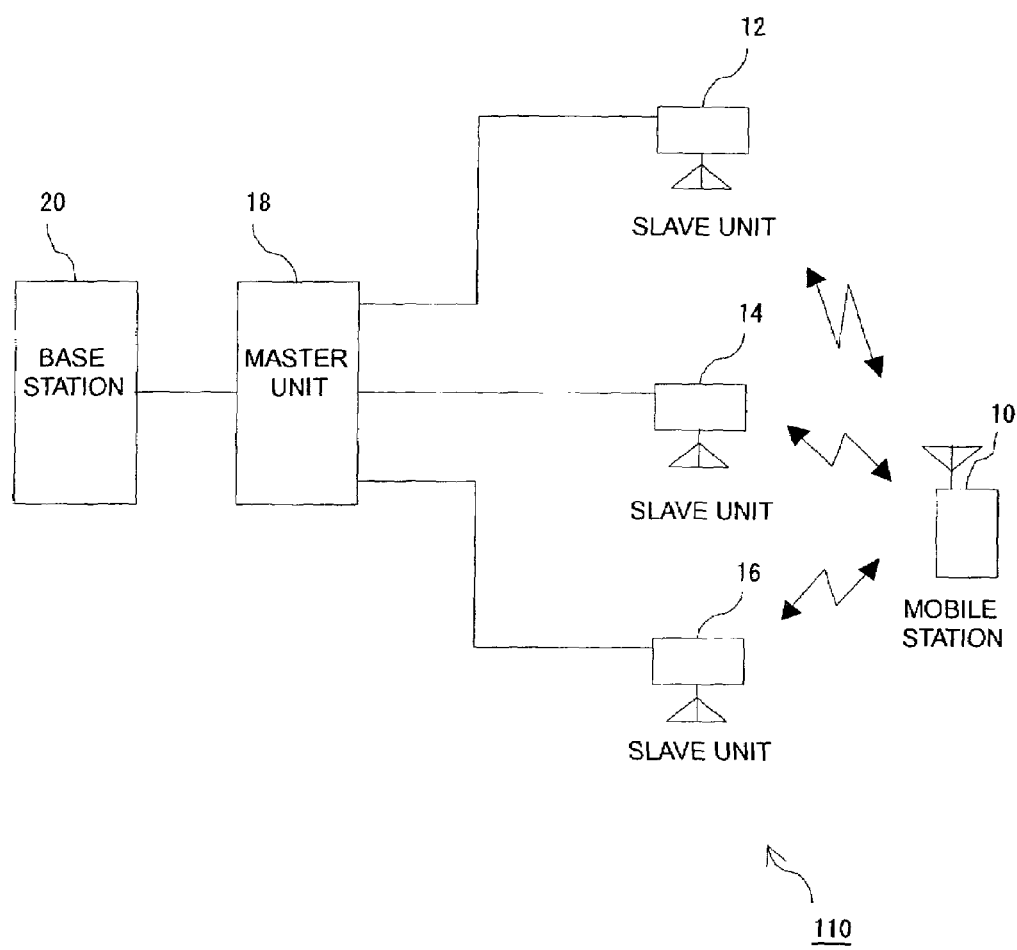
FIG. 1 is an illustration showing the schematic configuration of the mobile communication system in the first embodiment.

FIG. 1 is an illustration showing a schematic configuration of mobile communication system 110 as a first embodiment of the present invention. The mobile communication system 110 according to the present embodiment comprises three slave units 12, 14, and 16 spaced from each other in a predetermined area and configured to transmit and receive radio signals to and from a mobile station 10; and a master unit 18 to which each of these slave units 12, 14, 16 is coupled and to which a base station 20 is coupled, which is configured to combine signals from the respective slave units 12, 14, 16 into a resultant signal and transmit the resultant signal to the base station 20, and which is configured to deliver signals from the base station 20 and transmit them to the slave units 12, 14, 16.

Figure 2:
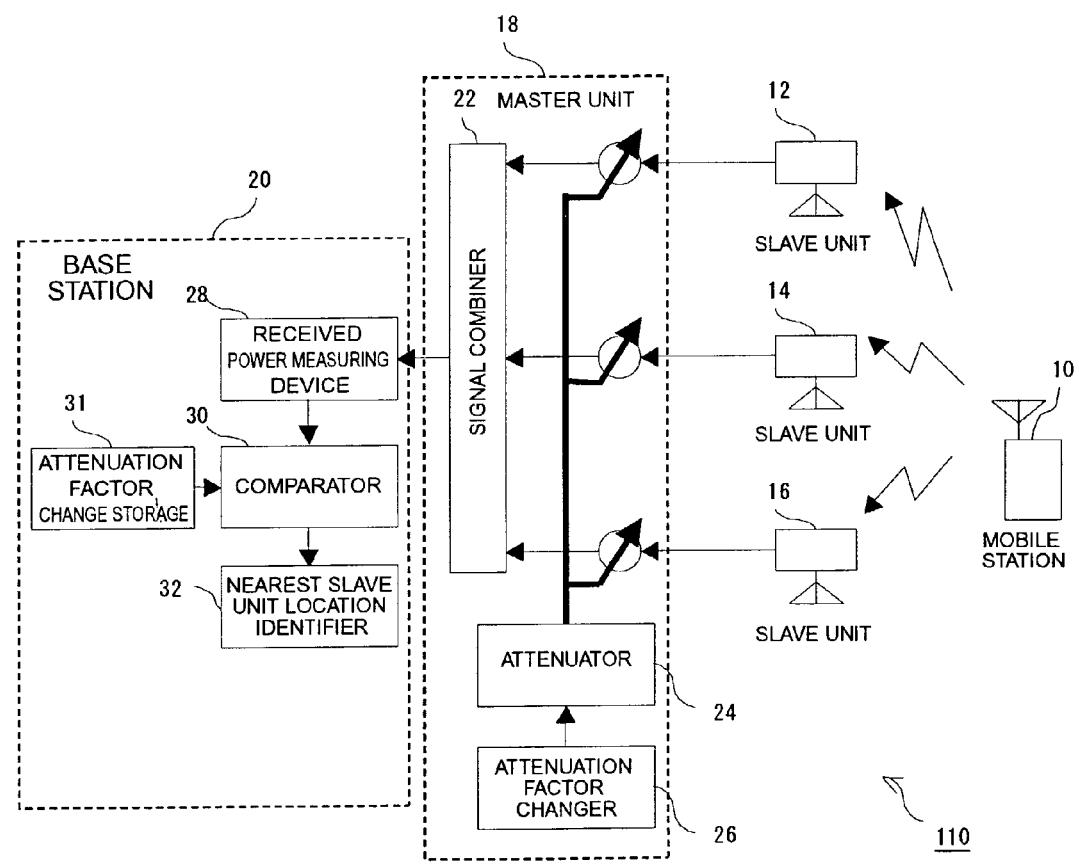
FIG. 2 is a schematic illustration showing the details of the base station and the master unit in the mobile communication system of FIG. 1.

FIG. 2 shows configurations of the base station 20 and the master unit 18 in the mobile communication system 110 of the present embodiment. The master unit 18 has a signal combiner 22 configured to receive each of signals transmitted from the slave units 12, 14, 16, combine the signals into a resultant signal, and transmit the resultant signal to the base station 20.

The master unit 18 is provided with an attenuator 24 configured to independently attenuate each of the signals from the slave units 12, 14, 16 by a combination of attenuation factors set for the respective slave units 12, 14, 16 and allow the signal combiner 22 to combine the attenuated signals; and an attenuation factor changer 26 configured to change the combination of attenuation factors in the attenuator 24 according to a predetermined pattern at intervals of a prescribed time.

Here the varying combination of attenuation factors is represented by $D(i)=\{D_1(i), D_2(i), \ldots, D_N(i)\}$. In this representation, i is an integer increasing at intervals of the above prescribed time and taking a value ranging from 1 to M, and D(i) designates a combination of different attenuation factors varying corresponding to i. N represents the number of slave units, and $D_j(i)$ an attenuation factor for a signal from the jth slave unit.

The attenuation factor changer 26 changes the combination of attenuation factors with an increase of i at every prescribed time, and the attenuator 24 attenuates each of signals from the slave units 12, 14, 16 according to the combination of attenuation factors D(i) determined by the attenuation factor changer 26 and allows the signal combiner 22 to combine the signals thus attenuated independently of each other.

The signals may be attenuated on a hardware basis by adopting a variable attenuator or the like to variably attenuate each of radio waves received by the slave units 12, 14, 16, as the attenuator 24, or the signals may be attenuated on a software basis by a computer after each of radio waves received by the slave units 12, 14, 16 is demodulated.

The base station 20 is provided with a received power measuring device (power measuring means) 28 which measures a power of a resultant signal obtained under each combination of attenuation factors in the signal combiner 22. Let R(i) be a resultant signal of signals attenuated by the varying combination D(i) of attenuation factors, and P(i) be a power of this signal R(i).

The base station 20 has an attenuation factor change storage 31 which stores the combinations of attenuation factors D(i) of the attenuation factor changer 26 in the master unit 18; a comparator 30 which compares the power P(i) measured by the received power measuring device 28, with the combinations of attenuation factors D(i) of the attenuation factor changer 26 stored in the attenuation factor change storage 31; and a nearest slave unit location identifier 32 which identifies a location of a slave unit 12, 14, or 16 nearest to the mobile station 10 from the result of the comparison obtained by the comparator 30, and these elements constitute the mobile station location estimating means.

Figure 3:
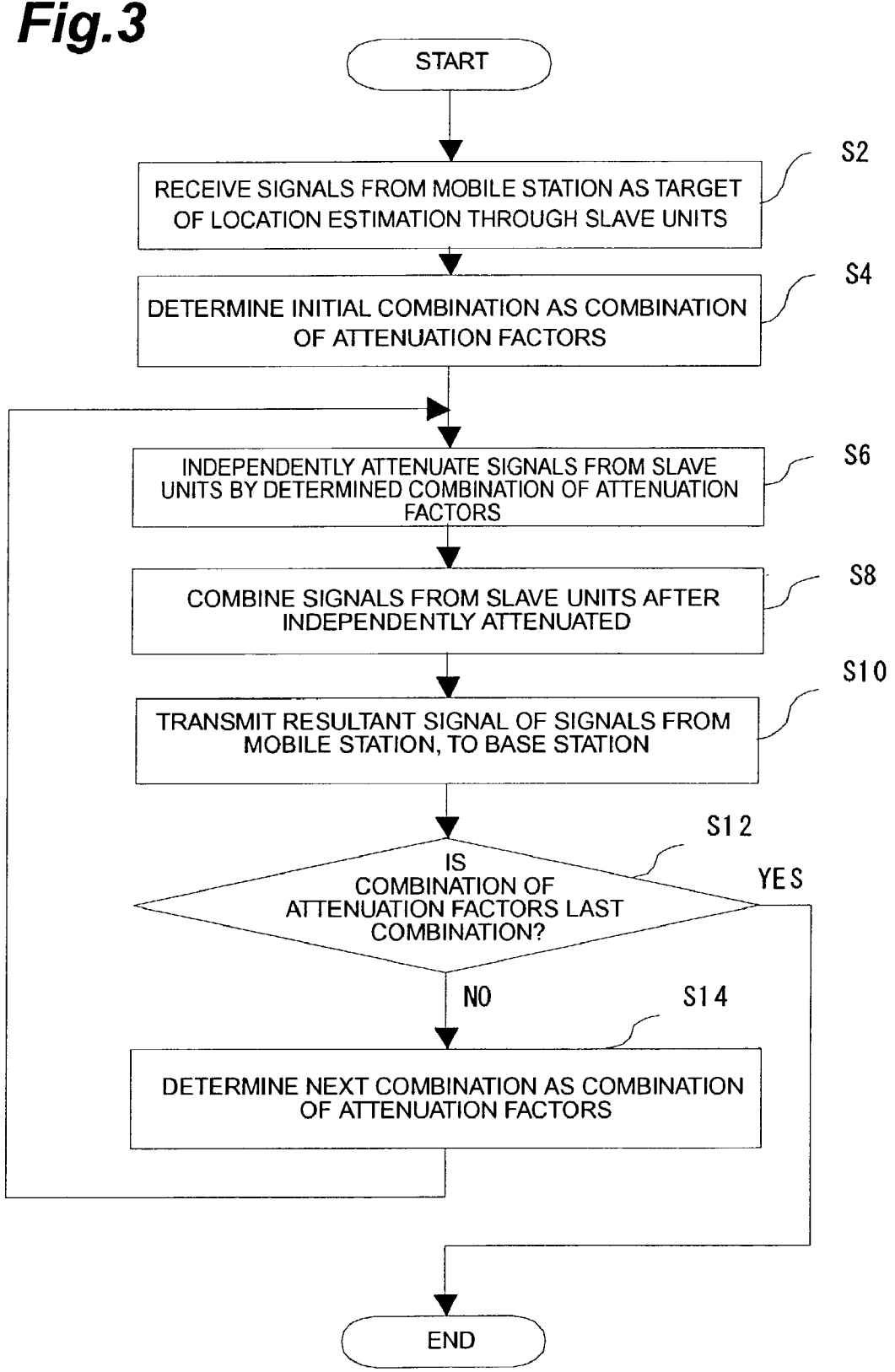
FIG. 3 is a chart showing the processing flow of the master unit in the mobile communication system of FIG. 1.

The following will describe the procedure of processing in the mobile communication system 110 according to the present embodiment unit by unit and also describe the location estimating method of the mobile station according to an embodiment of the present invention in conjunction therewith. The processing flow of the master unit 18 will be first described with reference to FIG. 3. The master unit 18 first receives signals that the slave units 12, 14, 16 received from the mobile station 10 as a target for estimation of location, from the plurality of slave units 12, 14, 16 (S2). Then the master unit 18 determines the initial (i=1) combination D(1) as the combination of attenuation factors D(i) for the respective signals from the slave units 12, 14, 16 (S4).

After the determination of the combination of attenuation factors, the attenuator 24 of the master unit 18 attenuates each of the signals from the plurality of slave units 12, 14, 16 by the determined combination of attenuation factors D(i) (S6), and the signal combiner 22 combines the signals thus attenuated (S8) and transmits the resultant signal R(i) to the base station 20 (S10).

As a next step, if the combination of attenuation factors D(i) is not the last combination D(M) (S12), the attenuation factors are switched to the next combination (i.e., to the next combination D(i+1)) (S14) and the processing returns to S6 to perform the next attenuation. On the other hand, if the combination of attenuation factors is the last combination D(M) (S12), the processing is terminated.

Figure 4:
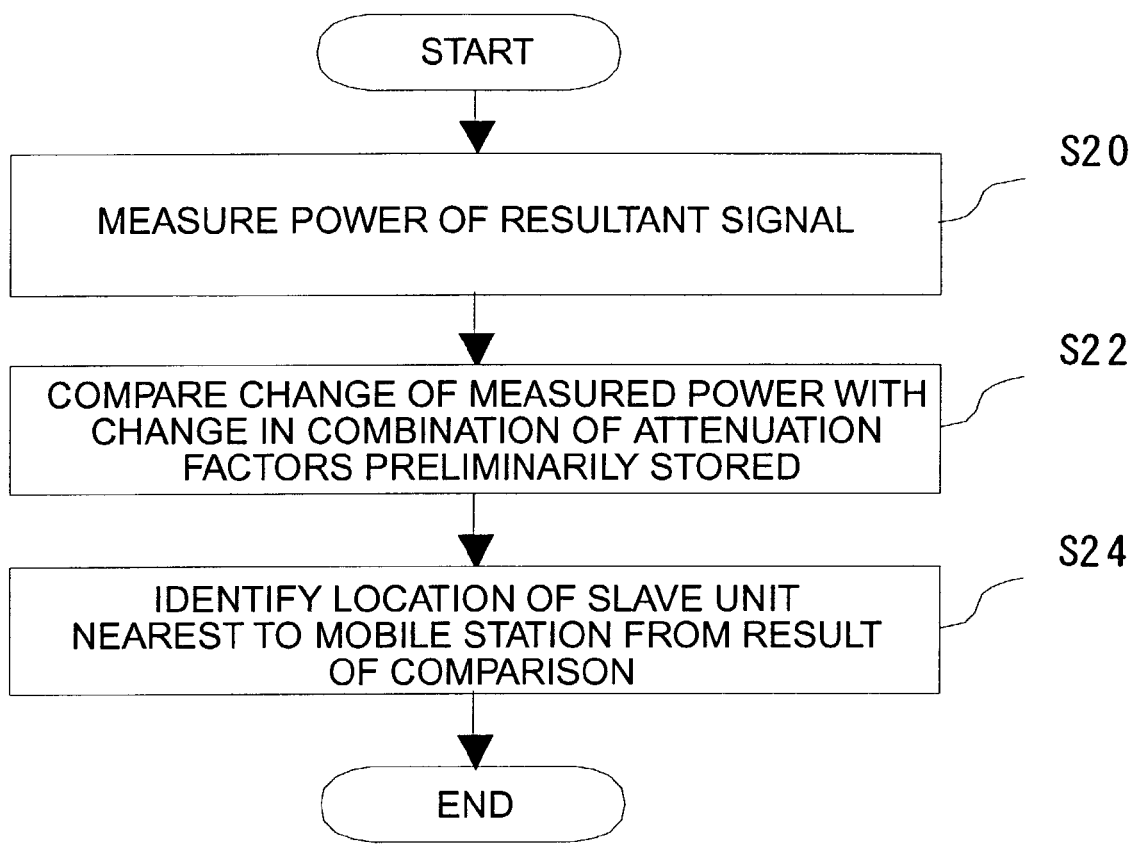
FIG. 4 is a chart showing the processing flow of the base station in the mobile communication system of FIG. 1.

The following will describe the processing flow of the base station 20 in the mobile communication system 110 according to the present embodiment with reference to FIG. 4. The base station 20 first measures the power P(i) of the resultant signal R(i) transmitted from the master unit 18, under each combination of attenuation factors D(i) (S20).

Then the base station 20 compares this power P(i) with the combinations of attenuation factors D(i) stored in the attenuation factor change storage 31 (S22). This comparison results in obtaining information about magnitudes of powers of the signals received from the mobile station 10 by the respective slave units 12, 14, 16. Since a signal received from the mobile station 10 by each slave unit 12, 14, 16 increases its power with decreasing distance of the slave unit to the mobile station 10, the distances from the mobile station 10 to the respective slave units are estimated based on the information about the magnitudes of the powers, the location of the slave unit 12, 14, 16 nearest to the mobile station 10 is identified from the estimated distances, and the location of the mobile station 10 is estimated to be the location of the identified slave unit (S24).

According to the mobile communication system 110 of the present embodiment, as described above, the signals received from the mobile station 10 by the respective slave units 12, 14, 16, each are attenuated by the combination of attenuation factors set for the respective slave units 12, 14, 16, the attenuated signals thereafter are combined, and the combination of attenuation factors is changed based on a predetermined rule. Then information about magnitudes of powers of the signals received from the mobile station 10 by the respective slave units 12, 14, 16 is obtained based on change of the information about the power of the resultant signal occurring with change in the combination of attenuation factors. Since at this time the signal received from the mobile station 10 by each slave unit increases its power with decreasing distance of the slave unit to the mobile station 10, the distances from the mobile station 10 to the respective slave units 12, 14, 16 can be estimated based on the information about the magnitudes of the powers, and the location of the mobile station 10 is estimated thereby.

Without having to be limited to the method of estimating the location of the mobile station 10 to be the location of the slave unit nearest to the mobile station 10, for example, the location of the mobile station 10 may be estimated in such a way that weights according to distances from slave units to the mobile station 10 are given to a location of the first nearest slave unit to the mobile station 10 and to a location of the second nearest slave unit to the mobile station 10 and a weighted mean is calculated as the location of the mobile station therefrom.

(Second Embodiment)

Figure 5:
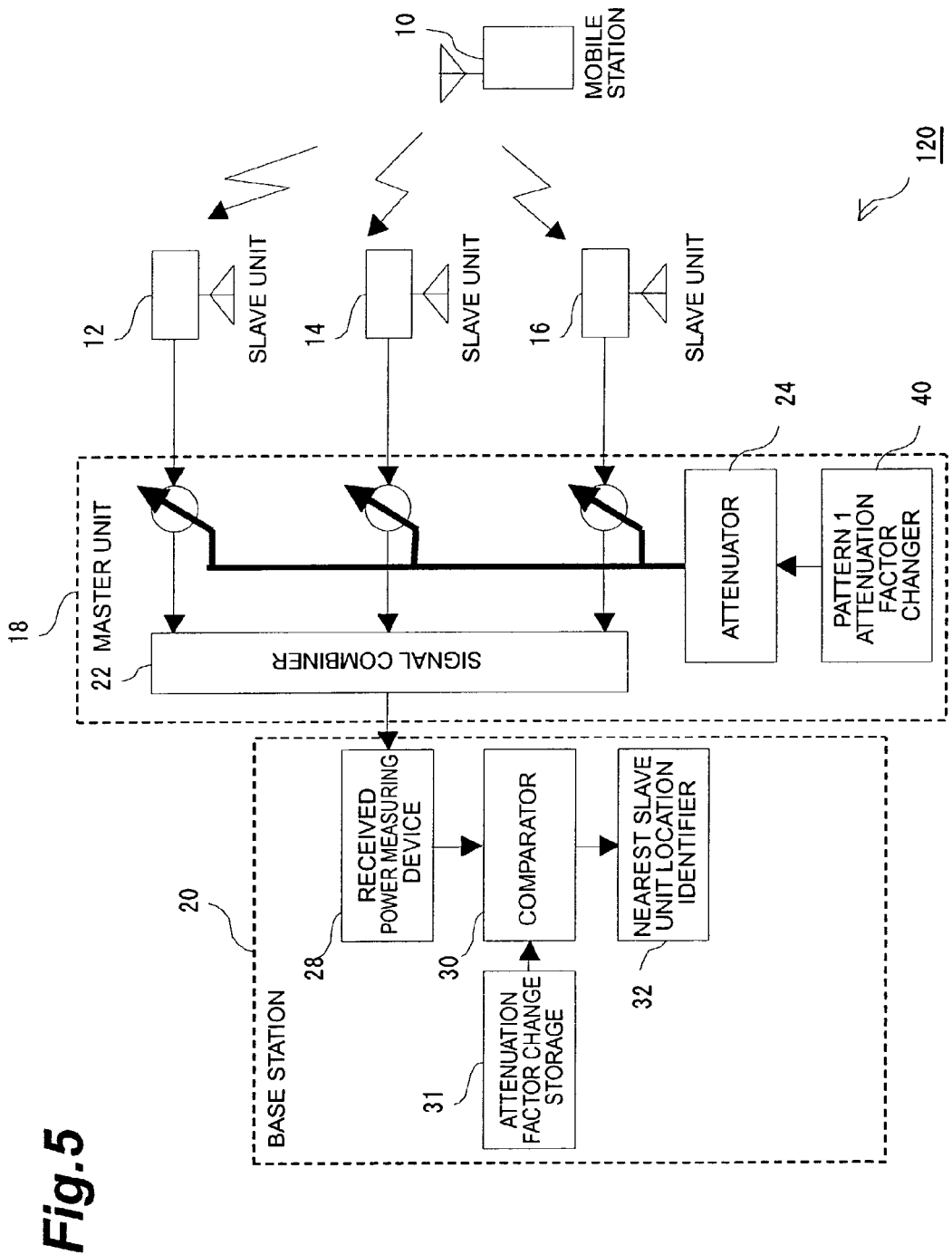
FIG. 5 is an illustration showing the configuration of the mobile communication system in the second embodiment.

The next will describe the mobile communication system 120 as a second embodiment of the present invention with reference to FIG. 5. The mobile communication system 120 of the present embodiment is different from the mobile communication system 110 of the first embodiment in that the master unit 18 is provided with a pattern 1 attenuation factor changer 40 instead of the attenuation factor changer 26. This pattern 1 attenuation factor changer 40 selects one of signals from the plurality of slave units, 12, 14, 16 in a predetermined order, and changes the combination of attenuation factors D(i) associated with the respective slave units 12, 14, 16 so as to attenuate only the selected signal more than the other signals.

FIG. 6 shows an example of the combinations of attenuation factors D(i) used by the pattern 1 attenuation factor changer 40. In the case of the system being provided with three slave units 12, 14, 16 as in the present embodiment, for example, the initial (i=1) combination can be D(1)={1, 0, 0}, the second (i=2) combination D(2)={0, 1, 0}, and the third (i=3) combination D(3)={0, 0, 1}. In the case of the system including N slave units, for example, the first combination can be D(1)={1, 0, . . . , 0}, the ith combination D(i)={0, . . . , 0, 1, 0, . . . , 0}, and the last (i=M=N) combination D(N)={0, . . . , 0, 1}, wherein the number M of combinations of attenuation factors becomes equal to the number N of slave units.

The term "attenuation factor $D_j(i)=1$" here means that the signal from the jth slave unit is attenuated to a power negligible relative to the other signals, and the term "attenuation factor $D_j(i)=0$" means that the signal from the jth slave unit is not attenuated. Namely, the combination of attenuation factors D(i) in this example is set so that only a signal from one slave unit selected in order from the plurality of slave units is largely attenuated while signals from the other slave units are not attenuated. Although the example of the combinations is so set that the attenuation factor for the selected signal is 1 while the attenuation factor for the unselected signals is 0, the combinations of attenuation factors may be determined arbitrarily without having to be limited to this example, as long as the attenuation factor for the selected signal is larger than the attenuation factors for the unselected signals.

When $T_1$ represents the prescribed time corresponding to an increase of i in the combination of attenuation factors D(i), the received power measuring device 28 acquires a measured value of the power P(i) under the varying combination of attenuation factors D(i) at every interval of $T_1$. By letting the slave units 12, 14, and 16 correspond to j=1, 2, and 3, respectively, and adopting the aforementioned combination of attenuation factors D(i), only the signal received by the slave unit 12 is selectively attenuated so as to be negligible in power relative to the other signals in the interval $T_1$, the powers of the signals received by the slave units 14, 16 become dominant, and the signals are combined into a resultant signal by the signal combiner 22. Only the signal received by the slave unit 14 is selectively attenuated so as to be negligible in power relative to the other signals in the interval $T_2$, the powers of the signals received by the slave units 12, 16 become dominant, and the signals are combined into a resultant signal. Furthermore, only the signal received by the slave unit 16 is selectively attenuated so as to be negligible in power relative to the other signals in the interval $T_3$, the powers of the signals received by the slave units 12, 14 become dominant, and the signals are combined into a resultant signal. By comparing these resultant signals, therefore, it is feasible to readily capture the magnitude relation of the powers of the signals received from the mobile station 10 by the respective slave units.

Figure 7:
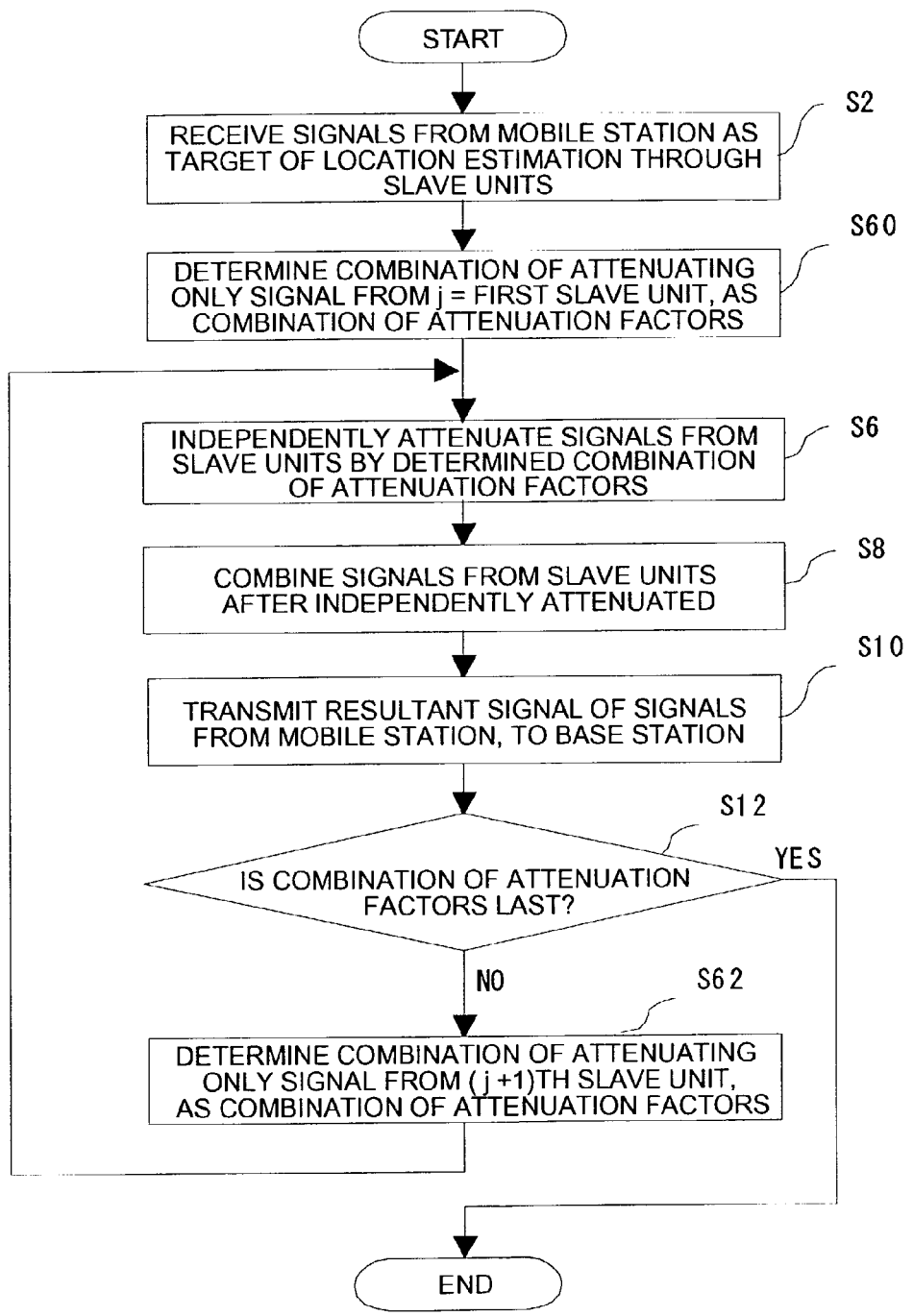
FIG. 7 is a chart showing the processing flow of the master unit in the mobile communication system of FIG. 5.

The following will describe the processing flow of the master unit 18 in the mobile communication system 120 of the present embodiment in the configuration adopting the aforementioned combinations of attenuation factors D(i) with reference to FIG. 7. The master unit 18 first receives each of the signals that the slave units received from the mobile station 10 as a target for estimation of location, from the plurality of slave units 12, 14, 16 (S2), as in the first embodiment. Subsequently, the master unit 18 first settles the combination D(1) to selectively attenuate only the signal from j=the first slave unit, as the combination of attenuation factors D(i) (S60).

After the determination of the combination of attenuation factors, as in the first embodiment, the master unit 18 attenuates the signals from the plurality of slave units 12, 14, 16 by the determined combination of attenuation factors D(i) independently of each other (S6), the master unit 18 then combines those signals into a resultant signal (S8), and the master unit 18 transmits the resultant signal to the base station 20 (S10).

If the combination of attenuation factors is not the last combination D(M) (S12), the combination of attenuation factors D(i+1) to selectively attenuate only the signal from the next slave unit (the (j+1)th slave unit being the next slave unit to the jth unit) is determined as the combination of attenuation factors D(i) (S62), and the processing returns to S6. When the combination of attenuation factors is the last combination of attenuation factors D(M) on the other hand (S12), the processing is terminated. Then the base station 20 estimates the distances between the mobile station 10 and the slave units 12, 14, 16 and estimates the location of the mobile station 10 in much the same manner as in the first embodiment.

In the present embodiment, as described above, only a signal received by one slave unit selected in order from the plurality of slave units 12, 14, 16 is adequately attenuated relative to the signals from the other slave units at every change in the combination of attenuation factors, and the signals thus attenuated are then combined into a resultant signal. The greater the power of the signal received by each slave unit selected in the attenuation than the powers of the signals received by the other slave units, i.e., the nearer the selected slave unit to the mobile station 10, the relatively smaller the magnitude of the power of each resultant signal obtained in this way becomes. Therefore, the magnitude relation of the powers received by the respective slave units is readily obtained by comparing the information about the powers of the resultant signals with each other.

(Third Embodiment)

Figure 8:
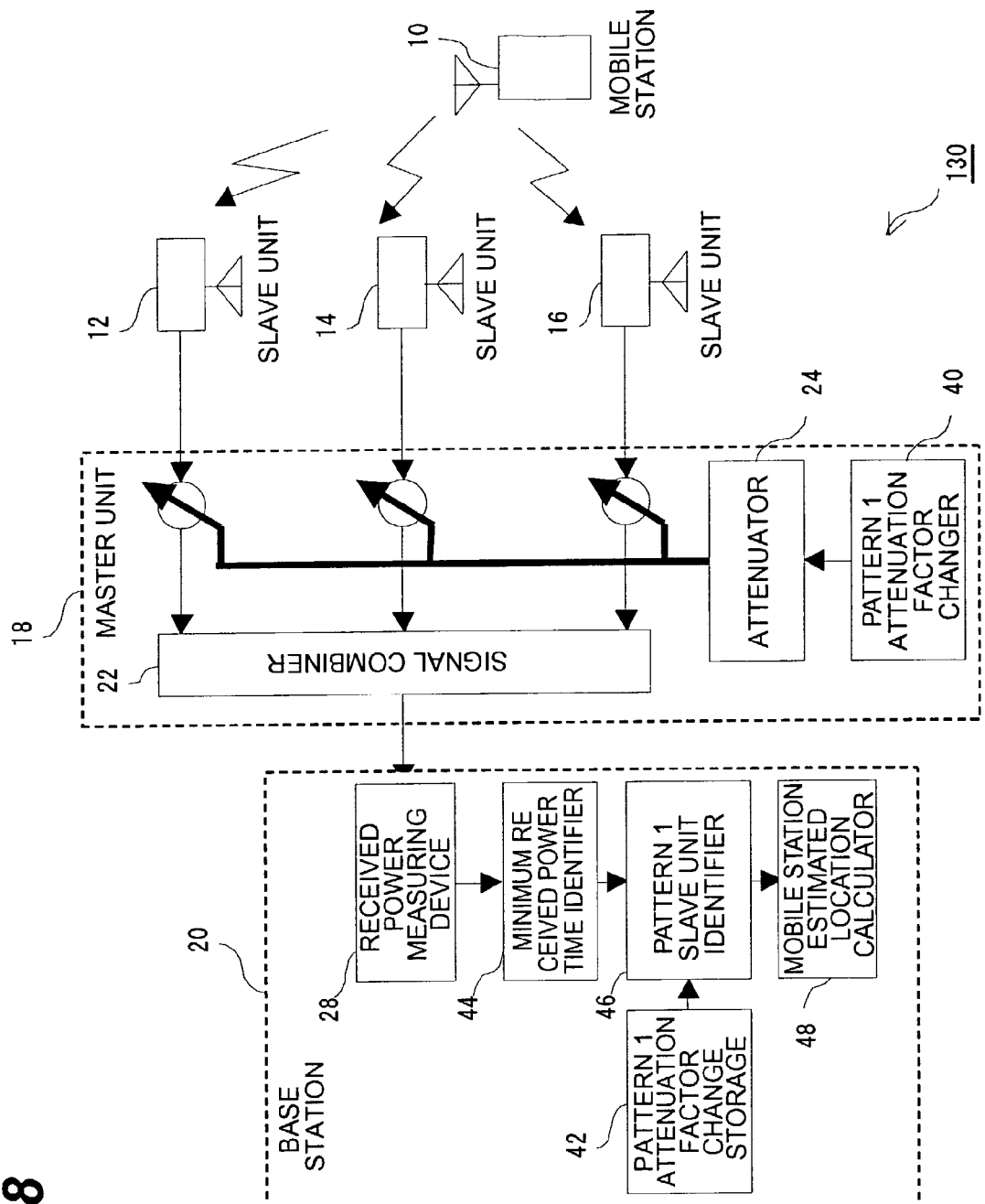
FIG. 8 is an illustration showing the configuration of the mobile communication system in the third embodiment.

The next will describe a configuration of a third embodiment with reference to FIG. 8. The mobile communication system 130 of the present embodiment is different from the mobile communication system 120 of the second embodiment in that the base station 20 is provided with the following elements instead of the attenuation factor change storage 31, comparator 30, and nearest slave unit location identifier 32: a minimum received power time identifier 44 which identifies a minimum of power P(i) on the basis of the power P(i) measured by the received power measuring device 28 and acquires a point of time (i) corresponding to this minimum; a pattern 1 attenuation factor change storage 42 which stores the attenuation pattern D(i) in the pattern 1 attenuation factor changer 40 of the master unit 18; a pattern 1 slave unit identifier 46 which identifies a slave unit corresponding to a signal selected in the master unit 18 at the point of time (i) acquired by the minimum received power time identifier 44 on the basis of the combinations of attenuation factors D(i) stored in the pattern 1 attenuation factor change storage 42; and a mobile station estimated location calculator (mobile station location acquiring means) 48 which acquires the installation location of the identified slave unit as the location of the mobile station 10. The minimum received power time identifier 44 and the pattern 1 slave unit identifier 46 constitute the minimum-correspondent slave unit identifying means.

Figure 9:
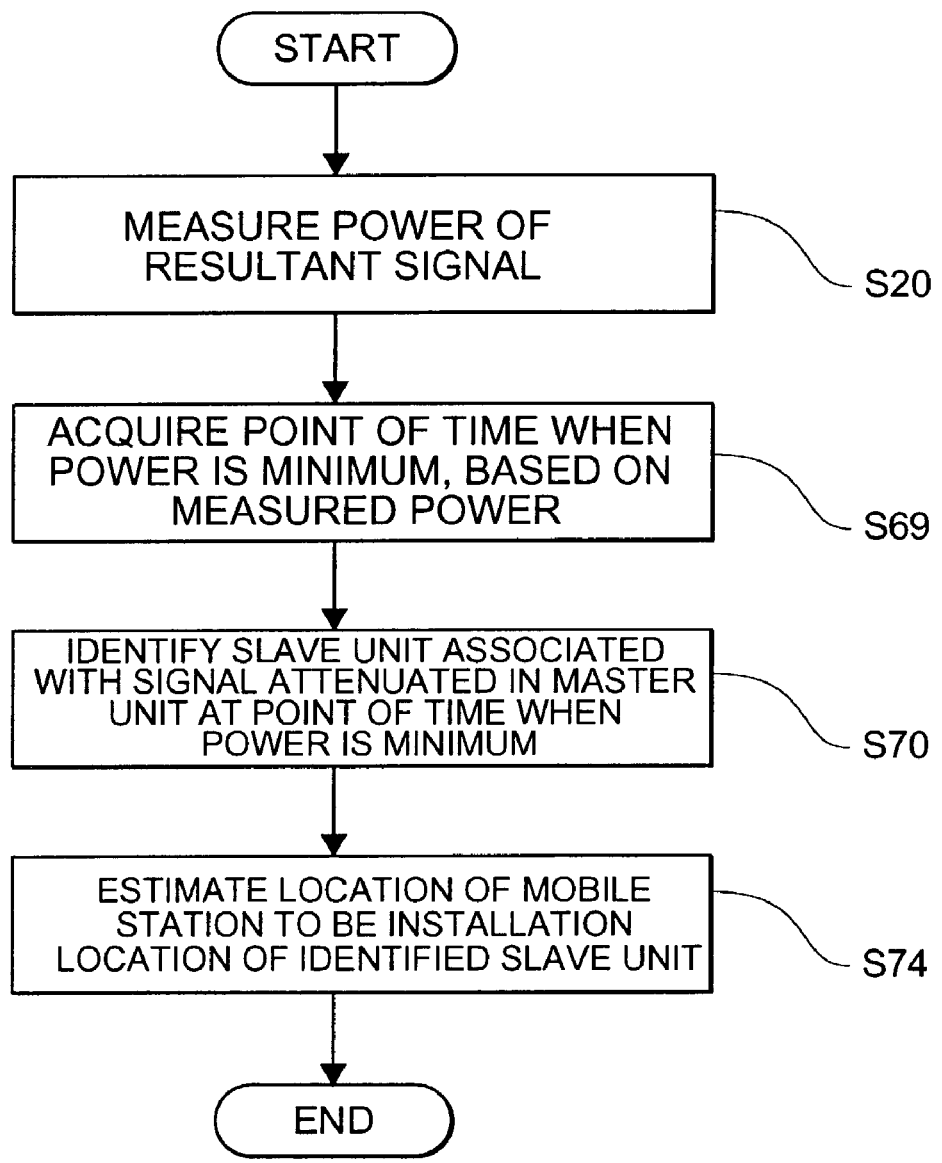
FIG. 9 is a chart showing the processing flow of the base station in the mobile communication system of FIG. 8.

FIG. 9 presents the processing flow of the base station 20 in the mobile communication system 130 of the present embodiment. The base station 20 first receives the signal R(i) corresponding to each combination of attenuation factors D(i), transmitted from the master unit 18, and measures its power P(i) (S20), as in the second embodiment.

Then the base station 20 identifies the minimum of power P(i) on the basis of the powers P(i) and acquires the point of time (i) corresponding to the minimum (S69), and the base station 20 compares the point of time (i) yielding the minimum, with the combinations of attenuation factors D(i) stored in the pattern 1 attenuation factor change storage 42 to identify the slave unit corresponding to the signal selectively attenuated in the master unit 18 at the point of time i when the received power is minimum (S70).

Then the mobile station estimated location calculator 48 identifies the installation location of the identified slave unit as the estimated location of the mobile station 10 (S74).

Figure 10:
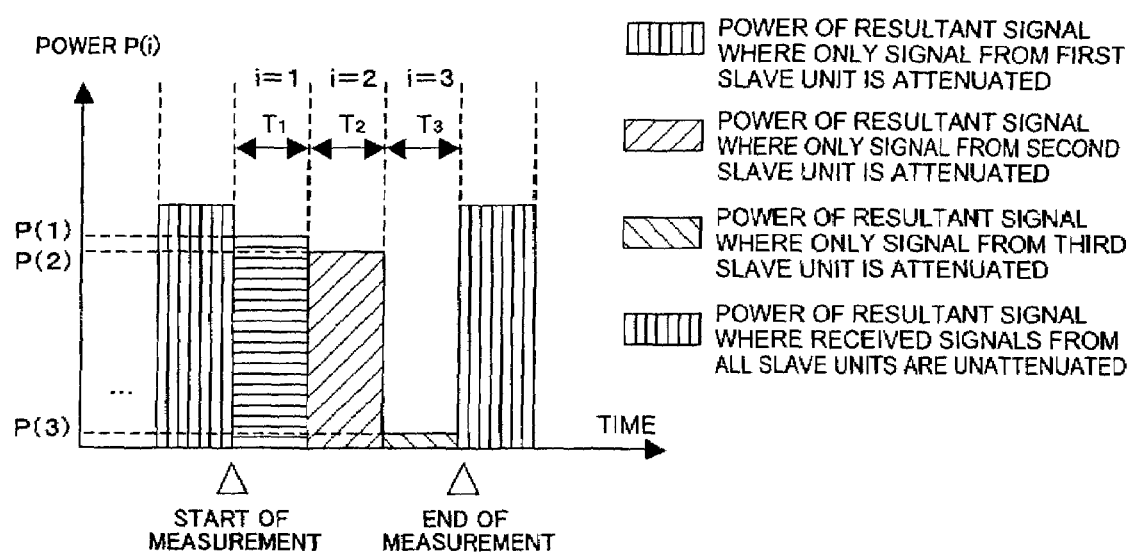
FIG. 10 is a diagram showing an example of change of received powers acquired by the received power measuring device in the mobile communication system of FIG. 8.

Here FIG. 10 shows an example of the powers P(i) measured by the received power measuring device 28 of the base station 20 in the present embodiment. The example herein shows a case adopting the combinations of attenuation factors D(i) of FIG. 6 in the second embodiment. By adopting the combinations of attenuation factors D(i), as described above, the power P(1) measured in the interval $T_1$ becomes the power of the resultant signal of the signals received by the slave units 14, 16, the power P(2) measured in the interval $T_2$ becomes the power of the resultant signal of the signals received by the slave units 12, 16, and the power P(3) measured in the interval $T_3$ becomes the power of the resultant signal of the signals received by the slave units 12, 14.

The minimum among the powers P(1), P(2), and P(3) is the power P(3) and the point of time yielding the minimum is i=3. It is then seen that the slave unit corresponding to the signal selectively attenuated at this time i=3 is the slave unit 16 and that the power of the signal received by the slave unit 16 is the largest, and it can thus be estimated that the mobile station 10 is located nearest to the slave unit 16, as compared with the other slave units.

As described above, the mobile communication system 130 of the third embodiment is configured to acquire the minimum out of the powers of the resultant signals under the respective combinations of attenuation factors and identify one slave unit with the attenuation factor higher than those of the other slave units when the minimum is acquired. Since it is then found that the power of the signal received from the mobile station 10 by the identified slave unit is the largest and that the identified slave unit is nearest to the mobile station 10, the location of the mobile station is suitably estimated by regarding the location of the identified slave unit as the location of the mobile station 10.

(Fourth Embodiment)

Figure 11:
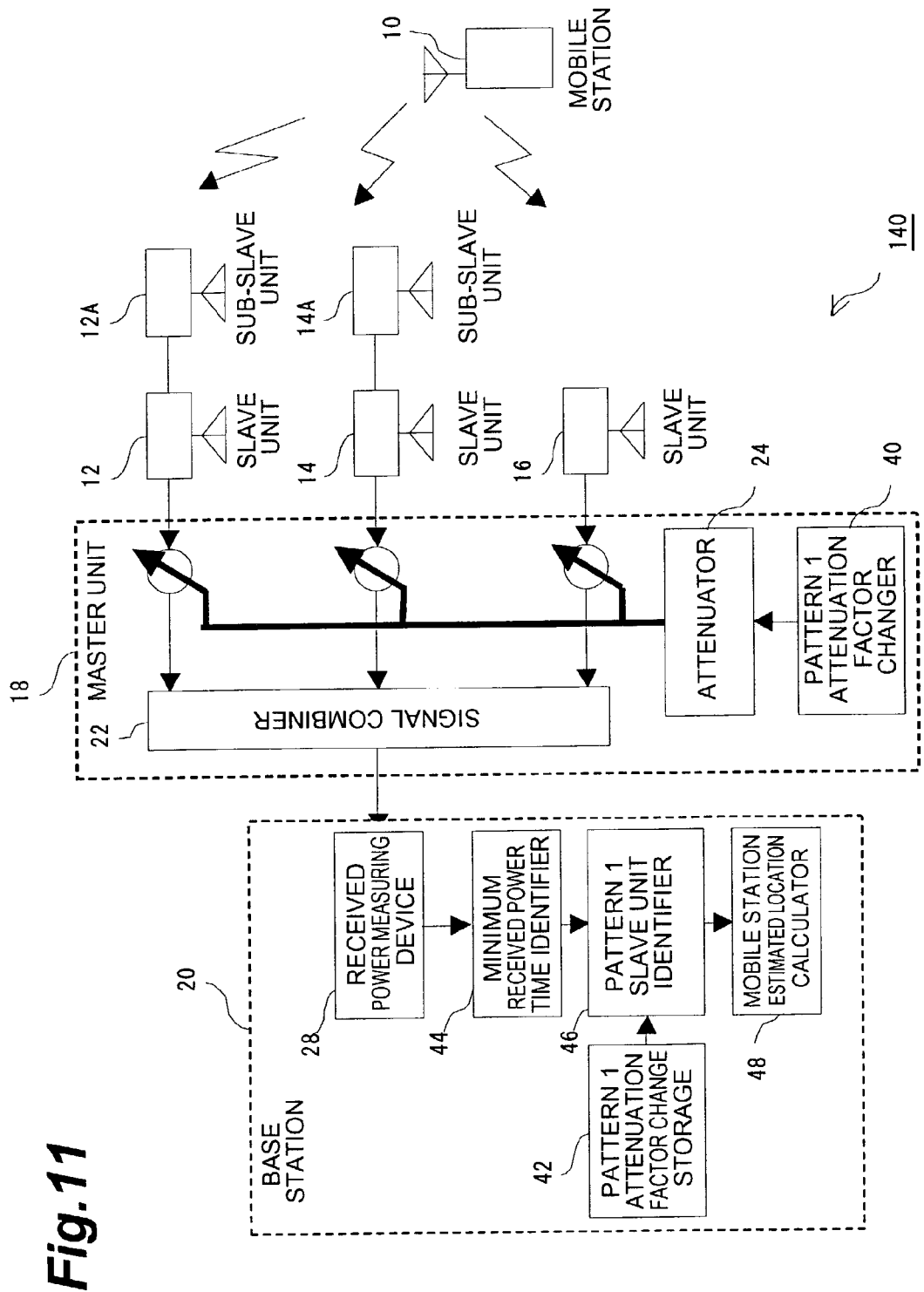
FIG. 11 is an illustration showing the configuration of the mobile communication system in the fourth embodiment.

A configuration of a fourth embodiment will be described below with reference to FIG. 11. The mobile communication system 140 of the present embodiment is different from the mobile communication system 130 of the third embodiment in that sub-slave units 12A, 14A configured to establish radio communication with the mobile station 10 and transmit a signal from the mobile station 10 through the slave unit 12 or the slave unit 14 to the master unit 18 are coupled to the respective slave unit 12, 14.

Figure 12:
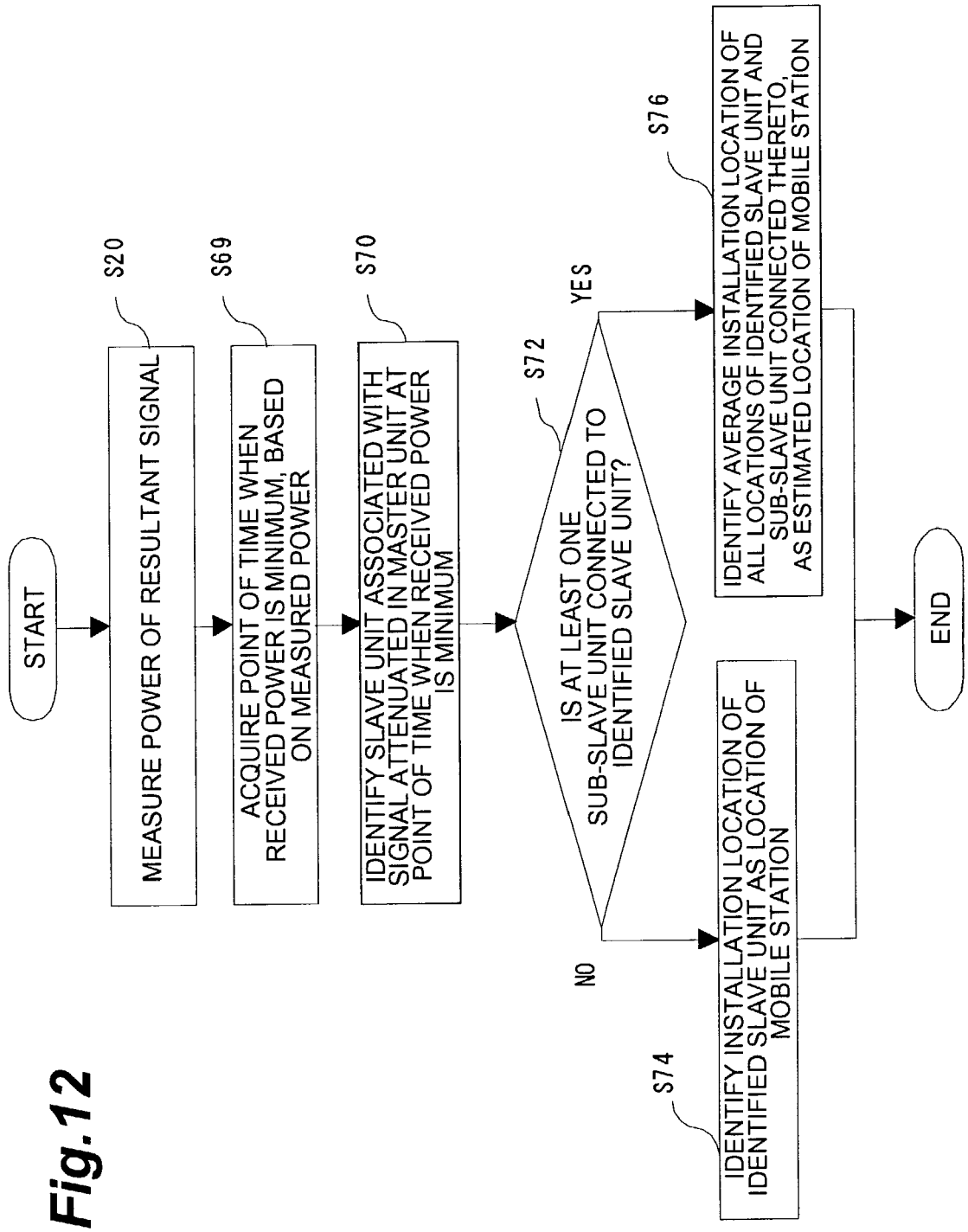
FIG. 12 is a chart showing the processing flow of the base station in the mobile communication system of FIG. 11.

FIG. 12 shows the processing flow of the base station 20 in the mobile communication system 140 of the present embodiment. A resultant signal obtained by combining a signal received by the sub-slave unit 12A and a signal received by the slave unit 12, a resultant signal obtained by combining a signal received by the sub-slave unit 14A and a signal received by the slave unit 14, and a signal received by the slave unit 16 each are attenuated by the predetermined combination of attenuation factors D(i) and the signals thus attenuated are combined into a signal R(i) in the master unit 18 in much the same manner as in the third embodiment. In the base station 20, the power P(i) of the signal R(i) is measured (S20), the point of time i yielding the minimum of the power P(i) is acquired (S69), and a slave unit is identified as one corresponding to the signal selectively attenuated at the point of time i yielding the minimum in the master unit 18 (S70). If no sub-slave unit is coupled to the identified slave unit (S72), the installation location of the identified slave unit is identified as the estimated location of the mobile station 10 (S74).

On the other hand, if a sub-slave unit is coupled to the identified slave unit (S72), an average installation location of all the locations of the identified slave unit and sub-slave unit coupled thereto is identified as the estimated location of the mobile station 10 (S76). For example, when the slave unit 12 is nearest, the estimated location of the mobile station is calculated as $((X_{12}+X_{12A})/2, (Y_{12}+Y_{12A})/2)$, where $(X_{12}, Y_{12})$ is the installation location of the slave unit 12 and $(X_{12A}, Y_{12A})$ is the installation location of the sub-slave unit 12A coupled to the slave unit 12.

According to the mobile communication system 140 of the present embodiment, as described above, the location of the mobile station 10 can be better estimated in the mobile communication system 140 having the sub-slave units 12A, 14A.

(Fifth Embodiment)

Figure 13:
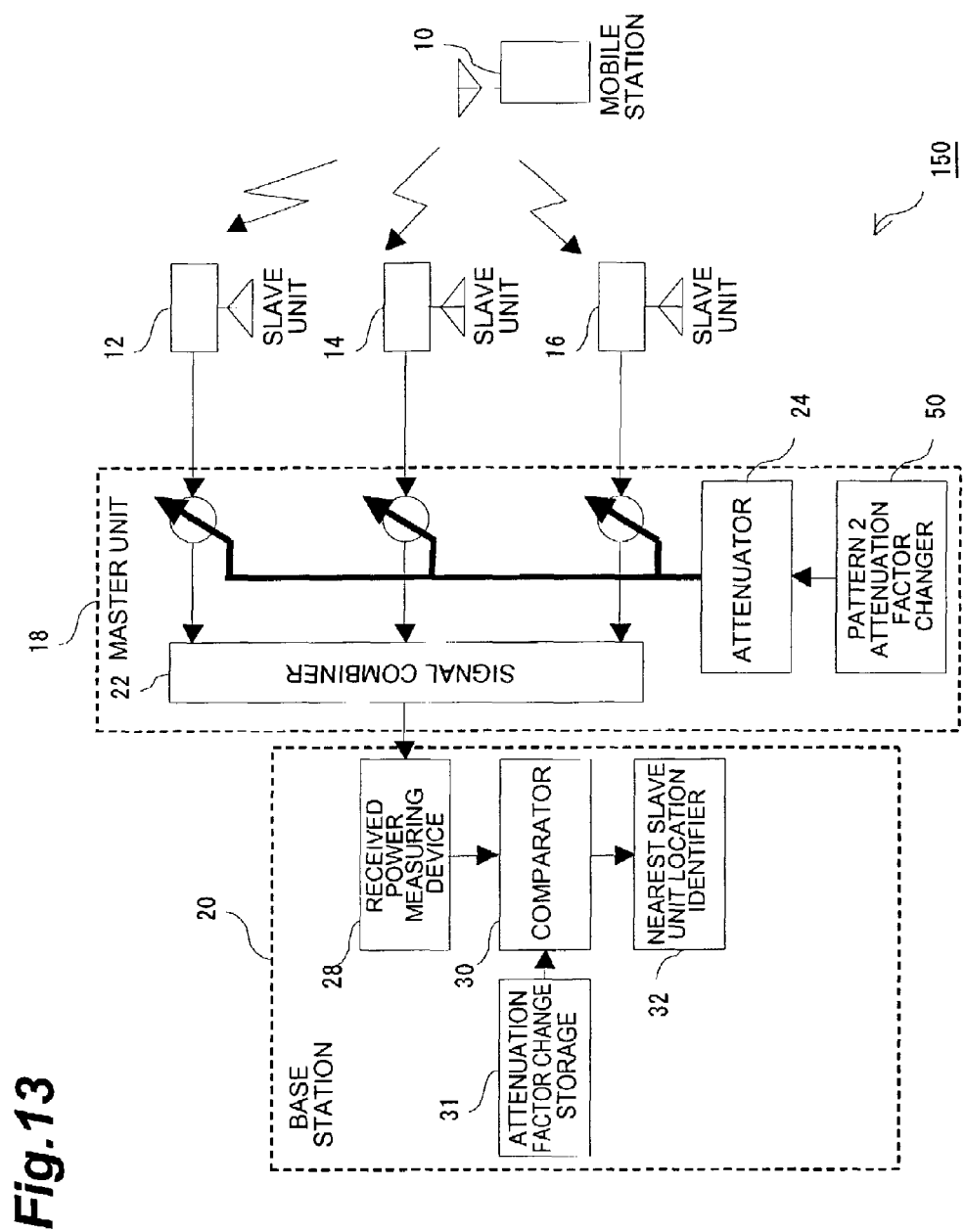
FIG. 13 is an illustration showing the configuration of the mobile communication system in the fifth embodiment.

The following will describe the mobile communication system 150 as a fifth embodiment with reference to FIG. 13. The mobile communication system 150 of the present embodiment is different from the mobile communication system 120 of the second embodiment in that the master unit 18 is provided with a pattern 2 attenuation factor changer 50 configured to select one of signals from the plurality of slave units 12, 14, 16 in a predetermined order and change the combination of attenuation factors associated with the respective slave units 12, 14, 16 so that the attenuation factor associated with the selected signal is lower than the attenuation factors associated with the other signals, instead of the pattern 1 attenuation factor changer 40.

FIG. 14 shows an example of the combinations of attenuation factors D(i) of the pattern 2 attenuation factor changer 50 in the present embodiment. The combinations of attenuation factors D(i) in the present embodiment including three slave units can be, for example, such that the initial (i=1) combination is D(1)={0, 1, 1}, the second (i=2) combination D(2)={1, 0, 1}, and the third (i=3) combination D(3)={1, 1, 0}. In the case of the system including N slave units, the combinations can be set, for example, so that the initial combination is D(1)={0, 1, . . . , 1}, the ith combination D(i)={1, . . . , 1, 0, 1, . . . , 1}, and the last (i=M=N) combination D(N)={1, . . . , 1, 0}. The number M of combinations of attenuation factors becomes equal to the number N of slave units. Although the combinations are so set that the attenuation factor of the selected signal is 0 while the attenuation factor of the unselected signals is 1, the combinations may be determined arbitrarily without having to be limited to this example, as long as the attenuation factor of the selected signal becomes smaller than the attenuation factors of the unselected signals.

According to the combinations of attenuation factors D(i) in FIG. 14, the signals received by the slave units 14, 16 are attenuated so as to be negligible in power relative to the signal received by the slave unit 12 in the interval $T_1$, and the signals thus attenuated are combined into a resultant signal while the power of the signal received by the slave unit 12 is dominant. Similarly, the signals received by the slave units 12, 16 are attenuated so as to be negligible in power relative to the signal received by the slave unit 14 in the interval $T_2$, and the signals thus attenuated are combined into a resultant signal while the power of the signal received by the slave unit 14 is dominant. In the interval $T_3$ the signals received by the slave units 12, 14 are attenuated so as to be negligible in power relative to the signal received by the slave unit 16, and the signals thus attenuated are combined into a resultant signals while the power of the signal received by the slave unit 16 is dominant. By comparing these resultant signals, therefore, it is feasible to readily grasp the magnitude relation of the powers of the signals received from the mobile station 10 by the respective slave units 12, 14, 16.

Figure 15:
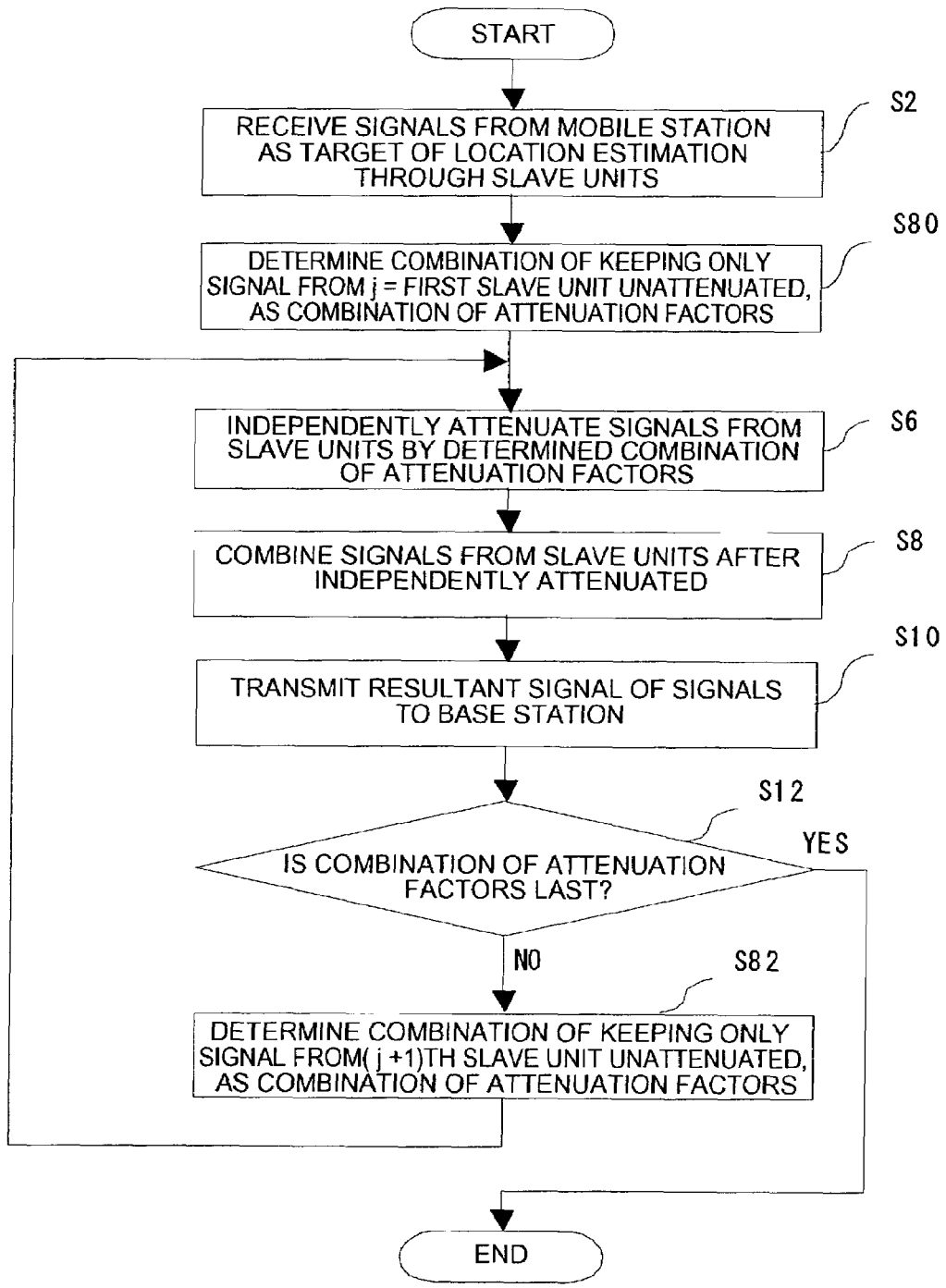
FIG. 15 is a chart showing the processing flow of the master unit in the mobile communication system of FIG. 13.

FIG. 15 presents the processing flow of the master unit 18 in the mobile communication system 150 according to the present embodiment in the configuration adopting the aforementioned combinations of attenuation factors D(i). The master unit 18 first receives each of the signals from the mobile station 10 as a target for estimation of location, from the plurality of slave units 12, 14, 16 (S2), as in the second embodiment. Subsequently, the pattern 2 attenuation factor changer 50 of the master unit 18 first determines the combination of keeping only the signal from j=the first slave unit selectively unattenuated, as the combination of attenuation factors D(i) for the signals from the slave units (S80).

After the determination of attenuation factors, the master unit 18 attenuates the signals from the plurality of slave units 12, 14, 16 by the determined combination of attenuation factors D(i) independently of each other (S6) combines those signals into a resultant signal (S8), and transmits the resultant signal R(i) to the base station (S10). If the combination of attenuation factors is not the last combination (S12), the master unit 18 determines the combination of keeping only the next slave unit (the (j+1)th slave unit as the next slave unit to the jth unit) selectively unattenuated, as the combination of attenuation factors D(i) (S82), and the processing returns to S6. When the combination of attenuation factors is the last combination (S12) on the other hand, the processing is terminated. Then the base station 20 carries out the estimation of the location of the mobile station 10 in much the same manner as in the second embodiment.

According to the mobile communication system 150 of the present embodiment, as described above, the signals are combined while only a signal received by one slave unit selected in order from the plurality of slave units 12, 14, 16 at every change in the combination of attenuation factors is almost unattenuated relative to the signals from the other slave units. The greater the power of the signal received by the slave unit selected in the attenuation, than the powers of the signals received by the other slave units, i.e., the nearer the selected slave unit to the mobile station 10, the relatively larger the magnitude of the power of each resultant signal obtained in this way becomes. Therefore, the magnitude relation of the powers received by the respective slave units 12, 14, 16 can be readily obtained by comparing the information about the powers of the resultant signals with each other.

(Sixth Embodiment)

Figure 16:
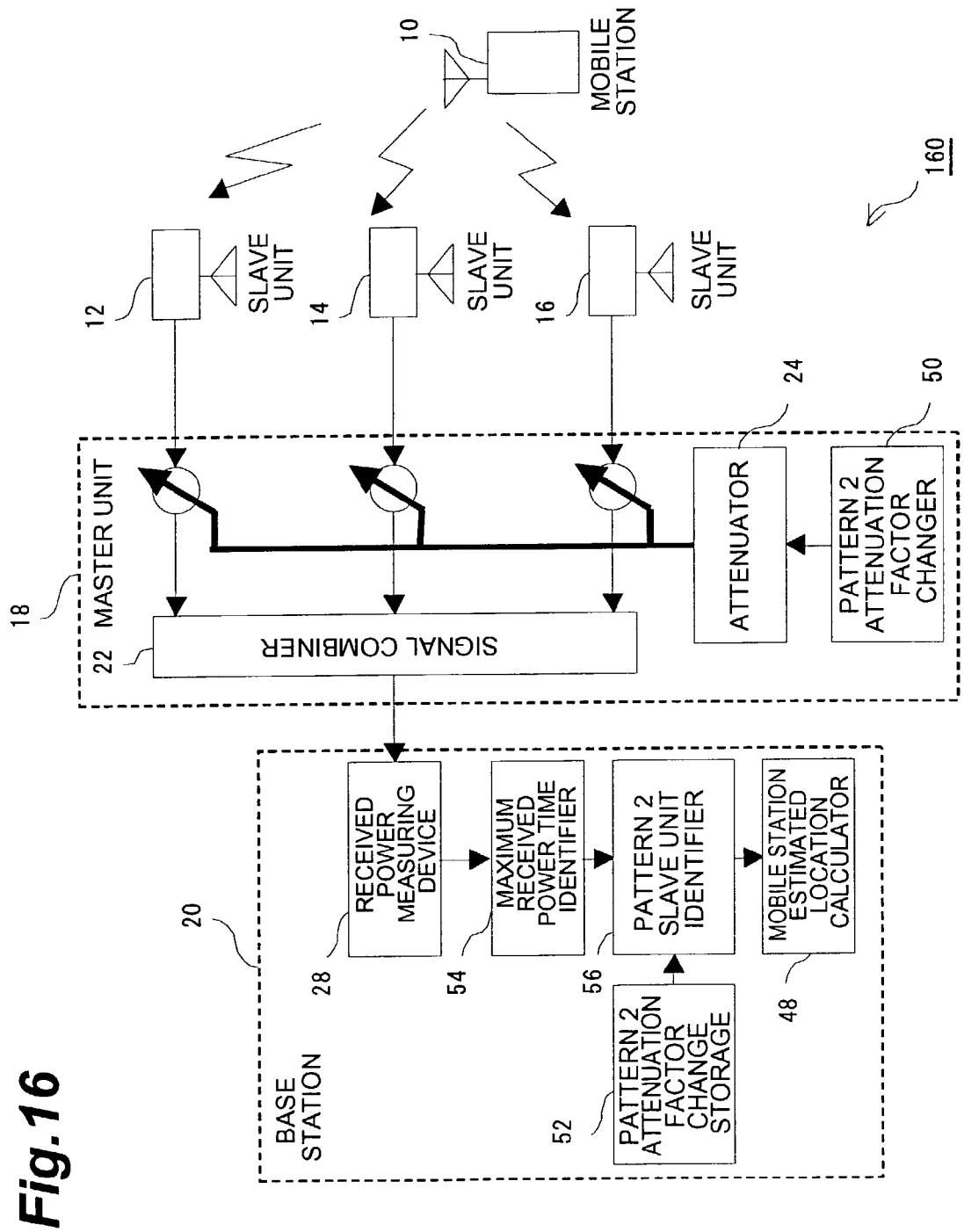
FIG. 16 is an illustration showing the configuration of the mobile communication system in the sixth embodiment.

A configuration of the mobile communication system 160 as a sixth embodiment will be described below with reference to FIG. 16. The mobile communication system 160 of the present embodiment is different from the mobile communication system 150 of the fifth embodiment in that the base station 20 is provided with the following elements instead of the attenuation factor change storage 31, comparator 30, and nearest slave unit location identifier 32: a maximum received power time identifier 54 which identifies a maximum of the powers P(i) on the basis of the powers P(i) measured by the received power measuring device 28 and acquires a point of time (i) corresponding to the maximum; a pattern 2 attenuation factor change storage 52 which stores the combinations of attenuation factors D(i) employed in the pattern 2 attenuation factor changer 50 of the master unit 18; a pattern 2 slave unit identifier 56 which identifies a slave unit corresponding to a signal selected in the master unit 18 at the point of time (i) identified by the maximum received power time identifier 54 on the basis of the temporal change D(i) of the attenuation factors stored in the pattern 2 attenuation factor change storage 52; and a mobile station estimated location calculator 48 which acquires the installation location of the identified slave unit as the location of the mobile station 10. The maximum received power time identifier 54 and the pattern 2 slave unit identifier 56 constitute the maximum-correspondent slave unit identifying means.

Figure 17:
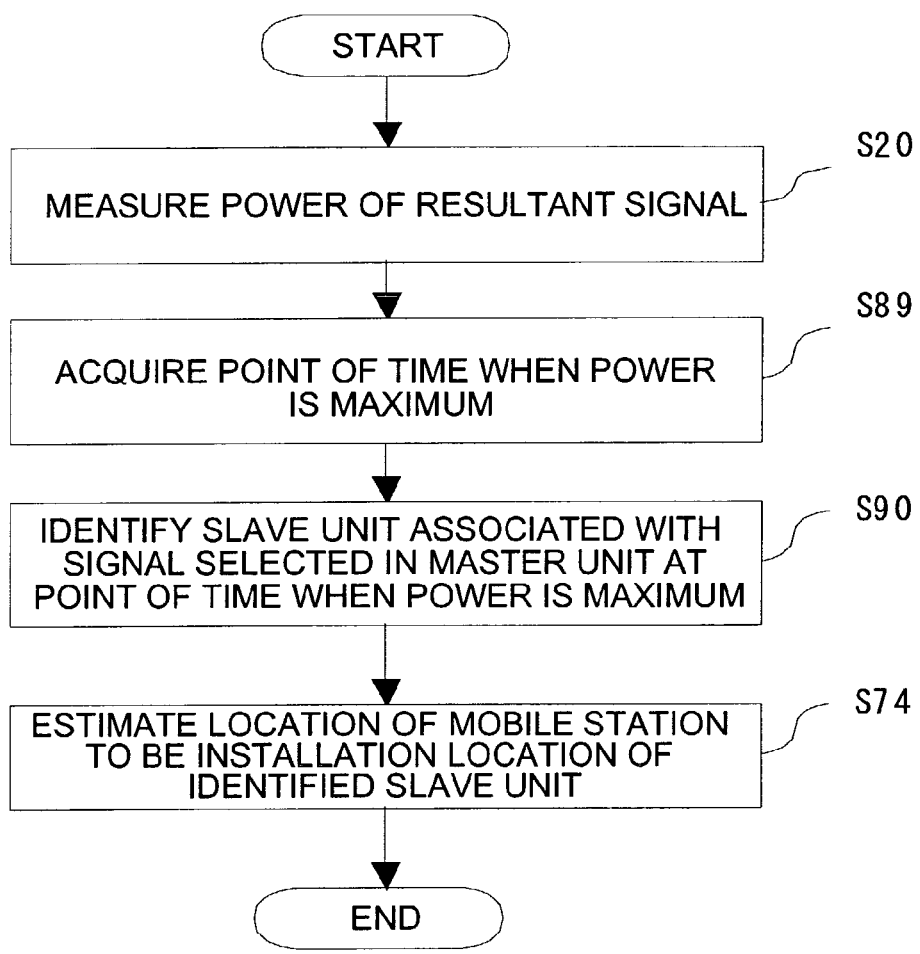
FIG. 17 is a chart showing the processing flow of the base station in the mobile communication system of FIG. 16.

FIG. 17 shows the processing flow of the base station 20 in the present embodiment. The base station 20 first receives the signal R(i) corresponding to each combination of attenuation factors D(i), transmitted from the master unit 18 in much the same manner as in the fifth embodiment, and measures the power P(i) thereof (S20).

Then the base station 20 identifies the maximum of the powers P(i) on the basis of the powers P(i) and acquires the point of time (i) corresponding to this maximum (S89); the base station 20 compares the point of time (i) yielding the maximum, with the combinations of attenuation factors D(i) stored in the pattern 2 attenuation factor change storage 52, and identifies the slave unit associated with the signal selected in the master unit 18 at the point of time when the received power is maximum (S90); the base station 20 identifies the installation location of the identified slave unit as the estimated location of the mobile station 10 (S74).

Figure 18:
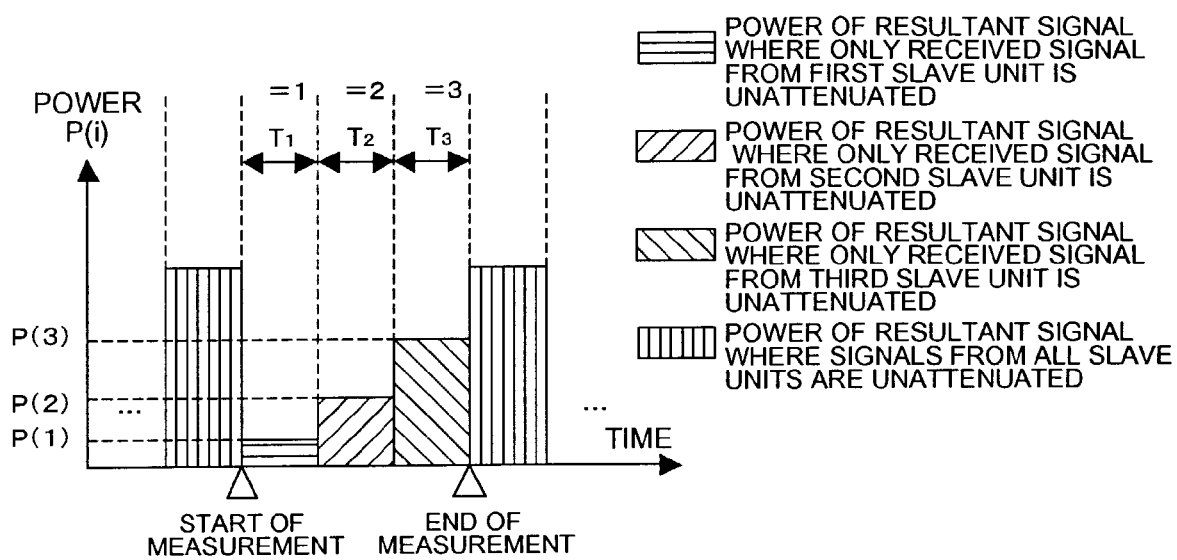
FIG. 18 is a diagram showing an example of change of received powers acquired by the received power measuring device in the mobile communication system of FIG. 16.

FIG. 18 shows an example of the temporal change of the power P(i) measured by the received power measuring device 28 in the present embodiment. This example shows a case employing the combinations of attenuation factors D(i) shown in FIG. 14 of the fifth embodiment.

It is seen that, by adopting the combinations of attenuation factors D(i), the power P(1) measured in the interval $T_1$ becomes the power of the signal received by the slave unit 12, the power P(2) measured in the interval $T_2$ becomes the power of the signal received by the slave unit 14, and the power P(3) measured in the interval $T_3$ becomes the power of the signal received by the slave unit 16. The maximum among the powers P(1), P(2), and P(3) is the power P(3), and the point of time yielding this power is i=3. The slave unit corresponding to the signal selected in the master unit at the time i=3 is the slave unit 16, the power received by the slave unit 16 is the largest, and it can thus be estimated that the mobile station 10 is located nearest to the slave unit 16 relative to the other slave units.

According to the mobile communication system 160 of the present embodiment, as described above, the maximum is acquired out of the powers of the resultant signals under the respective combinations of attenuation factors, and one slave unit is identified as a unit with the attenuation factor smaller than those of the other slave units when the maximum is acquired. Since it is then seen that the power of the signal received from the mobile station 10 by the identified slave unit is the largest as compared with the other signals and that the identified slave unit is nearest to the mobile station 10, the location of the mobile station 10 is suitably estimated by regarding the location of the identified slave unit as the location of the mobile station 10.

(Seventh Embodiment)

Figure 19:
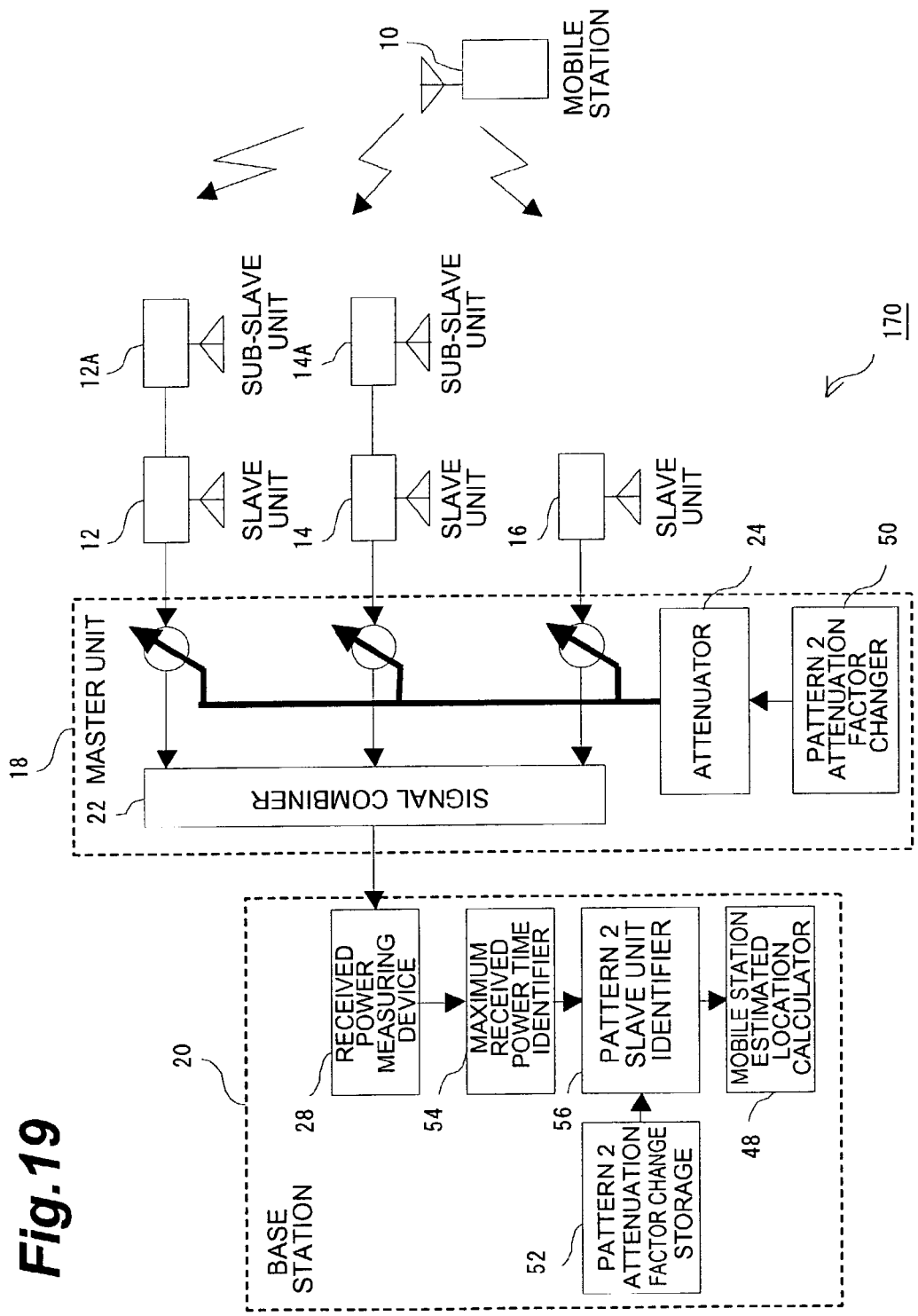
FIG. 19 is an illustration showing the configuration of the mobile communication system in the seventh embodiment.

A configuration of a seventh embodiment will be described below with reference to FIG. 19. The mobile communication system 170 of the present embodiment is different from the mobile communication system 160 of the sixth embodiment in that sub-slave units 12A, 14A configured to establish radio communication with the mobile station 10 and transmit a signal from the mobile station 10 through the slave unit 12 or the slave unit 14 to the master unit 18 are coupled to the respective slave units 12, 14.

Figure 20:
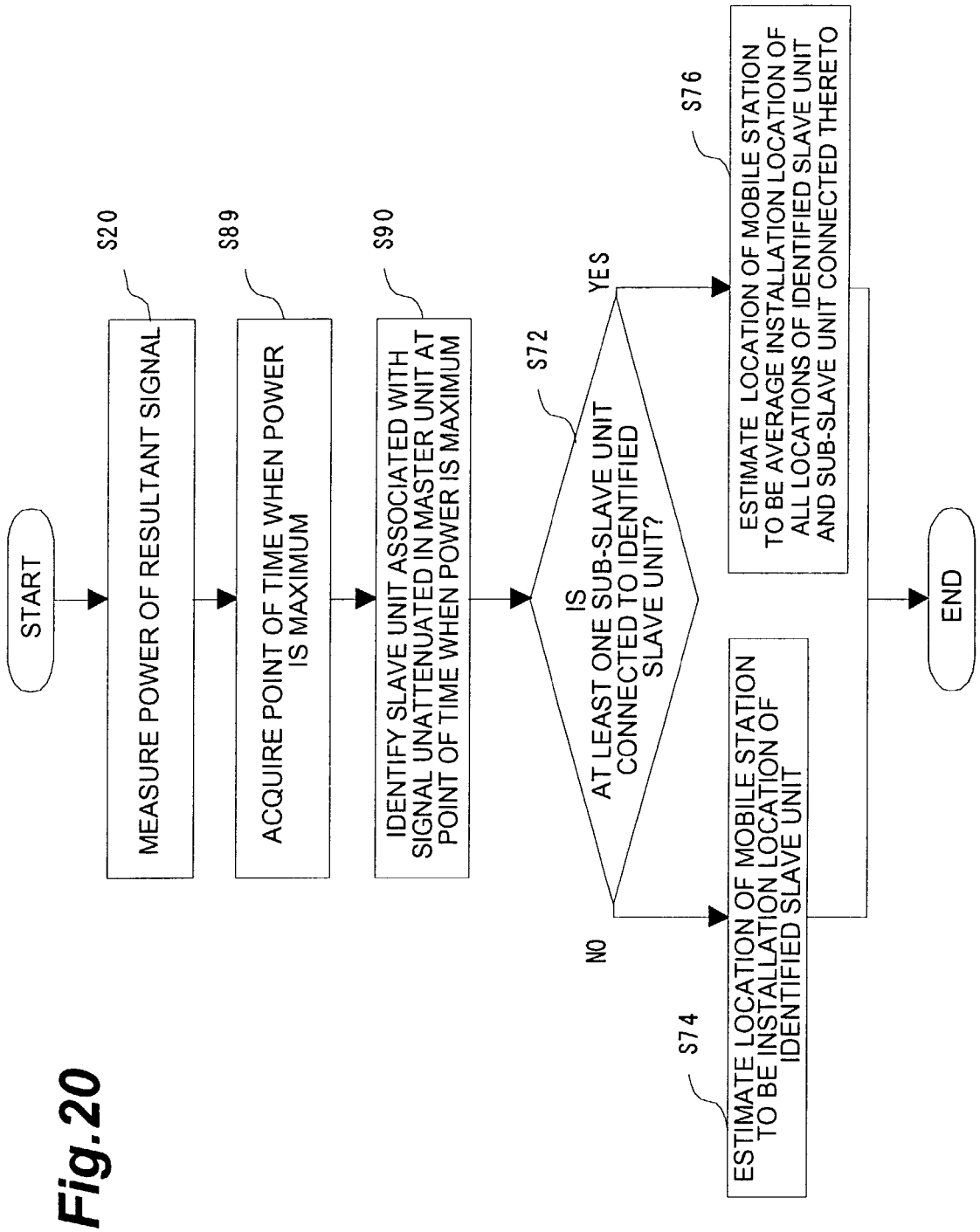
FIG. 20 is a chart showing the processing flow of the base station in the mobile communication system of FIG. 19.

The processing flow of the base station 20 is shown in FIG. 20. The resultant signal of the signal received by the sub-slave unit 12A and the signal received by the slave unit 12, the resultant signal of the signal received by the sub-slave unit 14A and the signal received by the slave unit 14, and the signal received by the slave unit 16 each are attenuated by the predetermined combination of attenuation factors D(i) in the master unit 18 in much the same manner as in the sixth embodiment and the attenuated signals thereafter are combined into the signal R(i). In the base station 20, the power P(i) is measured (S20), the point of time i yielding the maximum of the power P(i) is acquired (S89), and a slave unit is identified as one corresponding to the signal selectively unattenuated in the master unit 18 at the point of time i of the maximum (S90) If no sub-slave unit is coupled to the identified slave unit (S72), the installation location of the identified slave unit is identified as the estimated location of the mobile station (S74).

On the other hand, if a sub-slave unit is coupled to the identified slave unit (S72), an average installation location of all the locations of the identified slave unit and sub-slave unit coupled thereto is identified as the estimated location of the mobile station (S76). For example, when the slave unit 12 is nearest, the estimated location of the mobile station is calculated as $((X_{12}+X_{12A})/2, (Y_{12}+Y_{12A})/2)$, where $(X_{12}, Y_{12})$ is the installation location of the slave unit 12 and $(X_{12A}, Y_{12A})$ is the installation location of the sub-slave unit 12A coupled to the slave unit 12.

According to the mobile communication system 170 of the present embodiment, the location of the mobile station 10 can be better estimated in the mobile communication system 170 having the sub-slave units 12A, 14A.

(Eighth Embodiment)

Figure 21:
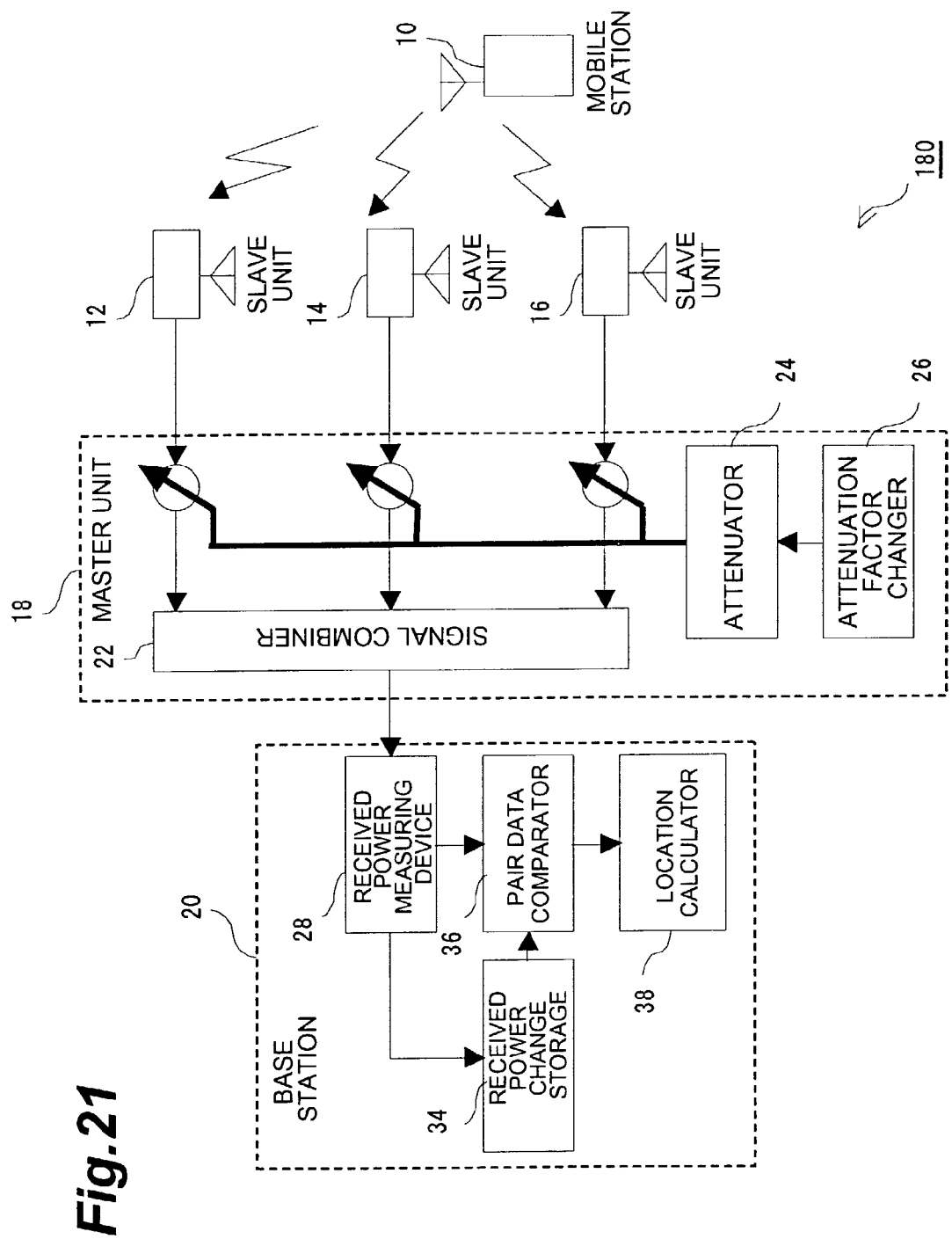
FIG. 21 is an illustration showing the configuration of the mobile communication system in the eighth embodiment.

FIG. 21 shows a configuration of the mobile communication system 180 as an eighth embodiment. The mobile communication system 180 of the present embodiment is different from the mobile communication system 110 of the first embodiment in that the base station 20 is provided with the following elements instead of the attenuation factor change storage 31, comparator 30, and nearest slave unit location identifier 32: a received power change storage (location-specific power change storage means) 34 in which change of the power of the resultant signal with change in the combination of attenuation factors is preliminarily stored in correspondence with locations of the mobile station 10 in an area where the service is provided; a pair data comparator 36 which compares the change of the power measured by the received power measuring device 28, with the change data of the power stored in the received power change storage 34; and a location calculator 38 which estimates the location of the mobile station 10 on the basis of the result of the comparison. The pair data comparator 36 and the location calculator 38 constitute the mobile station location estimating means.

In the mobile communication system 180 of the present embodiment, preliminarily, the mobile station 10 is located at a plurality of sites in the service providing area, the power P(i) corresponding to the combination of attenuation factors D(i) is acquired at each of the sites in the base station 20, and the powers P(i) are stored in correspondence with the locations of the mobile station 10. Let $P_k(i)$ be the power P(i) of the resultant signal obtained from the mobile station 10 present at the kth site, where k=1, 2, . . . , or K. K indicates the number of sites.

Figure 22:
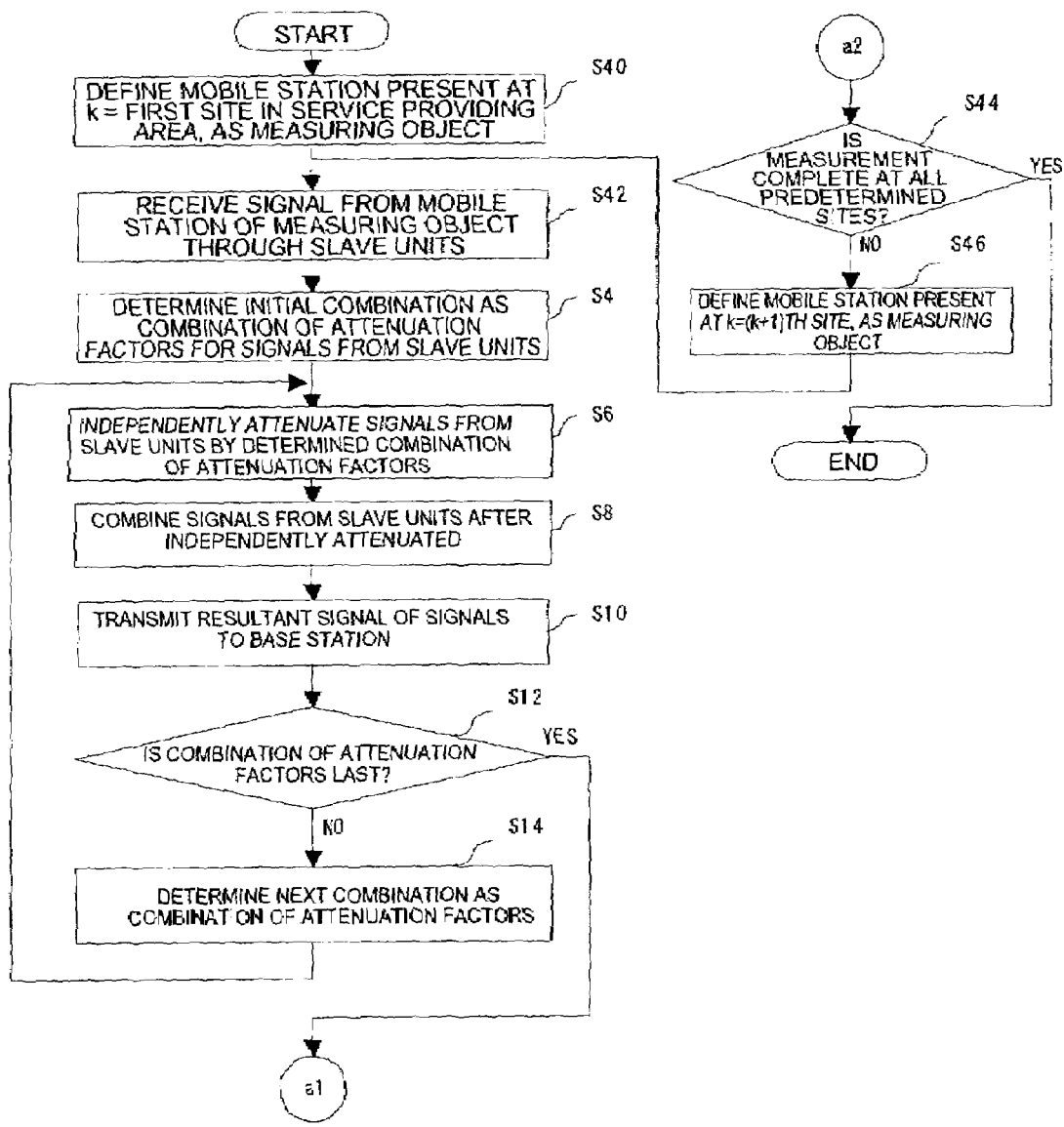
FIG. 22 is a chart showing the flow of processing of the master unit on the occasion of preliminarily storing the temporal change of the power of the signal from the mobile station at each predetermined location in the service providing area, in the mobile communication system of FIG. 21.

Specifically, as shown in FIG. 22, the master unit 18 first identifies the mobile station 10 present at k=the first site, as a measuring object (S40), and receives signals from the mobile station 10 as a measuring object through the plurality of slave units 12, 14, 16 (S42). Subsequently, the attenuation factor changer 26 determines the attenuation factors for the respective signals from the slave units 12, 14, 16 by the first (i=1) combination out of the predetermined combinations of attenuation factors D(i) (S4), the attenuator 24 of the master unit 18 attenuates the signals from the plurality of slave units 12, 14, 16 by the determined combination of attenuation factors D(i) independently of each other (S6), and the signal combiner combines those signals into a resultant signal (S8) and transmits the resultant signal R(i) to the base station 20 (S10). If the combination of attenuation factors D(i) is not the last combination D(M) (S12), the combination of attenuation factors D(i) is switched to the next attenuation pattern (the (i+1)th combination as the next combination to the ith combination) (S14), and the processing returns to S6. On the other hand, if the combination of attenuation factors D(i) is the last combination of attenuation factors D(M) (S12), the processing is terminated to transfer to the processing in the base station 20 (flowchart connector a1).

Figure 23:
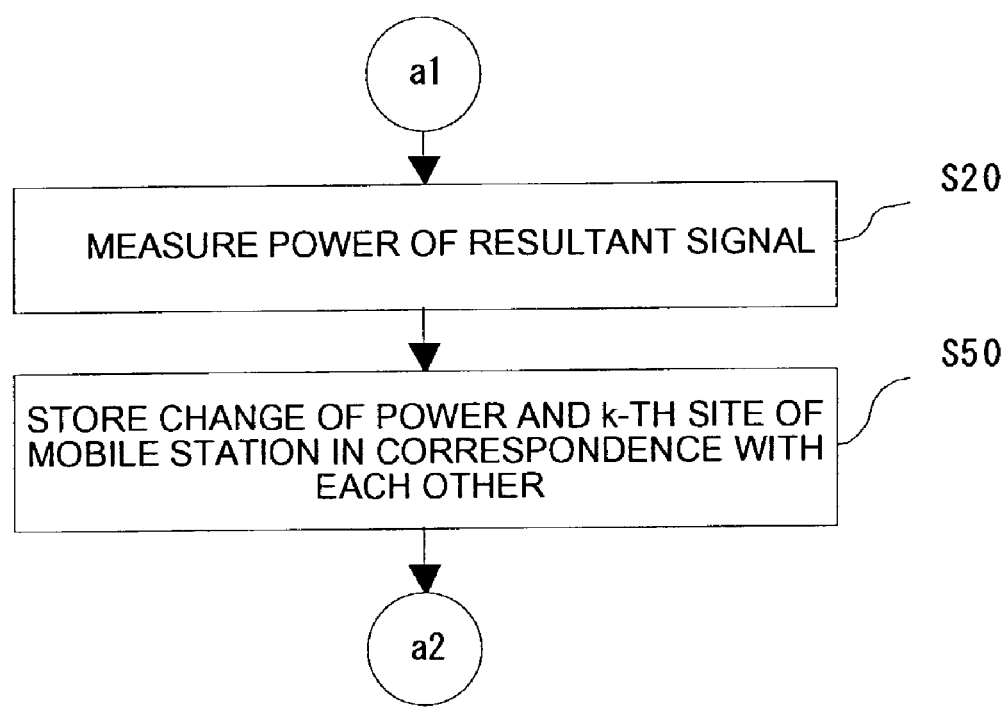
FIG. 23 is a chart showing the flow of processing of the base station on the occasion of preliminarily storing the temporal change of the power of the signal from the mobile station at each predetermined location in the service providing area, in the mobile communication system of FIG. 21.

In the base station 20, as shown in FIG. 23, the power $P_k(i)$ of the resultant signal R(i) corresponding to each combination of attenuation factors D(i), transmitted from the master unit 18, is measured (S20), the power $P_k(i)$ at the kth site is stored in correspondence with the location of the kth site (S50), and the processing transfers to the processing in the master unit (flowchart connector a2). At this time, the combinations of attenuation factors D(i) used in the attenuation factor changer 26 are also stored in correspondence with the powers.

In the master unit 18, as shown in FIG. 22, it is determined whether the measurement is complete at all the K sites (S44). When it is incomplete, the measuring object is defined as the mobile station 10 present at the next site (S46), and the processing returns to S42. When the measurement is complete at all the K sites (S44) on the other hand, the processing is terminated.

Figure 24:
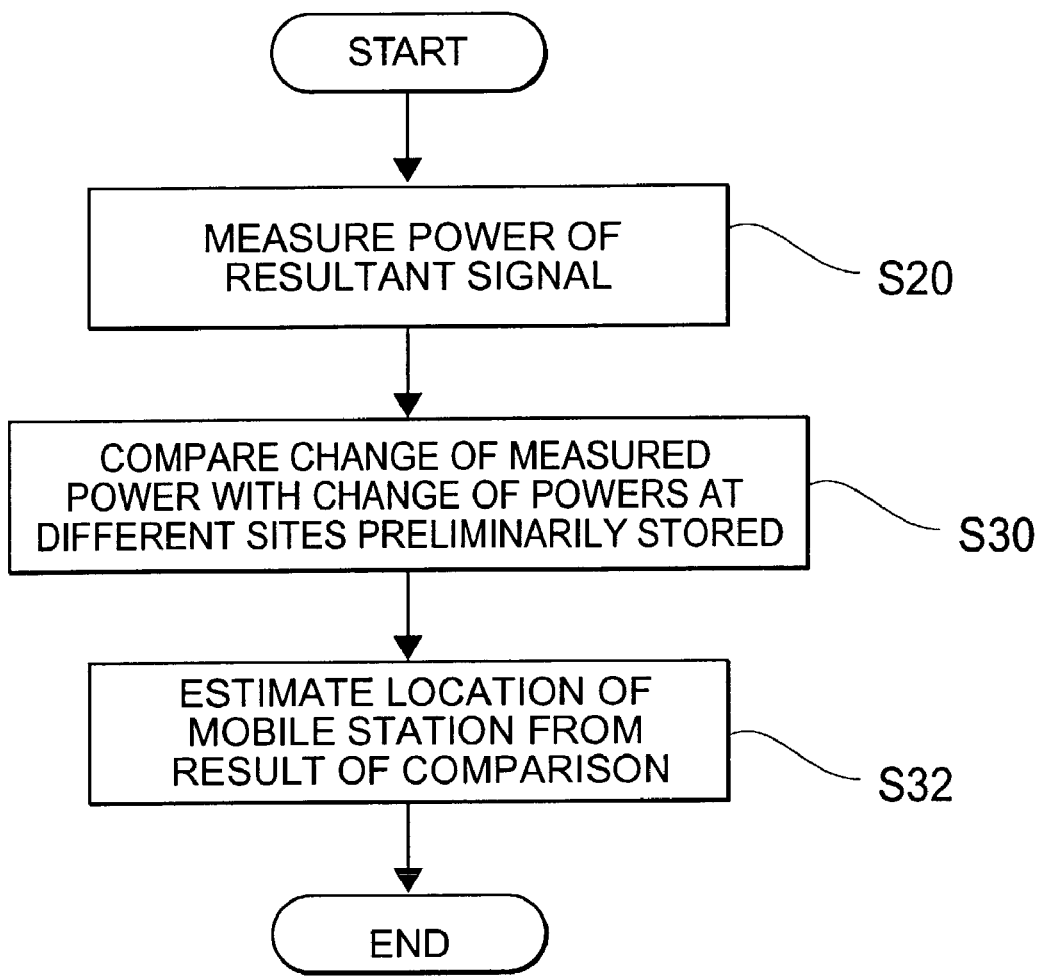
FIG. 24 is a chart showing the processing flow of the base station in estimation of location of the mobile station in the mobile communication system of FIG. 21.

FIG. 24 shows the processing flow of the base station 20 in the mobile communication system 180 of the present embodiment. In the base station 20, receiving the resultant signal R(i) after the attenuation by the predetermined combination of attenuation factors D(i) in the master unit 18 as in the first embodiment, the received power measuring device 28 first measures the power P(i) (S20), the pair data comparator 36 compares the power P(i) measured in the received power measuring device 28, with the power $P_k(i)$ corresponding to each location k of the mobile station 10 preliminarily stored in the received power change storage 34 (S30), and the location of the mobile station 10 is estimated from the result of the comparison (S32). In this case, for example, it is preferable to use the performance function as presented in Eq (1) below to estimate the estimated location of the mobile station 10 to be the kth site yielding the smallest $\delta_k$, i.e., a location corresponding to the least square error from the measured power P(i) out of the powers $P_k(i)$ stored in the received power change storage 34.

$$\delta_k = \sum_{i=1}^{M} |P_k(i) - P(i)|^2, k = 1, 2, \ldots, K \quad (1)$$

According to the mobile communication system 180 of the present embodiment, as described above, the change of the power of the resultant signal due to the change in the combination of attenuation factors is preliminarily stored corresponding to each location of the mobile station 10 in the form of a database, and a change of power acquired for the mobile station 10 at an unknown location is compared with this database, whereby the location of the mobile station 10 can be readily estimated.

(Ninth Embodiment)

Figure 25:
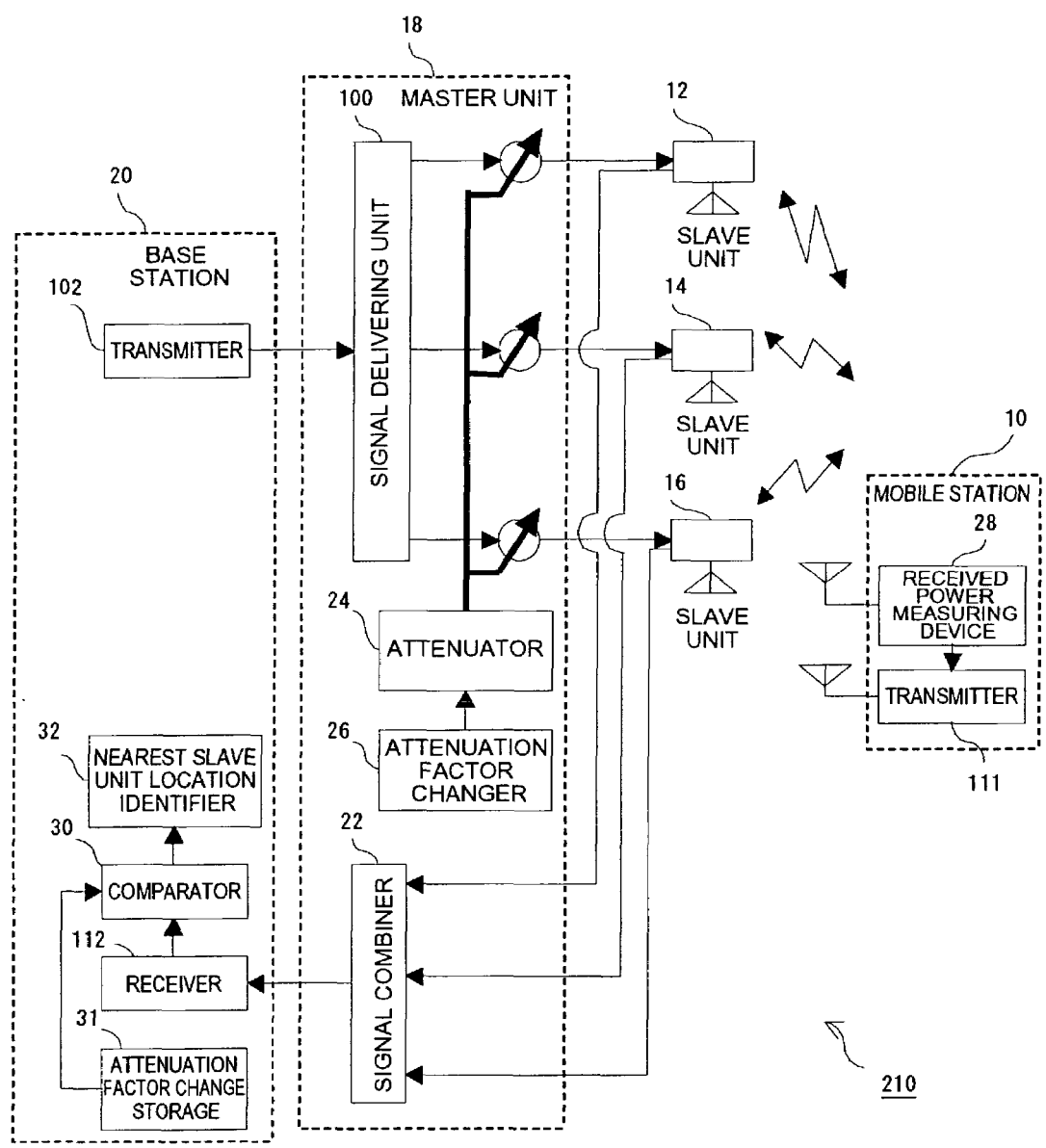
FIG. 25 is an illustration showing the configuration of the mobile communication system in the ninth embodiment.

The mobile communication system 210 as a ninth embodiment will be described below with reference to FIG. 25. The mobile communication system 210 of the present embodiment is different from the mobile communication system 110 of the first embodiment in that the system is provided with a transmitter 102 which is installed in the base station 20 and which transmits a signal from the base station 20 to the master unit 18; and a signal delivering unit 100 which is installed in the master unit 18 and which is configured to deliver the signal from the transmitter 102 to transmit it to each of the slave units 12, 14, 16, and make the slave units 12, 14, 16 radio-transmit their respective signals to the mobile station 10 and in that the system is provided with a known configuration enabling communication from the base station 20 side to the mobile station 10.

Especially, the mobile communication system 210 of the present embodiment is different from the mobile communication system 110 of the first embodiment, first, in that the attenuator 24 attenuates the signals delivered by the signal delivering unit 100 of the master unit 18 and transmitted to the slave units 12, 14, 16, instead of the signals transmitted to the signal combiner 22, by the predetermined combination of attenuation factors D(i). The second difference is that the mobile station 10 is provided with a received power measuring device (power measuring means) 28 which combines signals from the base station 20, attenuated by the attenuator 24 and transmitted via the plurality of slave units 12, 14, 16, and which measures the power P(i) of the resultant signal thereof R(i); and a transmitter 111 which sends this power P(i) to the slave units 12, 14, 16 and that the base station 20 is provided with a receiver (power acquiring means) 112 which acquires the power P(i) transmitted from the mobile station 10, through the slave units 12, 14, 16 and the signal combiner 22.

Figure 26:
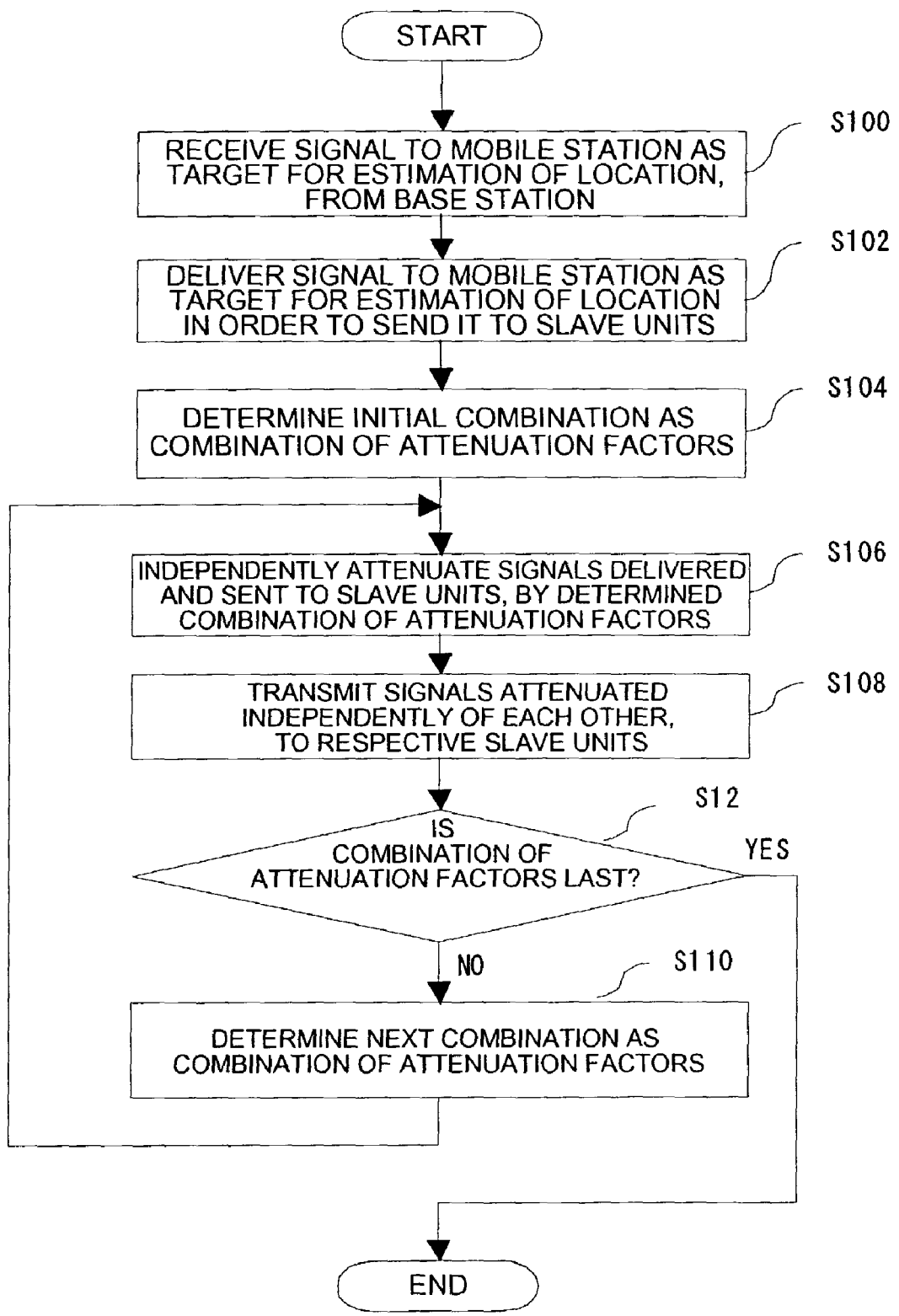
FIG. 26 is a chart showing the processing flow of the master unit in the mobile communication system of FIG. 25.

FIG. 26 shows the processing flow of the master unit 18 in the mobile communication system 210 according to the present embodiment. The master unit 18 first receives the signal to the mobile station 10 as a target for estimation of location, from the transmitter 102 of the base station 20 (S100). Subsequently, the master unit 18 delivers the received signal in the signal delivering unit 100 in order to send it to the plurality of slave units 12, 14, 16 (S102)

Then the attenuation factor changer 26 determines the initial combination D(1) out of the predetermined combinations of attenuation factors D(i), as a combination of attenuation factors for the signals delivered and transmitted to the plurality of slave units 12, 14, 16 (S104), the attenuator 24 attenuates the signals delivered and transmitted to the plurality of slave units 12, 14, 16, by the determined combination of attenuation factors D(i) independently of each other (S106), and the signal delivering unit 100 transmits the attenuated signals to the respective slave units 12, 14, 16, to let each of the slave units 12, 14, 16 radio-transmit the signal to the mobile station 10 (S108).

If the combination of attenuation factors D(i) is not the last combination of attenuation factors D(M) (S12), the combination of attenuation factors D(i) is switched to the next combination of attenuation factors D(i+1) (S110), and the processing returns to S106. On the other hand, if the combination of attenuation factors D(i) is the last combination of attenuation factors D(M) (S12), the processing is terminated.

Figure 27:
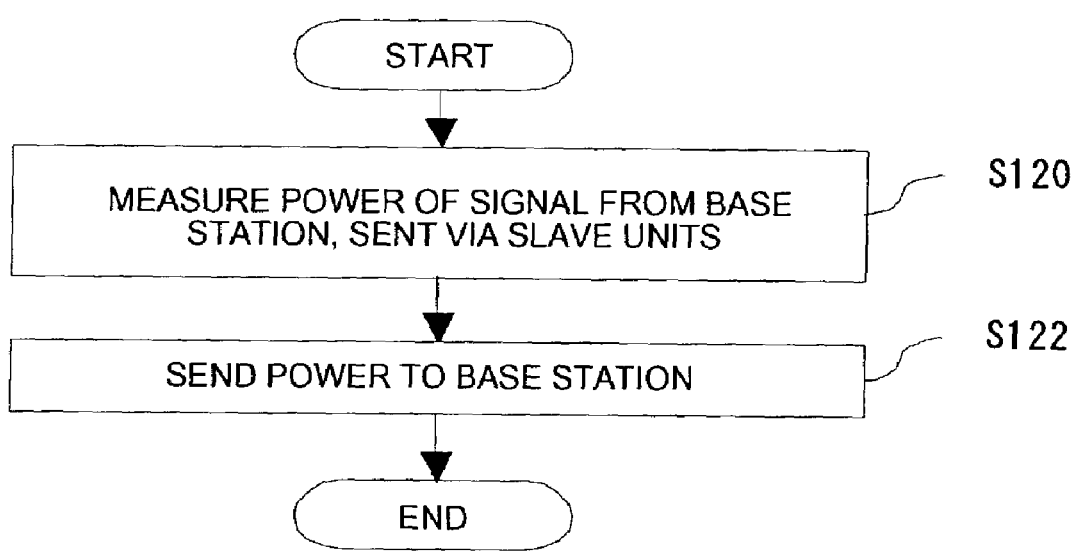
FIG. 27 is a chart showing the processing flow of the mobile station in the mobile communication system of FIG. 25.

FIG. 27 shows the processing flow of the mobile station 10 in the mobile communication system 210 of the present embodiment. The mobile station 10 is configured to combine the signals from the base station 20, each attenuated by the varying combination of attenuation factors D(i) and transmitted through the plurality of slave units 12, 14, 16, to obtain the resultant signal R(i) and measure the power P(i) of this signal R(i) (S120). Then the mobile station 10 transmits the power P(i) through the slave units 12, 14, 16 and the signal combiner 22 to the receiver 112 of the base station 20 (S122).

Figure 28:
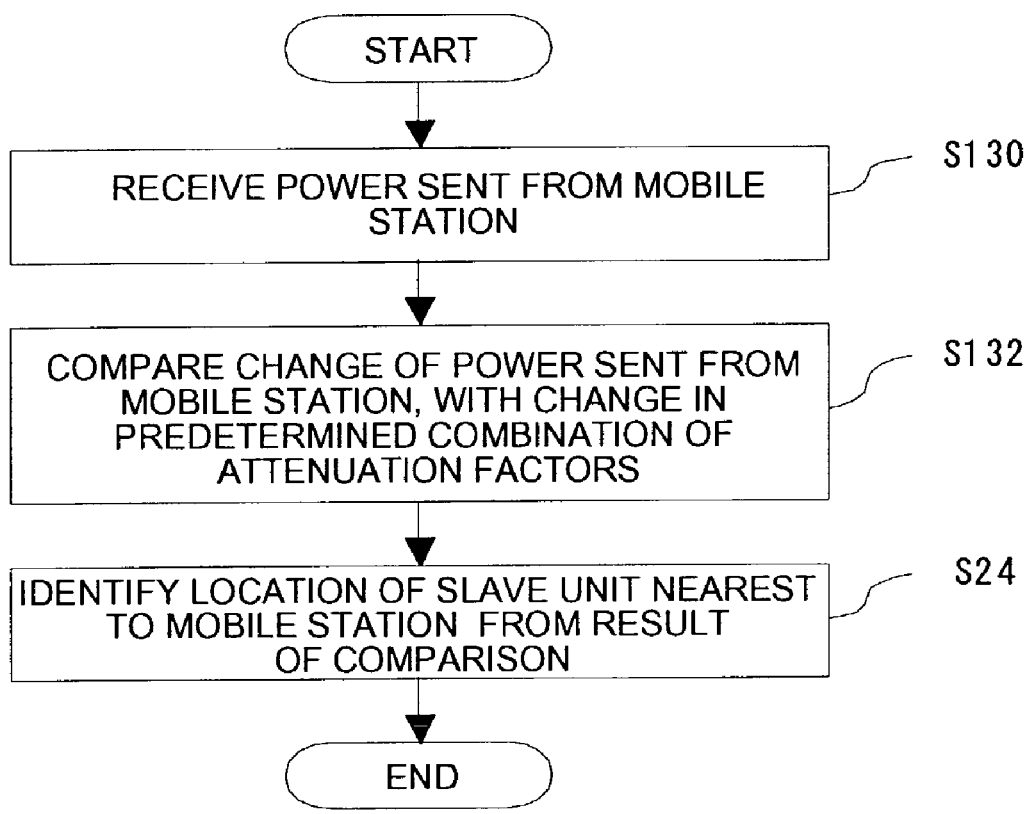
FIG. 28 is a chart showing the processing flow of the base station in the mobile communication system of FIG. 25.

FIG. 28 shows the processing flow in the base station 20. In the base station 20, as in the first embodiment, the power P(i) transmitted from the mobile station 10 is received (S130), the power P(i) is compared with the combinations of attenuation factors D(i) (S132), and the location of the slave unit nearest to the mobile station 10 is identified from the result of the comparison (S24)

In the mobile communication system 210 of the present embodiment, as described above, the signals delivered from the master unit 18 are individually attenuated by the combination of attenuation factors set for the respective slave units 12, 14, 16, the attenuated signals thereafter are transmitted to the respective slave units 12, 14, 16 and then transmitted to the mobile station, and the combination of attenuation factors is changed. The mobile station 10 acquires and transmits the information about the power of the resultant signal of these attenuated signals for each combination of attenuation factors and the receiver 112 acquires the information about the power transmitted from the mobile station 10. Then the information about the magnitudes of the powers of the signals received from the respective slave units 12, 14, 16 by the mobile station 10 is obtained based on the change in the information about the power of the resultant signal occurring with change in the combination of attenuation factors. Since the signal received from each slave unit by the mobile station 10 increases its power with decreasing distance between the slave unit 12, 14, 16 and the mobile station 10, the distances from the mobile station 10 to the slave units 12, 14, 16 are estimated based on the information about the magnitudes of the powers, and the location of the mobile station 10 is estimated based thereon.

(Tenth Embodiment)

Figure 29:
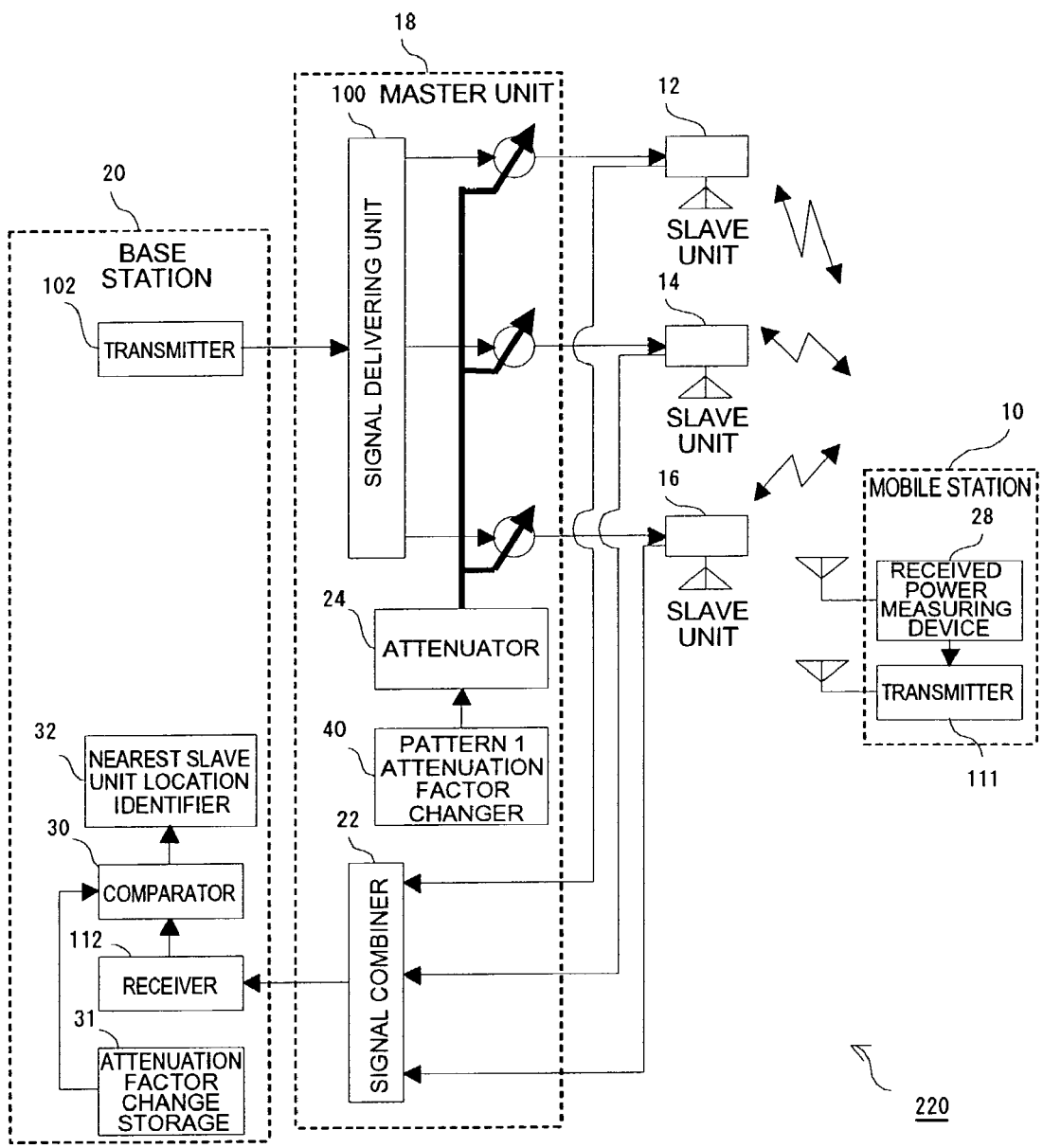
FIG. 29 is an illustration showing the configuration of the mobile communication system in the tenth embodiment.

Next, FIG. 29 shows a configuration of the mobile communication system 220 as a tenth embodiment. The mobile communication system 220 of the present embodiment is different from the mobile communication system 210 of the ninth embodiment in that the system is provided with the pattern 1 attenuation factor changer 40 employed in the second embodiment, instead of the attenuation factor changer 26. This pattern 1 attenuation factor changer 40 selects one of signals to the plurality of slave units 12, 14, 16 in a predetermined order with time, and changes the attenuation factors associated with the respective slave units 12, 14, 16 so that only the selected signal becomes selectively attenuated more than the other signals.

Specifically, for example, the combinations of the attenuation factors D(i) in the present embodiment having the three slave units 12, 14, 16 can be set so that the initial (i=1) combination is D(1)={1, 0, 0}, the second (i=2) combination D(2)={0, 1, 0}, and the third (i=3) combination D(3)={0, 0, 1}. Likewise, in the case of the combinations of attenuation factors D(i) in the mobile communication system having N slave units, the combinations can be determined so that D(1)={1, 0, . . . , 0}, D(i)={0, . . . , 0, 1, 0, . . . , 0}, and the last (i=M=N) combination D(N)={0, . . . , 0, 1}. Although the attenuation factors are so set that the attenuation factor of the selected slave unit is 1 and the attenuation factor of the other slave units is 0, the combinations can be determined arbitrarily without having to be limited to this example, as long as the attenuation factor of the selected slave unit is adequately greater than those of the unselected slave units.

Figure 30:
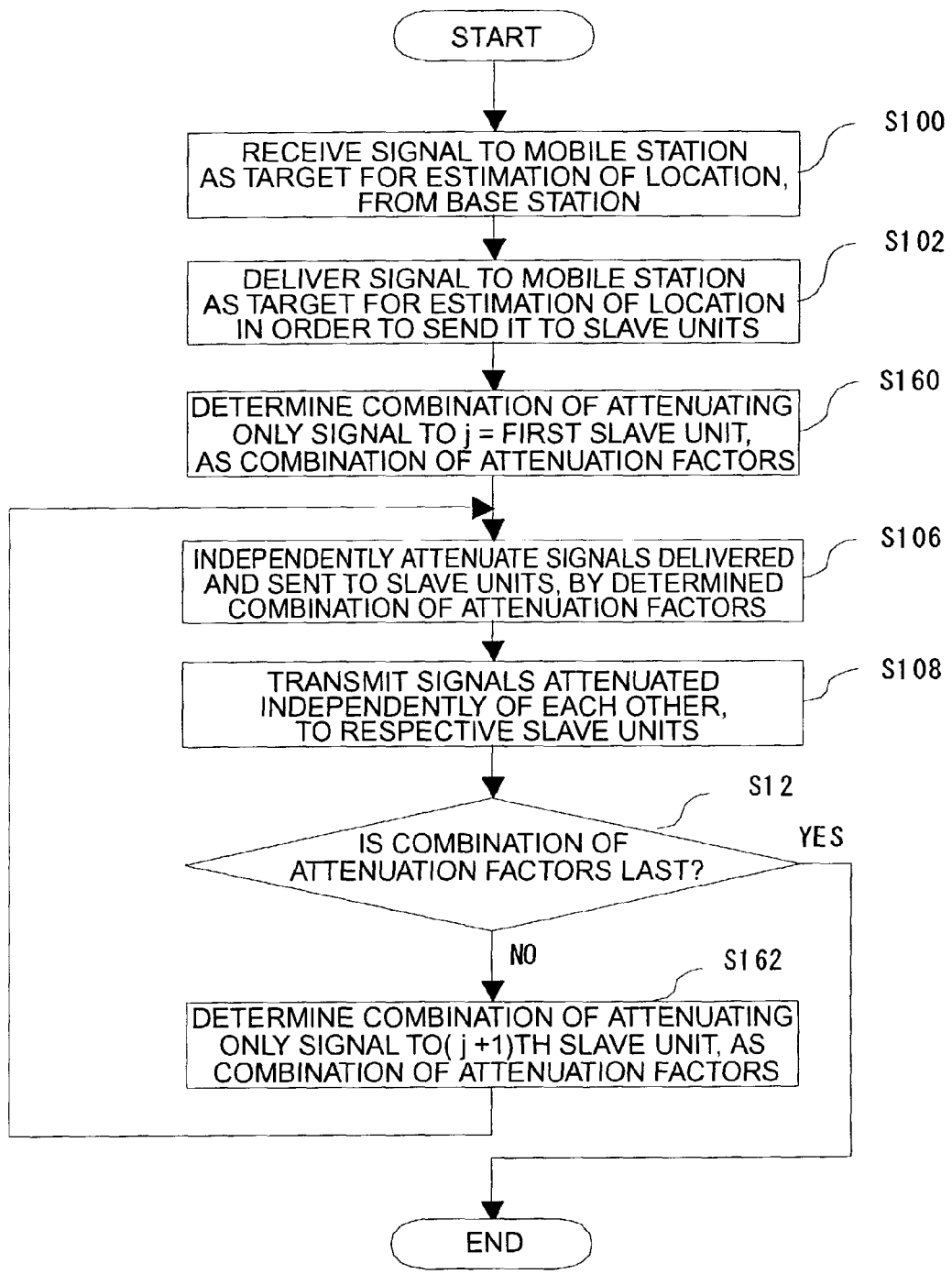
FIG. 30 is a chart showing the processing flow of the master unit in the mobile communication system of FIG. 29.

FIG. 30 presents the processing flow of the master unit 18 in the mobile communication system 220 of the present embodiment. The master unit 18 first receives from the base station 20, the signal to the mobile station 10 as a target for estimation of location (S100) and delivers the signal to the mobile station 10 in order to send it to the plurality of slave units 12, 14, 16 (S102), as in the ninth embodiment. Then the pattern 1 attenuation factor changer 40 determines a combination of selectively attenuating only the signal to j=the first slave unit more than the other signals, as the attenuation factors for the respective delivered signals to the slave units 12, 14, 16 (S160).

After the determination of the attenuation factors, the master unit 18 attenuates the signals delivered and transmitted to the plurality of slave units 12, 14, 16, by the determined combination of attenuation factors D(i) independently of each other (S106), transmits the attenuated signals to the respective slave units 12, 14, 16, and then lets the slave units send the respective signals to the mobile station 10 (S108). If the combination of attenuation factors is not the last combination of attenuation factors (S12), the combination of attenuation factors is switched to a combination of selectively attenuating only the signal to the next slave unit (the (j+1)th slave unit as the next slave unit to the jth unit) more than the other signals (S162), and the processing returns to S106. On the other hand, when the combination of attenuation factors is the last combination (S12), the processing is terminated.

Then, as in the ninth embodiment, the mobile station 10 combines the signals each attenuated by the combination of attenuation factors D(i) and transmitted, into a resultant signal, measures the power P(i) thereof, and transmits it to the receiver 112 of the base station 20, and the base station 20 compares the power P(i) with the combinations of attenuation factors D(i) and identifies the location of the slave unit nearest to the mobile station 10 from the result of the comparison.

According to the mobile communication system 220 of the present embodiment, as described above, only a signal to one slave unit selected in order out of the signals delivered to the plurality of slave units 12, 14, 16 is fully attenuated relative to the signals to the other slave units at every change in the combination of the attenuation factors, and the attenuated signals are combined in the mobile station 10. Since the magnitude of the power of each resultant signal obtained in this way relatively decreases with decreasing distance between the slave unit selected in the attenuation and the mobile station 10, the distances from the mobile station 10 to the slave units 12, 14, 16 are readily estimated by comparing the information about the powers of the resultant signals with each other.

(Eleventh Embodiment)

Figure 31:
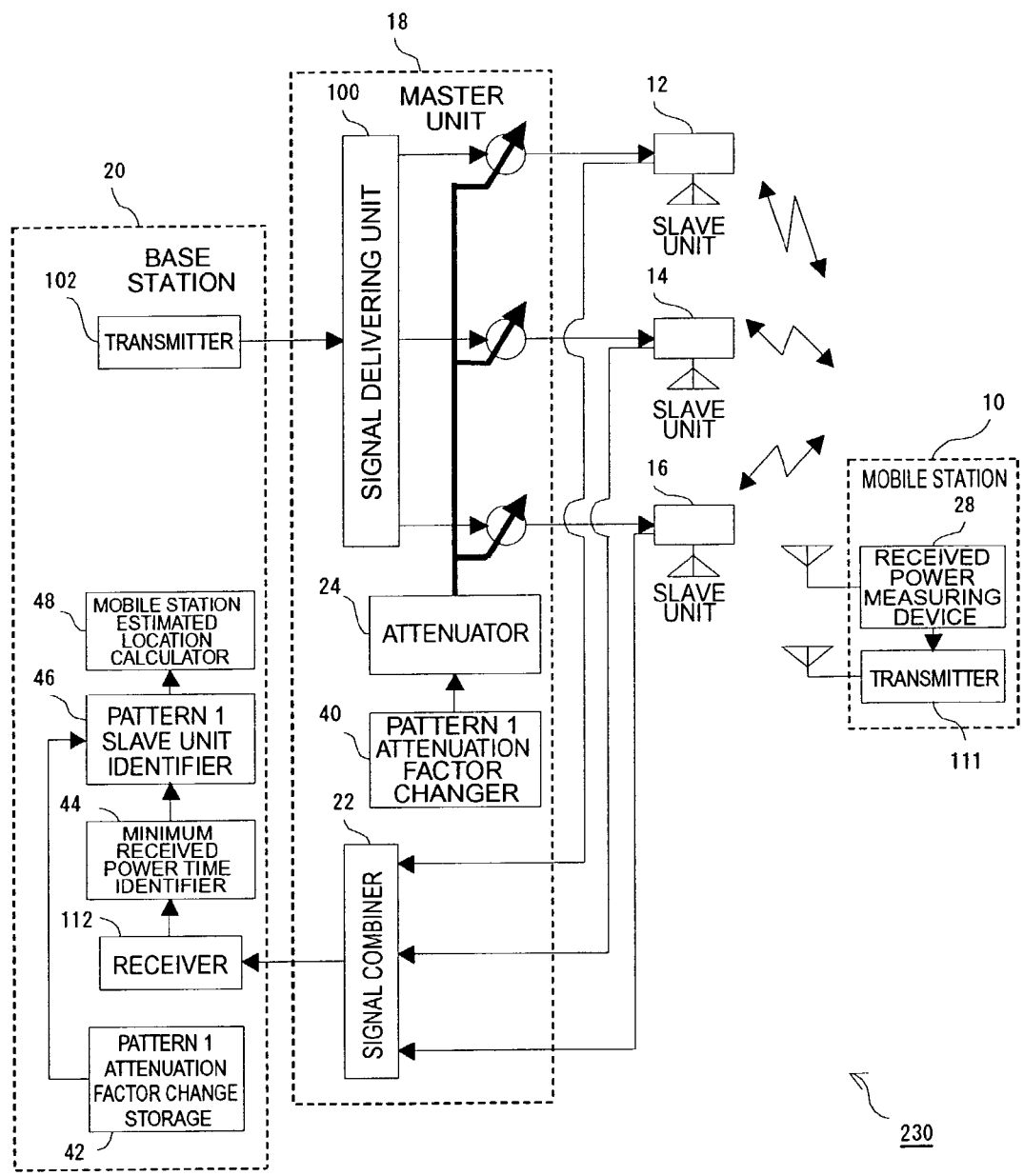
FIG. 31 is an illustration showing the configuration of the mobile communication system in the eleventh embodiment.

FIG. 31 shows the configuration of the mobile communication system 230 as an eleventh embodiment. The mobile communication system 230 of the present embodiment is different from the tenth embodiment in that the system is provided with the pattern 1 attenuation factor change storage 42, minimum received power time identifier 44, pattern 1 slave unit identifier 46, and mobile station estimated location calculator 48 as employed in the third embodiment, instead of the attenuation factor change storage 31, comparator 30, and nearest slave unit location identifier 32 in the base station 20.

Figure 32:
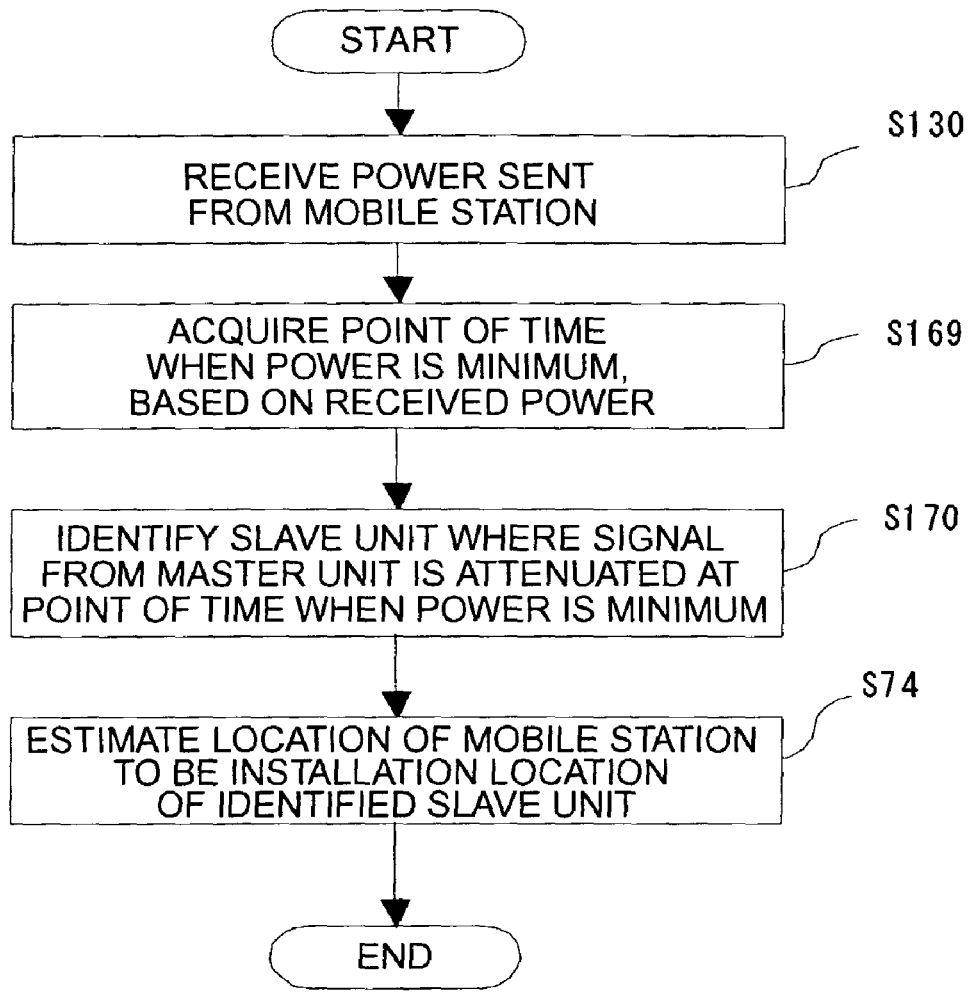
FIG. 32 is a chart showing the processing flow of the base station in the mobile communication system of FIG. 31.

FIG. 32 shows the processing flow of the base station 20 in the present embodiment. The base station 20 receives a measured value of the power P(i) of the signal R(i) corresponding to each combination of attenuation factors D(i), transmitted from the mobile station 10 in much the same manner as in the tenth embodiment. Then the minimum received power time identifier 44 acquires the point of time (i) when the power P(i) becomes minimum, based on the power P(i) (S169), and the pattern 1 slave unit identifier 46 compares the point of time (i) yielding the minimum, with the combinations of attenuation factors D(i) stored in the pattern 1 attenuation factor change storage 42 and identifies the slave unit associated with the signal selected in the master unit 18 at the point of time when the received power is minimum (S170). Then the mobile station estimated location calculator 48 identifies the installation location of the identified slave unit as the estimated location of the mobile station (S74).

Figure 33:
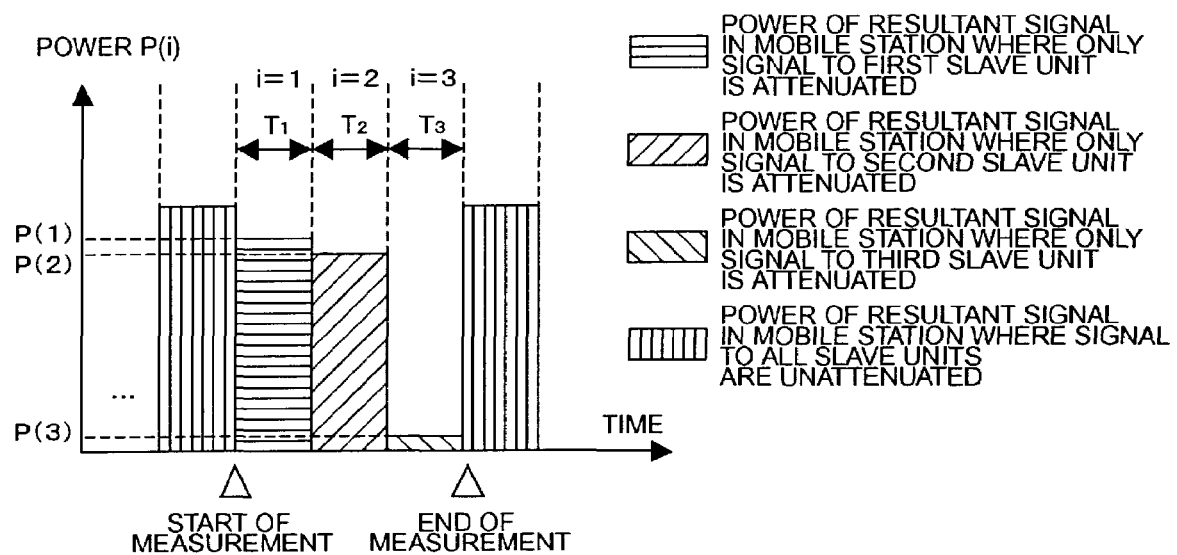
FIG. 33 is a diagram showing an example of change of received powers acquired by the received power measuring device in the mobile communication system of FIG. 31.

FIG. 33 shows an example of temporal change of the power P(i) in the present embodiment. The example here employs the combinations of attenuation factors D(i) in FIG. 6 as used in the third embodiment. It is seen in this case that the power P(1) measured in the interval $T_1$ is the power of the resultant signal of the signals received from the slave units 14, 16, the power P(2) measured in the interval $T_2$ is the power of the resultant signal of the signals received from the slave units 12, 16, and the power P(3) measured in the interval $T_3$ is the power of the resultant signal of the signals received from the slave units 12, 14. The minimum among the powers P(1), P(2), and P(3) is the power P(3). At this time the slave unit 16 is one receiving the selectively attenuated signal from the master unit 18, and the mobile station 10 can be readily estimated to be located nearest to the slave unit 16 relative to the other slave units.

According to the mobile communication system 230 of the present embodiment, as described above, the minimum is acquired out of the powers of the resultant signals under the respective combinations of attenuation factors, one slave unit with the attenuation factor higher than those of the other slave units is identified upon acquisition of the minimum, and it is found that the power of the signal received from the identified slave unit by the mobile station 10 is the largest. Since the identified slave unit is nearest to the mobile station 10, the location of the mobile station 10 is suitably estimated by regarding the location of the identified slave unit as the location of the mobile station 10.

(Twelfth Embodiment)

Figure 34:
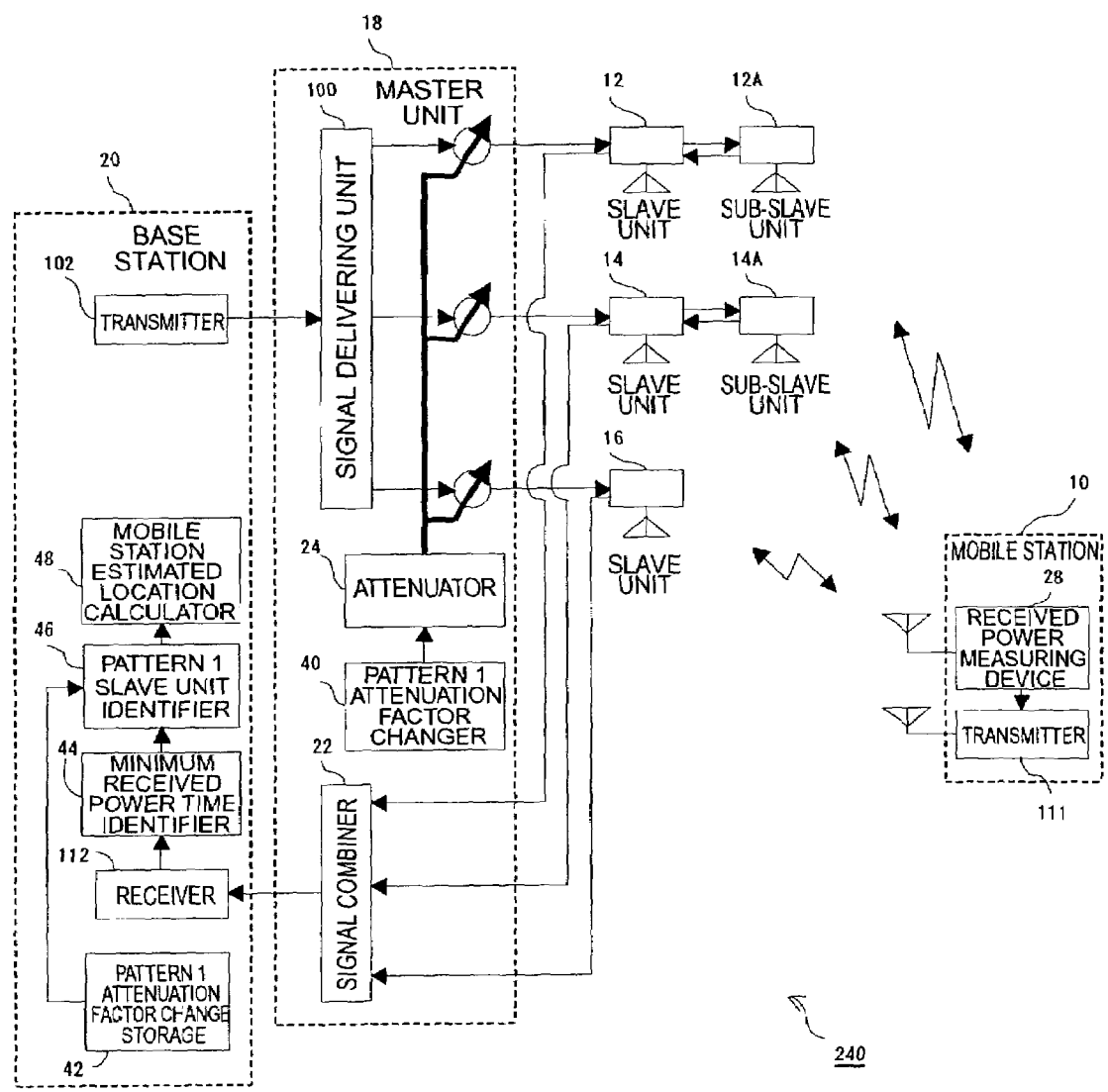
FIG. 34 is an illustration showing the configuration of the mobile communication system in the twelfth embodiment.

A configuration of the mobile communication system 240 as a twelfth embodiment will be described below with reference to FIG. 34. The mobile communication system 240 of the present embodiment is different from the eleventh embodiment in that sub-slave units 12A, 14A, each of which is configured to receive a signal from the master unit 18 through the slave unit 12 or the slave unit 14 and radio-transmit the signal to the mobile station 10 and to radio-receive a signal from the mobile station 10 and transmit the signal through the slave unit 12 or the slave unit 14 to the master unit 18, are connected to the respective slave units 12, 14.

Figure 35:
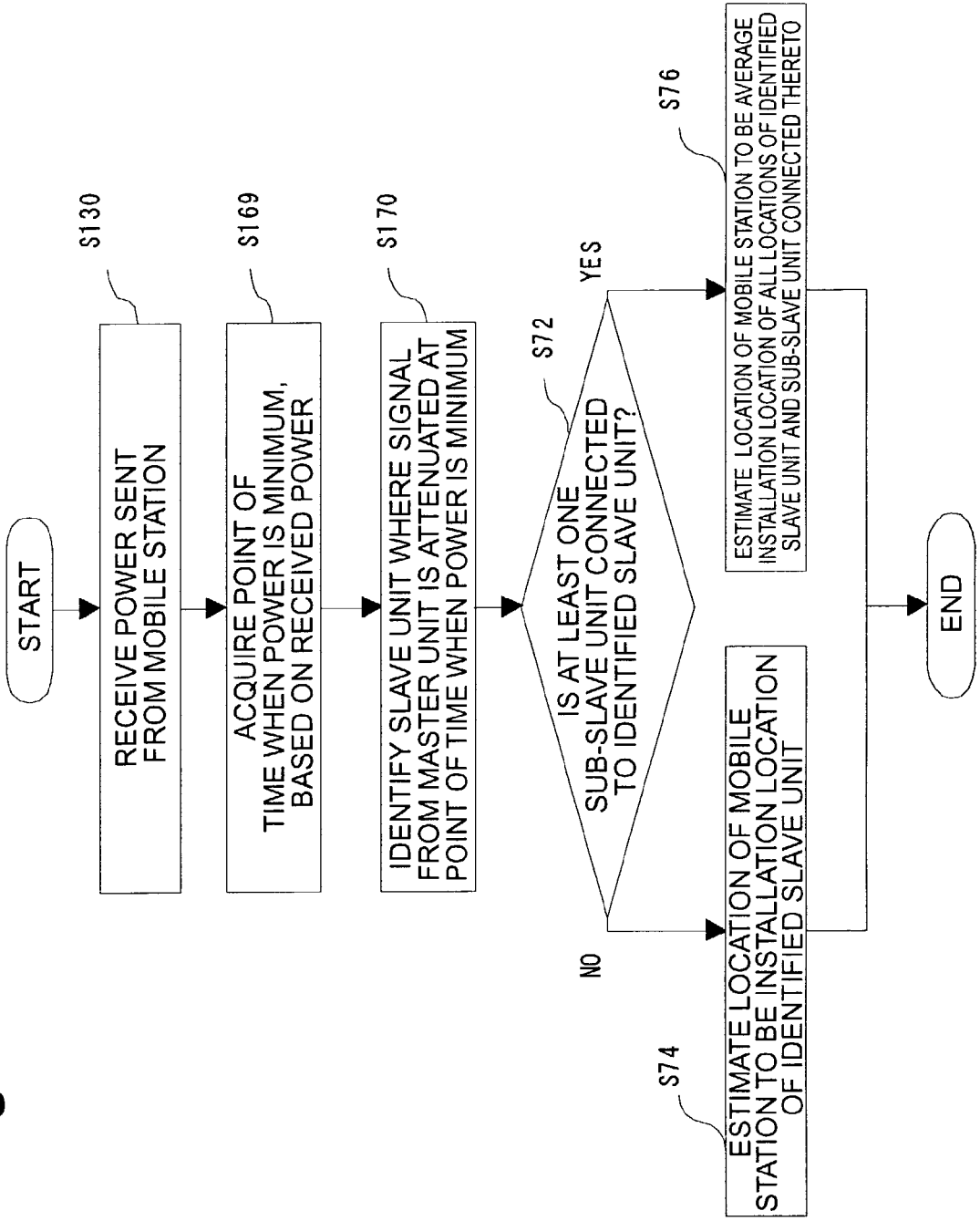
FIG. 35 is a chart showing the processing flow of the base station in the mobile communication system of FIG. 34.

FIG. 35 shows the processing flow of the base station 20 in the mobile communication system 240 of the present embodiment. Just as in the eleventh embodiment, the mobile station 10 combines the signals from the sub-slave unit 12A and the slave unit 12, the signals from the sub-slave unit 14A and the slave unit 14, and the signal from the slave unit 16 to obtain the resultant signal R(i), measures the power P(i) thereof, and transmits it, and the base station 20 receives the power P(i) (S130). Then the base station 20 acquires the point of time i yielding the minimum of P(i) (S169); the base station 20 identifies the slave unit corresponding to the signal selected in the master unit 18 at the point of time i yielding the minimum (S170); and when no sub-slave unit is coupled to the identified slave unit (S72), the base station identifies the installation location of the identified slave unit as the estimated location of the mobile station (S74).

On the other hand, when a sub-slave unit is coupled to the identified slave unit (S72), the base station identifies an average installation location of all the locations of the identified slave unit and the sub-slave unit coupled thereto, as the estimated location of the mobile station (S76).

As described above, the location of the mobile station 10 can be better estimated in the mobile communication system 240 having the sub-slave units 12A, 14A as in the present embodiment.

(Thirteenth Embodiment)

Figure 36:
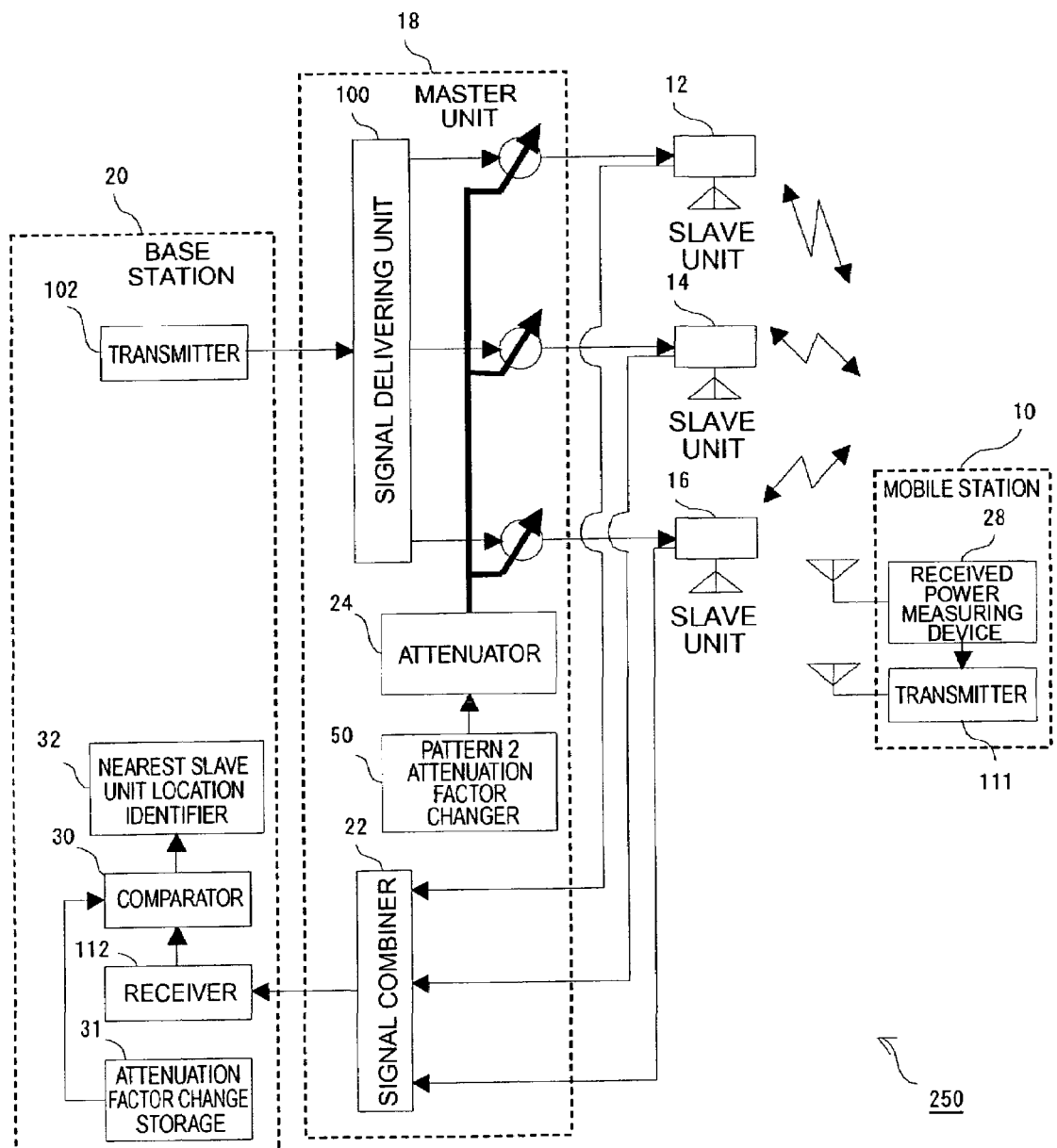
FIG. 36 is an illustration showing the configuration of the mobile communication system in the thirteenth embodiment.

FIG. 36 shows a configuration of the mobile communication system 250 as a thirteenth embodiment. The mobile communication system 250 of the present embodiment is different from the mobile communication system 220 of the tenth embodiment in that the system is provided with the pattern 2 attenuation factor changer 50 as employed in the fifth embodiment, instead of the pattern 1 attenuation factor changer 40. This pattern 2 attenuation factor changer 50 selects one of the signals delivered and transmitted from the signal delivering unit 100 to the plurality of slave units 12, 14, 16, in the predetermined order, and changes the combination of attenuation factors associated with the respective slave units 12, 14, 16 so that the attenuation factor associated with the selected signal becomes selectively lower than the attenuation factors associated with the other signals.

Specifically, for example, the combinations of attenuation factors D(i) in the present embodiment having the three slave units 12, 14, 16 can be determined so that the initial (i=1) combination is D(1)={0, 1, 1}, the second (i=2) combination D(2)={1, 0, 1}, and the third (i=3) combination D(3)={1, 1, 0}. Similarly, in the case of the mobile communication system having N slave units, the combinations of attenuation factors D(i) can be determined so that D(1)= {0, 1, . . . , 1}, D(i)={1, . . . , 1, 0, 1, . . . , 1}, and the last (i=M=N) combination D(N)={1, . . . , 1, 0}. Although the attenuation factors are so set that the attenuation factor of the selected signal is 0 and the attenuation factor of the other signals is 1, the attenuation factors can be arbitrarily determined without having to be limited to this example, as long as the attenuation factor of the selected signal is lower than the attenuation factors of the other signals.

Figure 37:
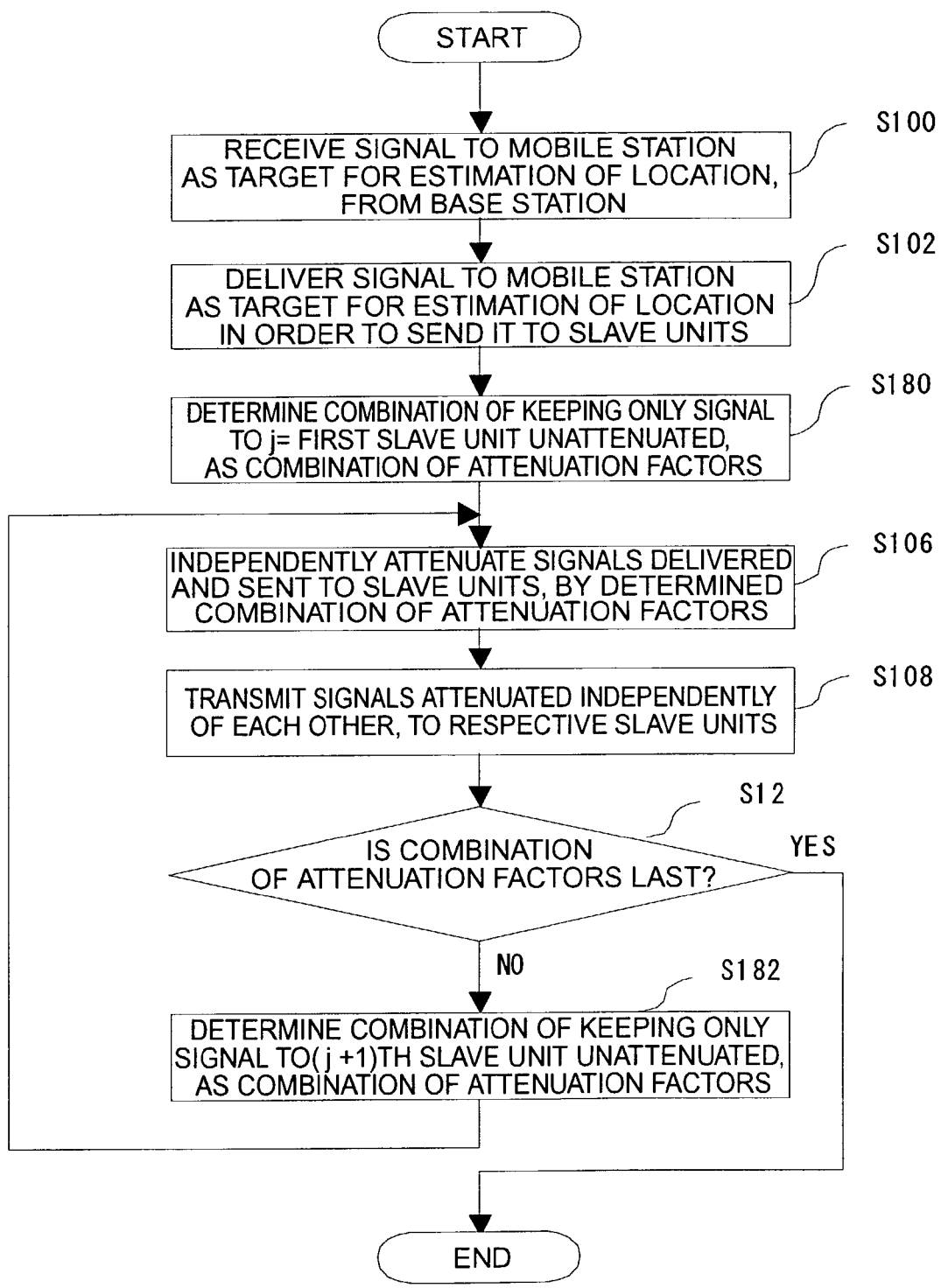
FIG. 37 is a chart showing the processing flow of the master unit in the mobile communication system of FIG. 36.

FIG. 37 shows the processing flow of the master unit 18 in the present embodiment in the configuration employing the above combinations D(i) of attenuation factors. The master unit 18 first receives the signal to the mobile station 10 as a target for estimation of location from the base station 20 (S100), and delivers this signal to transmit the delivered signals to the plurality of slave units 12, 14, 16 (S102), as in the tenth embodiment. Then the pattern 2 attenuation factor changer 50 of the master unit 18 determines the combination of keeping only the signal to j=the first slave unit selectively unattenuated, as the attenuation factors for the respective signals to the slave units 12, 14, 16 (S180).

After the determination of the attenuation factors, the master unit 18 attenuates the delivered signals by the determined combination of attenuation factors D(i) independently of each other (S106); the master unit 18 transmits these attenuated signals to the respective slave units 12, 14, 16 (S108); if the combination of attenuation factors D(i) is not the last combination D(M) (S12), the master unit 18 determines the combination of keeping the signal to the next slave unit (the (j+1)th slave unit as the next slave unit to the jth unit) selectively unattenuated, as the combination of attenuation factors (S182); and the processing returns to S106. On the other hand, when the combination of attenuation factors is the last combination D(M) (S12), the processing is terminated.

Then, as in the tenth embodiment, the mobile station 10 combines the signals each attenuated by the combination of attenuation factors D(i) and then transmitted, measures the power P(i) of the resultant signal thereof, and transmits the power to the receiver 112 of the base station 20; and the base station 20 compares the power P(i) with the combinations of attenuation factors D(i) to identify the location of the slave unit nearest to the mobile station 10 from the result of the comparison.

According to the mobile communication system 250 of the present embodiment, as described above, only the signal to one slave unit, selected in order out of the signals delivered to the plurality of slave units, is almost unattenuated relative to the signals to the other slave units, at every change in the combination of attenuation factors. Since the magnitude of the power of each resultant signal obtained in this way relatively increases with decreasing distance of each selected slave unit in the attenuation to the mobile station, the distances from the mobile station 10 to the slave units 12, 14, 16 are readily estimated by comparing the information about the powers of the resultant signals with each other.

(Fourteenth Embodiment)

Figure 38:
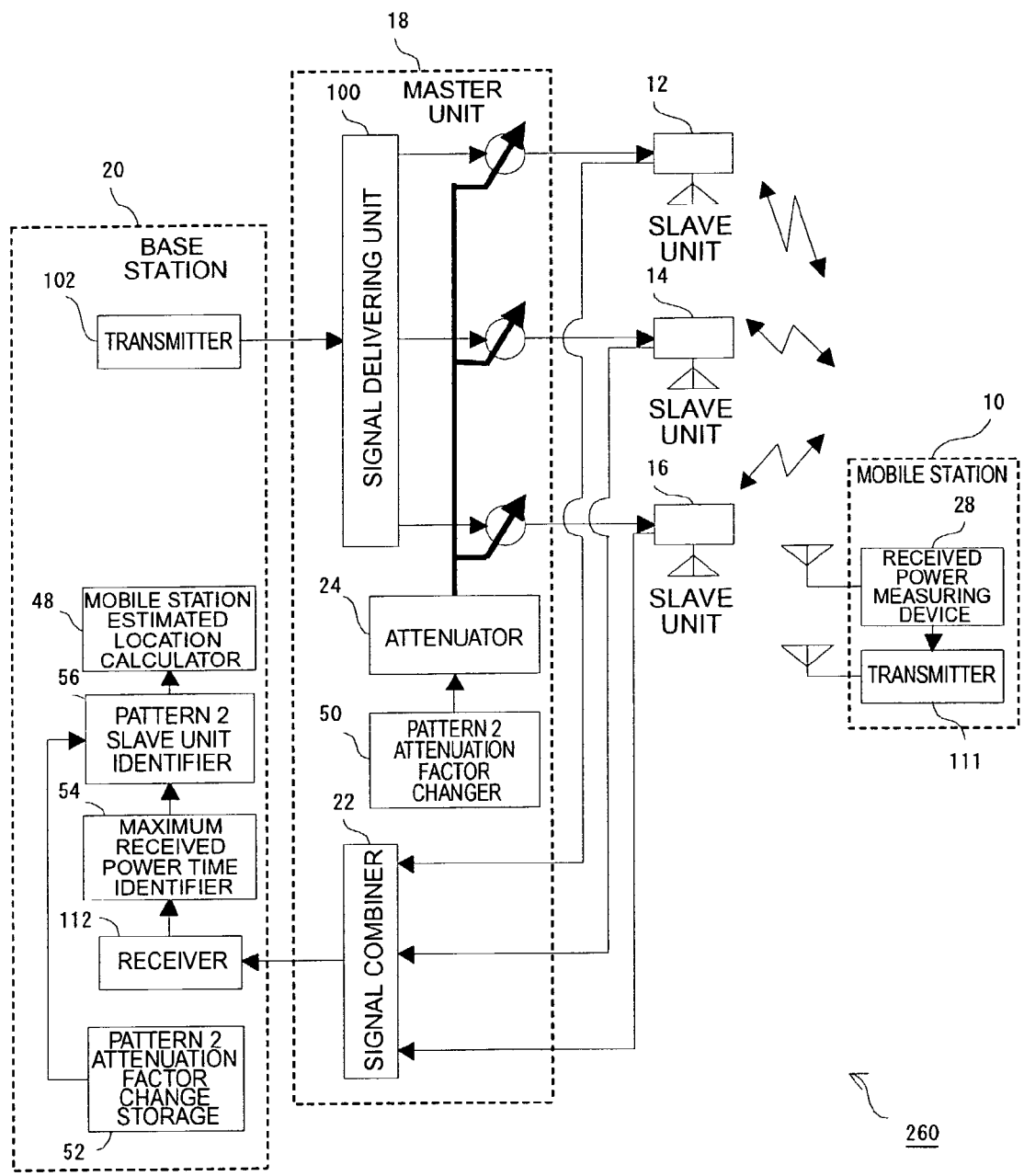
FIG. 38 is an illustration showing the configuration of the mobile communication system in the fourteenth embodiment.

FIG. 38 shows a configuration of the mobile communication system 260 as a fourteenth embodiment. The mobile communication system 260 of the present embodiment is different from the thirteenth embodiment in that the system is provided with the maximum received power time identifier 54, pattern 2 attenuation factor change storage 52, pattern 2 slave unit identifier 56, and mobile station estimated location calculator 48 as employed in the sixth embodiment, instead of the attenuation factor change storage 31, comparator 30, and nearest slave unit location identifier 32 in the base station 20.

Figure 39:
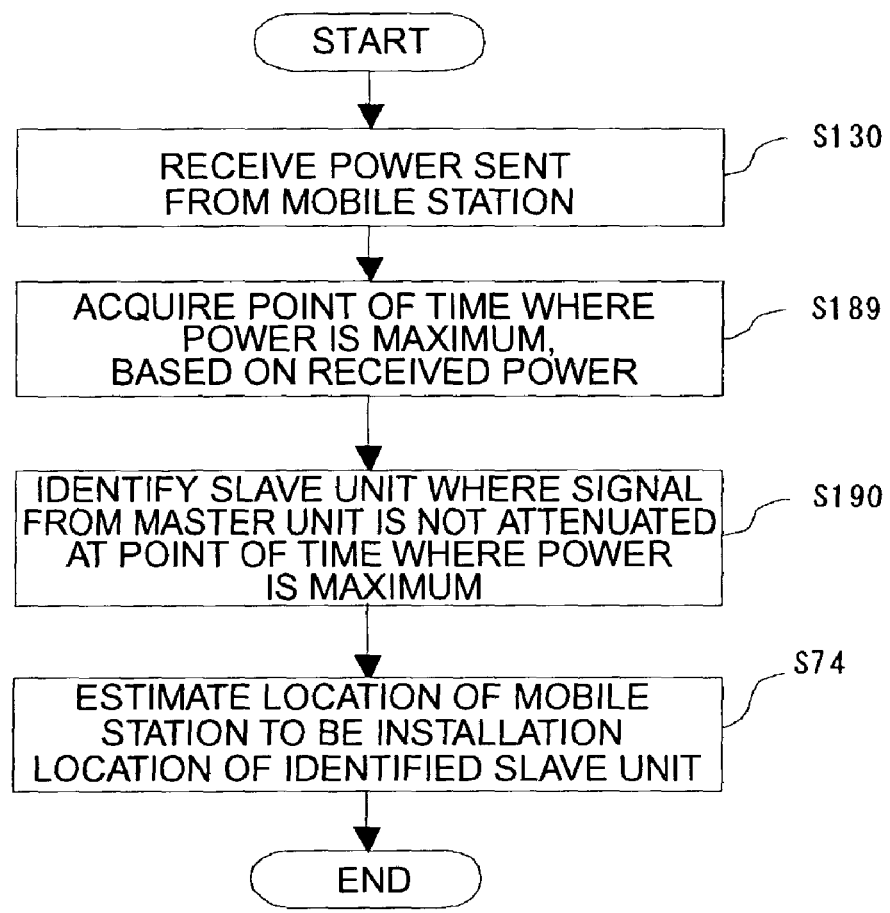
FIG. 39 is a chart showing the processing flow of the base station in the mobile communication system of FIG. 38.

FIG. 39 shows the processing flow of the base station 20 in the present embodiment. The base station 20 receives the power P(i) of the received signal in the mobile station 10 (S130), measured in and transmitted from the mobile station 10, as in the thirteenth embodiment, acquires the point of time (i) yielding the maximum of the power P(i) on the basis of the power P(i) (S189), compares the power P(i) with the combinations of attenuation factors D(i) to identify the slave unit associated with the selectively unattenuated signal relative to the other signals in attenuation of the signal from the master unit 18 at the point of time where the received power is maximum (S190), and thereafter identifies the installation location of the identified slave unit as the estimated location of the mobile station (S74).

Figure 40:
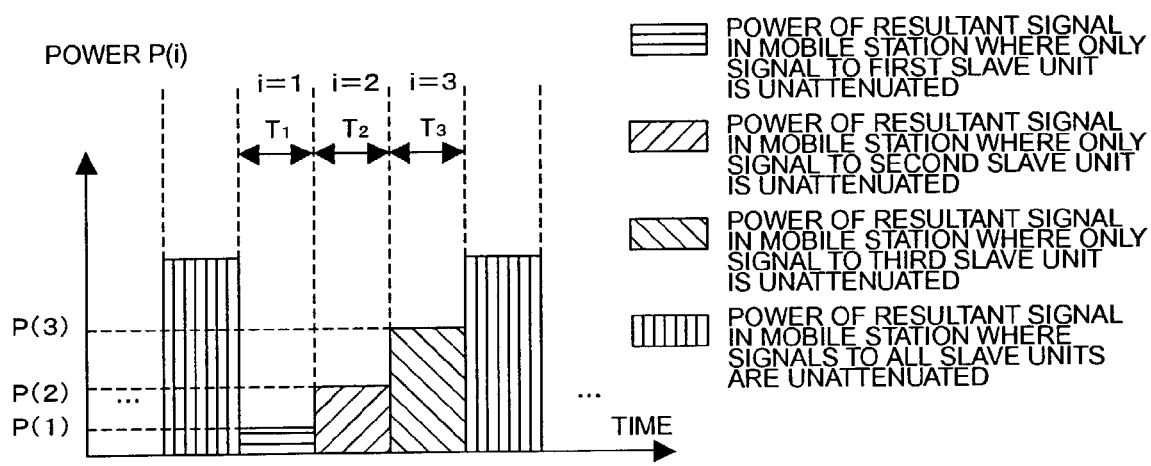
FIG. 40 is a diagram showing an example of change of received powers acquired by the received power measuring device in the mobile communication system of FIG. 38.

FIG. 40 shows an example of the powers P(i) in the present embodiment. The example herein shows a case using the combinations of attenuation factors. D(i) in the thirteenth embodiment. It is seen from this example of the combinations of attenuation factors that the power P(1) measured in the interval $T_1$ is the power of the signal received from the slave unit 12, the power P(2) measured in the interval $T_2$ is the power of the signal received from the slave unit 14, and the power P(3) measured in the interval $T_3$ is the power of the signal received from the slave unit 16.

In this case, the maximum among the powers P(1), P(2), and P(3) is the power P(3), the slave unit 16 is the slave unit receiving the signal unattenuated by the attenuator 24, from the master unit 18 at this time and the mobile station 10 can be readily estimated to be located nearest to the slave unit 16 relative to the other slave units.

According to the mobile communication system 260 of the present embodiment, as described above, the maximum is acquired out of the powers of the resultant signals under the respective combinations of attenuation factors, one slave unit with the attenuation factor lower than those of the other slave units is identified upon acquisition of the maximum, and it is found that the power of the signal received from the identified slave unit by the mobile station 10 is the largest. Since the identified slave unit is nearest to the mobile station 10, the location of the mobile station 10 is suitably estimated by regarding the location of the identified slave unit as the location of the mobile station 10.

(Fifteenth Embodiment)

Figure 41:
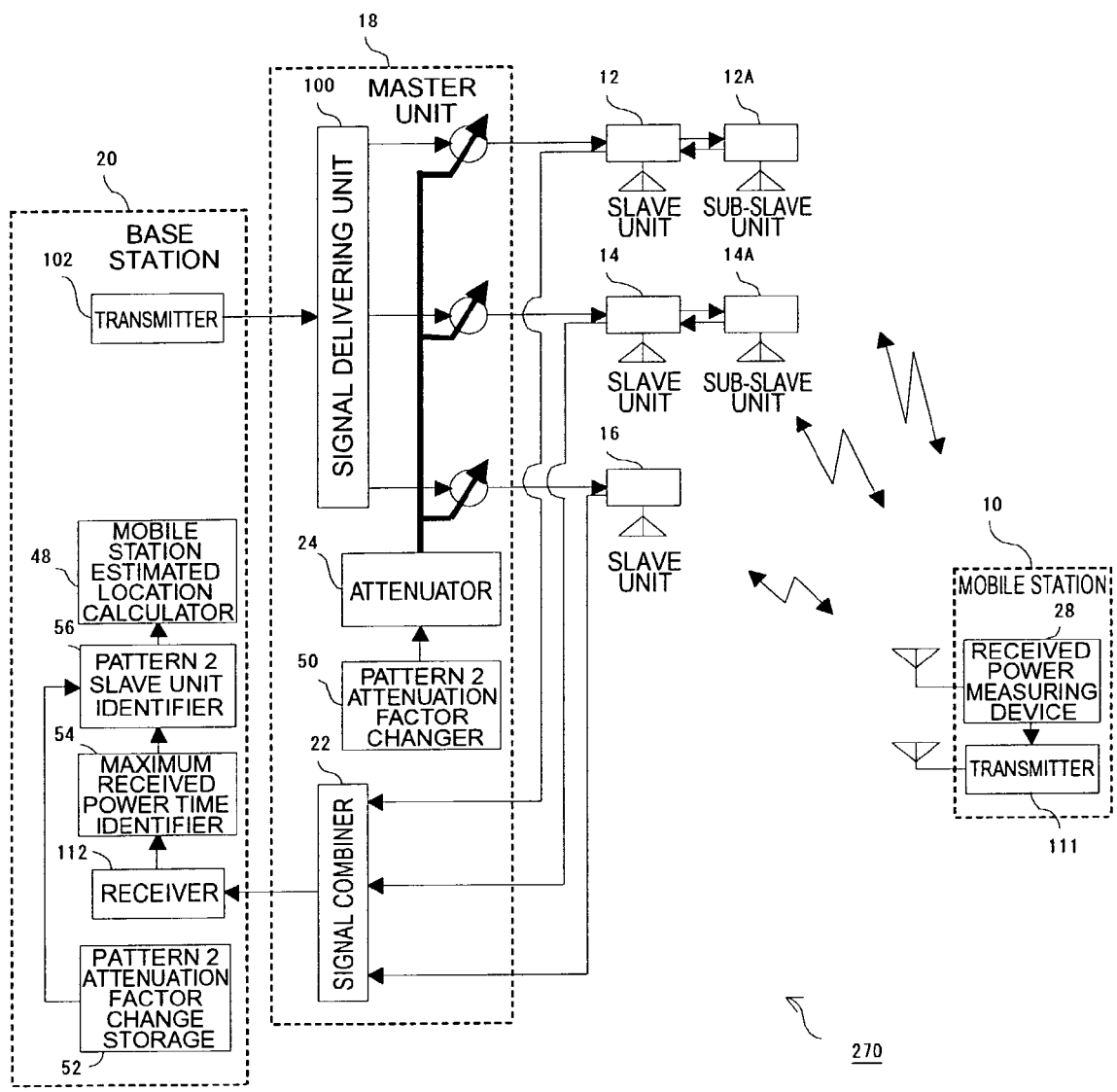
FIG. 41 is an illustration showing the configuration of the mobile communication system in the fifteenth embodiment.

A configuration of the mobile communication system 270 as a fifteenth embodiment will be described below with reference to FIG. 41. The mobile communication system 270 of the present embodiment is different from the mobile communication system 260 of the fourteenth embodiment in that sub-slave units 12A, 14A, each of which is configured to receive a signal from the master unit 18 through the slave unit 12 or the slave unit 14 and radio-transmit the signal to the mobile station 10 and to radio-receive a signal from the mobile station 10 and transmit it through the slave unit 12 or the slave unit 14 to the master unit 18, are coupled to the respective slave units 12, 14.

Figure 42:
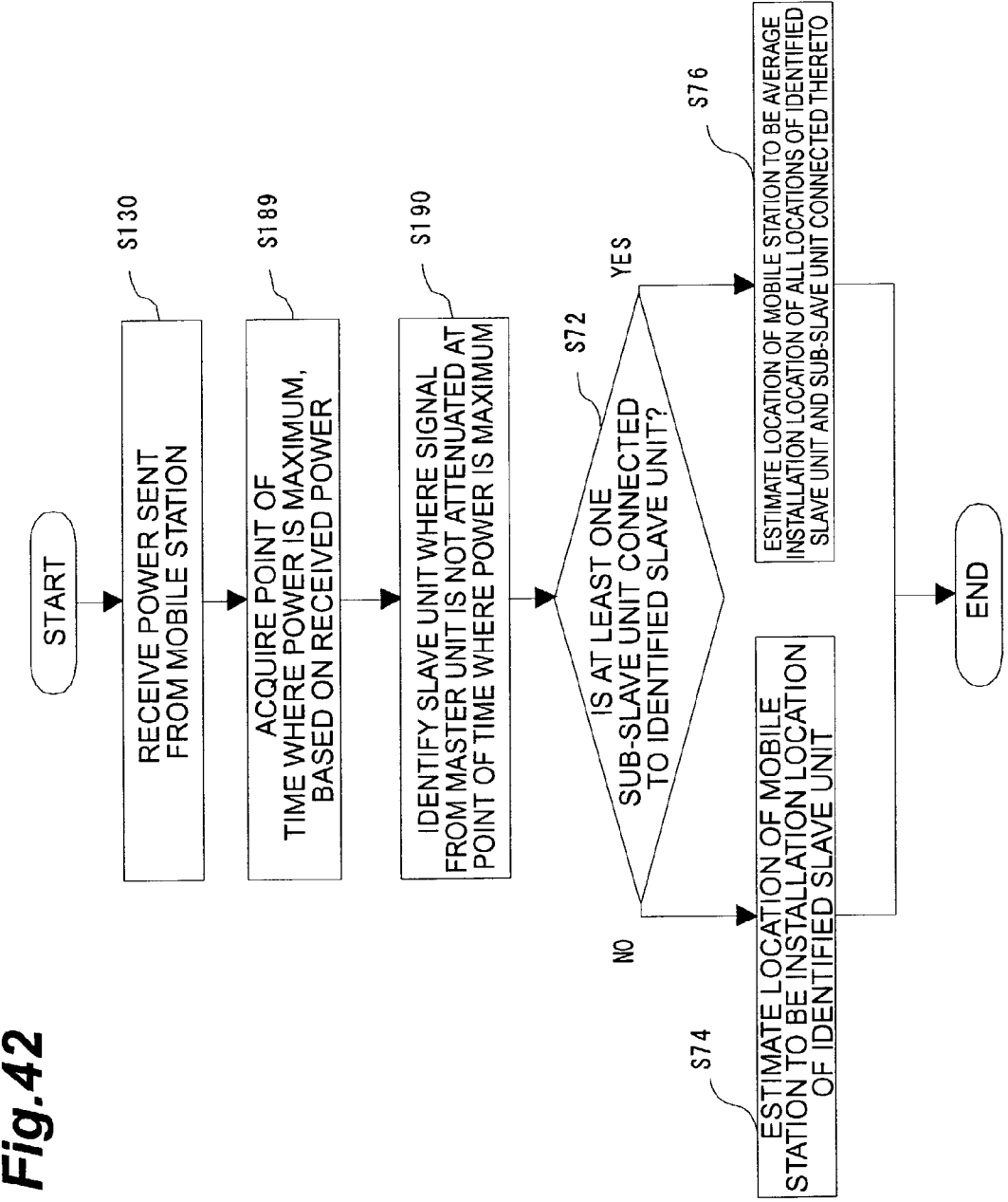
FIG. 42 is a chart showing the processing flow of the base station in the mobile communication system of FIG. 41.

FIG. 42 shows the processing flow of the base station 20 in the mobile communication system 270 of the present embodiment. Just as in the fourteenth embodiment, the mobile station 10 combines the signals from the sub-slave unit 12A and the slave unit 12, the signals from the sub-slave unit 14A and the slave unit 14, and the signal from the slave unit 16 to obtain the resultant signal R(i), measures the power P(i) thereof, and transmits it; and the base station 20 receives this power P(i) (S130). Then the base station 20 acquires the point of time i yielding the maximum of P(i) (S189); the base station 20 identifies the slave unit corresponding to the signal selected in the master unit 18 at the point of time i yielding the maximum (S190); thereafter, when no sub-slave unit is coupled to the identified slave unit (S72), the base station 20 identifies the installation location of the identified slave unit as the estimated location of the mobile station (S74).

On the other hand, when a sub-slave unit is coupled to the identified slave unit (S72), the base station 20 identifies an average installation location of all the locations of the identified slave unit and the sub-slave unit coupled thereto, as the estimated location of the mobile station (S76).

As described above, the location of the mobile station 10 can be better estimated in the mobile communication system 270 having the sub-slave units 12A, 14A as in the present embodiment.

(Sixteenth Embodiment)

Figure 43:
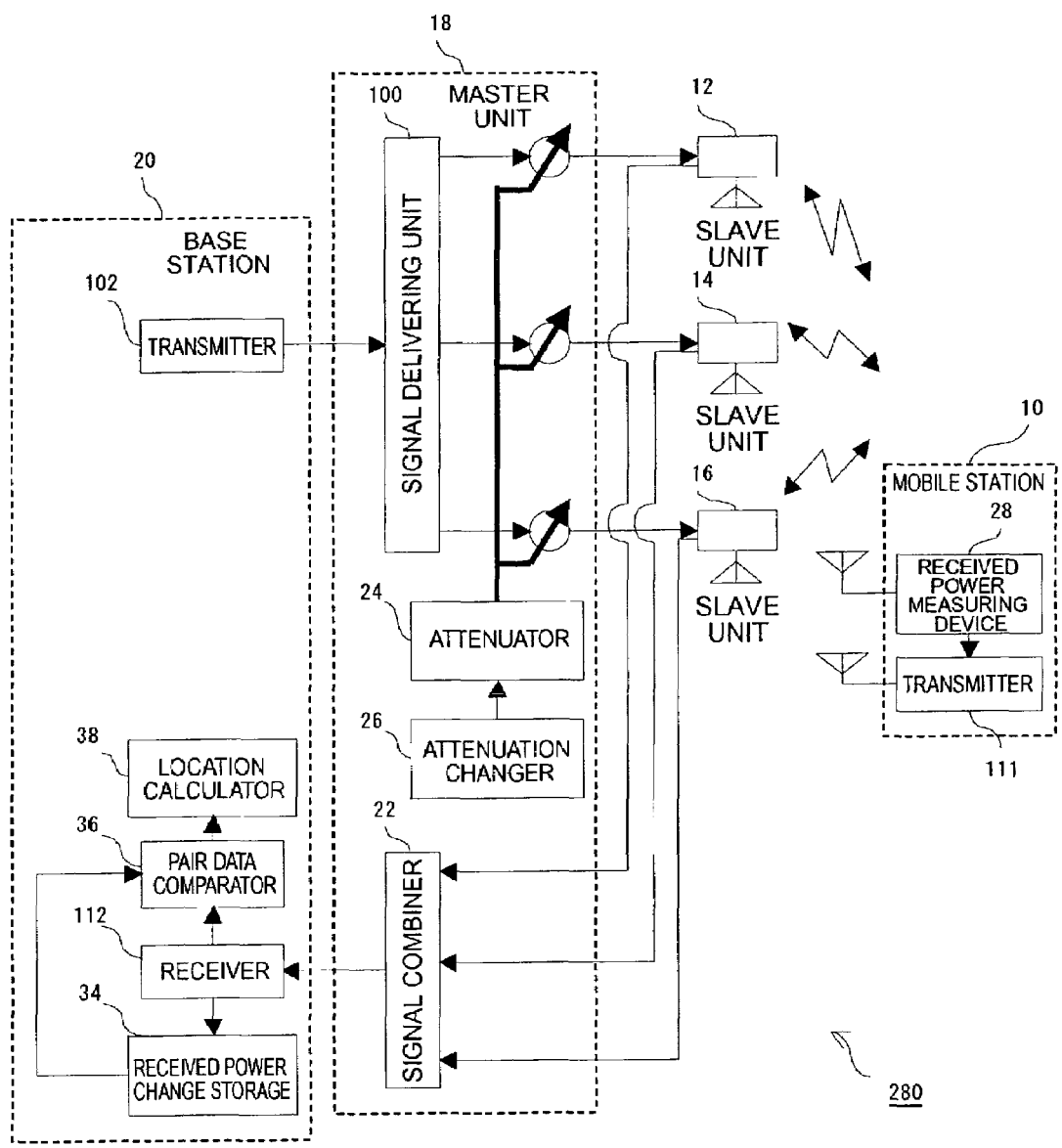
FIG. 43 is an illustration showing the configuration of the mobile communication system in the sixteenth embodiment.

FIG. 43 shows a configuration of the mobile communication system 280 as a sixteenth embodiment. The mobile communication system 280 of the present embodiment is different from the mobile communication system 210 of the ninth embodiment in that the base station 20 is provided with the received power change storage 34 in which the data of temporal change of power is preliminarily stored under such circumstances that the mobile station 10 is present at a plurality of sites in the service providing area; the pair data comparator 36 which compares the change of the power measured by the received power measuring device 28, with the data stored in the received power change storage 34; and the location calculator 38 which estimates the location of the mobile station 10 on the basis of the result of this comparison, which are the same as those in the eighth embodiment, instead of the attenuation factor change storage 31, comparator 30, and nearest slave unit location identifier 32. The pair data comparator 36 and the location calculator 38 constitute the mobile station location estimating means.

In the mobile communication system 280 of the present embodiment, the following operation is preliminarily carried out so that the mobile station 10 is located at a plurality of sites in the service providing area and the change of the power P(i) acquired at each location in the base station 20 is stored in correspondence with the location of the mobile station 10. Let $P_k(i)$ be the power P(i) corresponding to each combination of attenuation factors D(i) obtained from the mobile station 10 present at the kth site, where k=1, 2, ..., or K. K indicates the number of sites.

Figure 44:
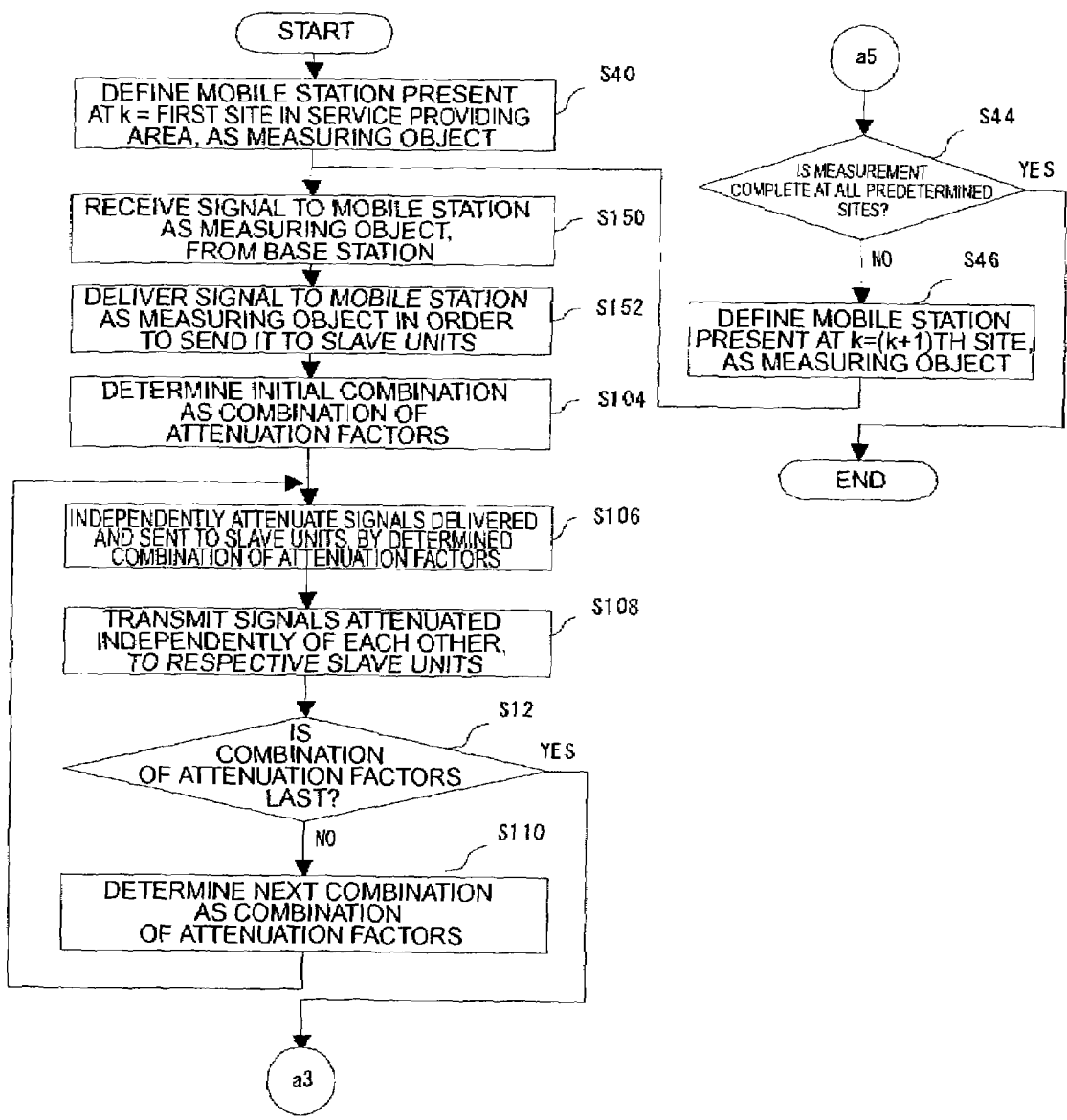
FIG. 44 is a chart showing the flow of processing of the master unit on the occasion of preliminarily storing the temporal change of the power of the signal received by the mobile station at each predetermined location in the service providing area, in the mobile communication system of FIG. 43.

As shown in FIG. 44, the master unit 18 first defines the mobile station present at k=the first site, as a measuring object (S40); the master unit 18 receives the signal to the mobile station 10 as a measuring object, from the base station 20 (S150); the master unit 18 delivers the signal to the mobile station 10 as a measuring object in order to send it to the plurality of slave units 12, 14, 16 (S152); the master unit 18 determines the initial combination D(1) out of the predetermined combinations of attenuation factors D(i), as a combination of attenuation factors for the respective signals delivered and transmitted to the plurality of slave units 12, 14, 16 (S104).

After the determination of attenuation factors, the master unit 18 attenuates the signals delivered and transmitted to the plurality of slave units 12, 14, 16, by the determined combination of attenuation factors D(i) independently of each other (S106), and transmits those attenuated signals to the respective slave units 12, 14, 16 (S108). If the combination of attenuation factors is not the last combination D(M) (S12), the attenuation factors are switched to the next combination D(i+1) (S110), and the processing returns to S106. On the other hand, when the combination of attenuation factors is the last combination D(M) (S12), the processing transfers to the processing of the mobile station 10 (flowchart connector a3).

Figure 45:
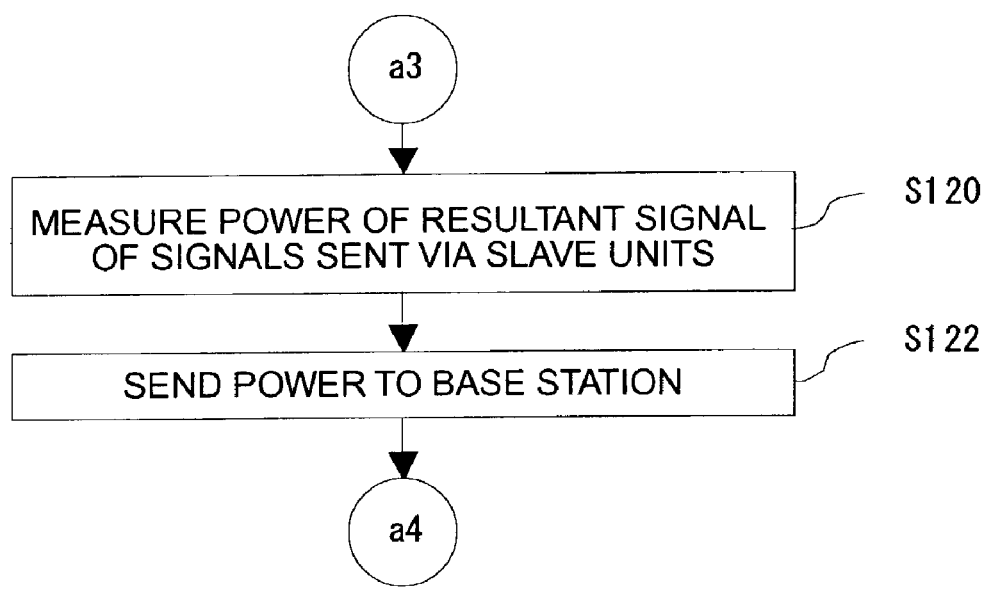
FIG. 45 is a chart showing the flow of processing of the mobile station on the occasion of preliminarily storing the temporal change of the power of the signal received by the mobile station at each predetermined location in the service providing area, in the mobile communication system of FIG. 43.
Figure 46:
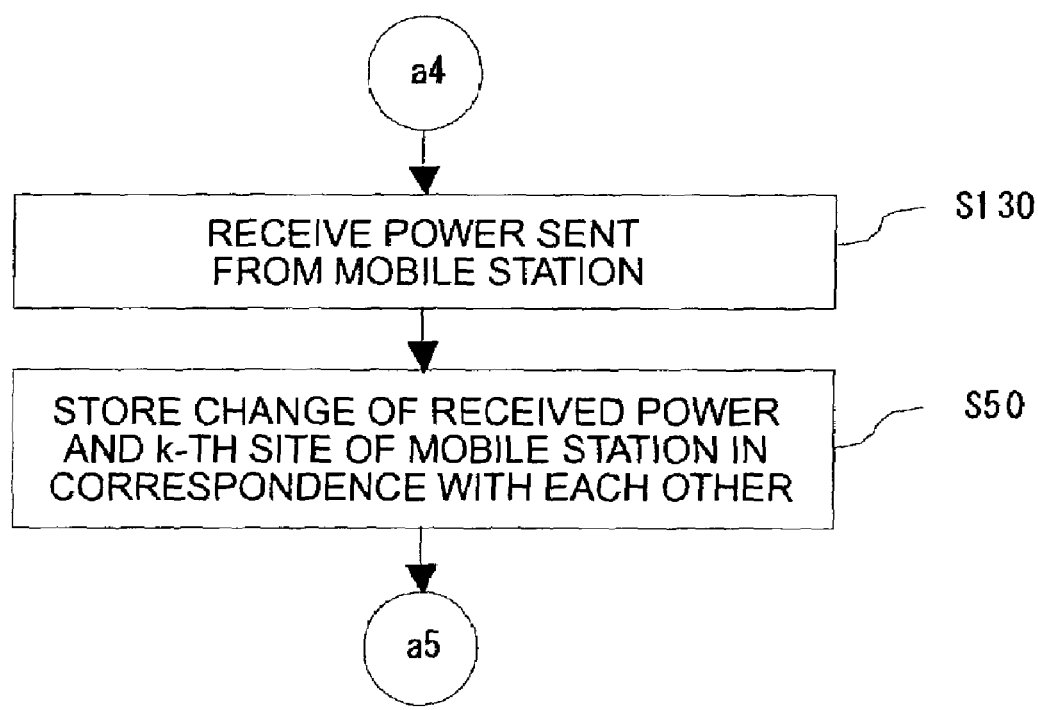
FIG. 46 is a chart showing the flow of processing of the base station on the occasion of preliminarily storing the temporal change of the power of the signal received by the mobile station at each predetermined location in the service providing area, in the mobile communication system of FIG. 43.

As shown in FIG. 45, the mobile station 10 combines the signals transmitted via the plurality of slave units 12, 14, 16 from the base station 20 to obtain the resultant signal R(i), and measures the power P(i) of this signal (S120); and the mobile station 10 transmits the power P(i) to the base station 20 (S122). As shown in FIG. 46, the base station 20 receives the power P(i) transmitted from the mobile station 10 (S130), and stores the power $P_k(i)$ at the kth site in correspondence with the location of the kth site (S50). At this time, the combination of attenuation factors D(i) employed is also stored in correspondence therewith. Then the processing transfers to the processing of the master unit 18 (flowchart connector a5).

As shown in FIG. 44, the master unit 18 determines whether the measurement is complete at all the K sites (S44); when the measurement is incomplete (S44), the master unit 18 defines the mobile station 10 present at the next site, as a measuring object (S46); and it then returns to S150. On the other hand, when the measurement is complete at all the specific K sites (S44), the processing is terminated.

Figure 47:
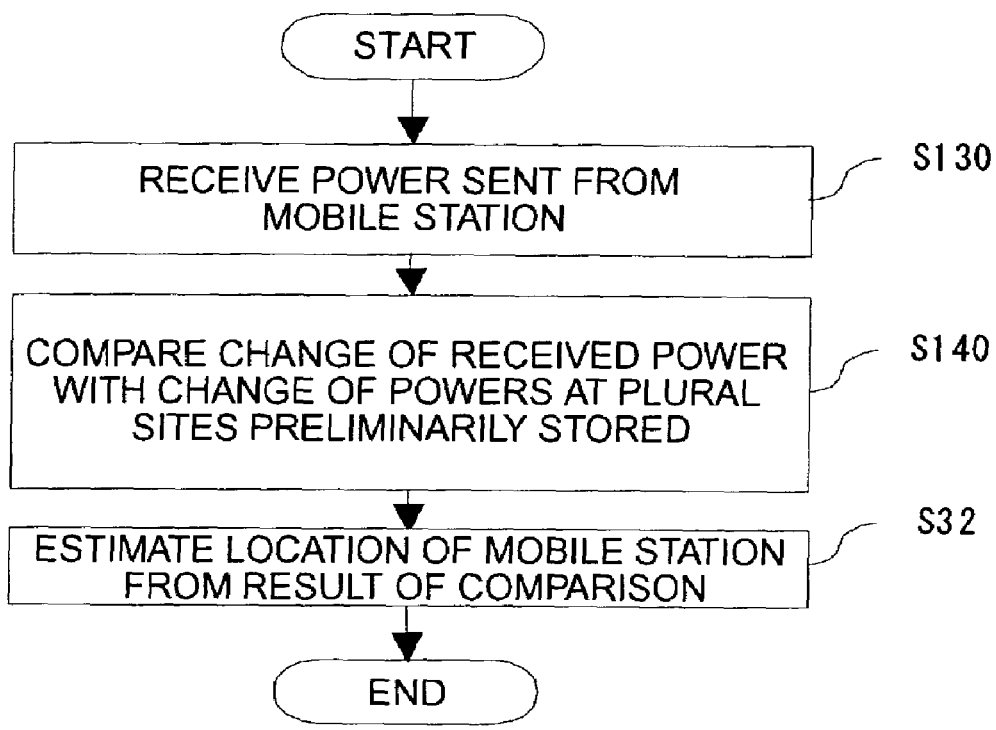
FIG. 47 is a chart showing the processing flow of the base station in estimation of location of the mobile station in the mobile communication system of FIG. 43.

The following will describe the operation of estimating the location of the mobile station 10 in the mobile communication system 280 of the present embodiment, with reference to the processing flow of the base station 20 in FIG. 47. The base station 20 acquires the power P(i) sent from the mobile station 10 in much the same manner (S130); the base station 20 compares this power P(i) with the powers P(i) corresponding to the respective locations k of the mobile station 10 preliminarily stored in the received power change storage 34 (S140); and the base station 20 estimates the location of the mobile station 10 from the result of the comparison (S32). It is preferable herein, for example, to regard the kth site yielding the smallest $\delta_k$ as the estimated location of the mobile station 10, using the performance function as presented previously in Eq (1).

According to the mobile communication system 280 of the present embodiment, as described above, the change of the power of the resultant signal due to the change in the combination of attenuation factors is preliminarily stored in correspondence with every location of the mobile station 10 in the form of a database, and the location of the mobile station is readily estimated by comparing a change of the power acquired for the mobile station 10 at an unknown location, with the database.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mobile communication system comprising a plurality of slave units spaced from each other in a predetermined area and configured to radio-receive respective signals from a mobile station, and a master unit configured to combine the signals received by the respective slave units and transmit a resultant signal thereof to a base station, the mobile communication system comprising:
   attenuating means for attenuating each of the signals from the slave units by a combination of attenuation factors set for the respective slave units and allowing the attenuated signals to be combined into the resultant signal;
   attenuation factor changing means for changing the combination of attenuation factors on the basis of a predetermined rule;
   power measuring means for measuring information about a power of the resultant signal under each combination of attenuation factors thus changed; and
   mobile station location estimating means for estimating a location of the mobile station on the basis of change of the information about the power occurring with change in the combination of attenuation factors.

2. The mobile communication system according to claim 1, wherein said attenuation factor changing means changes the combination of attenuation factors so that an attenuation factor for a signal associated with one slave unit selected in order from the plurality of slave units becomes higher than an attenuation factor for a signal associated with any other slave unit, as the predetermined rule.

3. The mobile communication system according to claim 2, wherein said mobile station location estimating means comprises:
   minimum-correspondent slave unit identifying means for acquiring a minimum of the powers under the respective combinations of attenuation factors and identifying one slave unit selected by the attenuation factor changing means when said minimum is acquired; and
   mobile station location acquiring means for acquiring a location of said identified slave unit as the location of the mobile station.

4. The mobile communication system according to claim 3, comprising a sub-slave unit coupled to one of the slave units and configured to radio-receive a signal from the mobile station and transmit the signal through said slave unit to the master unit,
   wherein the mobile station location acquiring means acquires an average location of locations of a slave unit identified by the minimum-correspondent slave unit identifying means and a sub-slave unit coupled to said slave unit and acquires the average location as the location of the mobile station.

5. The mobile communication system according to claim 1, wherein said attenuation factor changing means changes the combination of attenuation factors so that an attenuation factor for a signal associated with one slave unit selected in order from the plurality of slave units becomes lower than an attenuation factor for a signal associated with any other slave unit, as the predetermined rule.

6. The mobile communication system according to claim 5, wherein said mobile station location estimating means comprises:
   maximum-correspondent slave unit identifying means for acquiring a maximum of the powers under the respective combinations of attenuation factors and identifying one slave unit selected by the attenuation factor changing means when said maximum is acquired; and mobile station location acquiring means for acquiring a location of said identified slave unit as the location of the mobile station.

7. The mobile communication system according to claim 6, comprising a sub-slave unit coupled to one of the slave units and configured to radio-receive a signal from the mobile station and transmit the signal through said slave unit to the master unit, wherein the mobile station location acquiring means acquires an average location of locations of a slave unit identified by the maximum-correspondent slave unit identifying means and a sub-slave unit coupled to said slave unit and acquires the average location as the location of the mobile station.

8. The mobile communication system according to claim 1, comprising location-specific power change storage means in which the change of the information about the power under each combination of attenuation factors changed is preliminarily stored in correspondence with locations of the mobile station in said area, wherein said mobile station location estimating means compares the change of the information about the power measured by the power measuring means, with the change of the information about the power stored in said location-specific power change storage means and estimates the location of the mobile station in said area.

9. The mobile communication system according to claim 1, wherein said attenuating means attenuates the signals received by the slave units, on a hardware basis.

10. The mobile communication system according to claim 1, wherein said attenuating means attenuates the signals received by the slave units, on a software basis.

11. A mobile communication system comprising a master unit configured to receive a signal from a base station and deliver a plurality of signals, and a plurality of slave units spaced from each other in a predetermined area and configured to receive the respective signals delivered from the master unit, radio-transmit the signals to a mobile station, and radio-receive signals from the mobile station, the mobile communication system comprising:

attenuating means for attenuating each of the signals delivered in the master unit, by a combination of attenuation factors set for the respective slave units and transmitting the attenuated signals to the respective slave units;

attenuation factor changing means for changing the combination of attenuation factors on the basis of a predetermined rule;

power acquiring means for acquiring information about a power of a resultant signal of signals received from the plurality of slave units by the mobile station under each combination of attenuation factors thus changed, said information being transmitted from said mobile station; and mobile station location estimating means for estimating a location of the mobile station on the basis of change of the information about the power occurring with change in the combination of attenuation factors.

12. The mobile communication system according to claim 11, wherein said attenuation factor changing means changes the combination of attenuation factors so that an attenuation factor for a signal transmitted to one slave unit selected in order from the plurality of slave units becomes higher than an attenuation factor for a signal transmitted to any other slave unit, as the predetermined rule.

13. The mobile communication system according to claim 12, wherein said mobile station location estimating means comprises:

minimum-correspondent slave unit identifying means for acquiring a minimum of the powers under the respective combinations of attenuation factors and identifying one slave unit selected by the attenuation factor changing means when said minimum is acquired; and mobile station location acquiring means for acquiring a location of said identified slave unit as the location of the mobile station.

14. The mobile communication system according to claim 13, comprising a sub-slave unit coupled to one of the slave units and configured to relay a signal transmitted from said slave unit and radio-transmit the signal to the mobile station, wherein the mobile station location acquiring means acquires an average location of locations of a slave unit identified by the minimum-correspondent slave unit identifying means and a sub-slave unit coupled to said slave unit and acquires the average location as the location of the mobile station.

15. The mobile communication system according to claim 11, wherein said attenuation factor changing means changes the combination of attenuation factors so that an attenuation factor for a signal transmitted to one slave unit selected in order from the plurality of slave units becomes lower than an attenuation factor for a signal transmitted to any other slave unit, as the predetermined rule.

16. The mobile communication system according to claim 15, wherein said mobile station location estimating means comprises:

maximum-correspondent slave unit identifying means for acquiring a maximum of the powers under the respective combinations of attenuation factors and identifying one slave unit selected by the attenuation factor changing means when said maximum is acquired; and mobile station location acquiring means for acquiring a location of said identified slave unit as the location of the mobile station.

17. The mobile communication system according to claim 16, comprising a sub-slave unit coupled to one of the slave units and configured to relay a signal transmitted from said slave unit and radio-transmit the signal to the mobile station, wherein the mobile station location acquiring means acquires an average location of locations of a slave unit identified by the maximum-correspondent slave unit identifying means and a sub-slave unit coupled to said slave unit and acquires the average location as the location of the mobile station.

18. The mobile communication system according to claim 11, comprising location-specific power change storage means in which the change of the information about the power under each combination of attenuation factors changed is preliminarily stored in correspondence with locations of the mobile station in said area, wherein said mobile station location estimating means compares the change of the information about the power acquired by the power acquiring means, with the change of the information about the power stored in said location-specific power change storage means and estimates the location of the mobile station in said area.

19. The mobile communication system according to claim 11, wherein said attenuating means attenuates the signals delivered by the master unit, on a hardware basis.

20. The mobile communication system according to claim 11, wherein said attenuating means attenuates the signals delivered by the master unit, on a software basis.

21. A method of estimating a location of a mobile station in a mobile communication system comprising a plurality of slave units spaced from each other in a predetermined area and configured to radio-receive respective signals from the mobile station, and a master unit configured to combine the signals received by the respective slave units, into a resultant signal and transmit the resultant signal to a base station, the method comprising:
- an attenuating step of attenuating each of the signals from the slave units by a combination of attenuation factors set for the respective slave units and allowing the attenuated signals to be combined into the resultant signal;
- an attenuation factor changing step of changing the combination of attenuation factors on the basis of a predetermined rule;
- a power measuring step of measuring information about a power of the resultant signal under each combination of attenuation factors thus changed; and
- a mobile station location estimating step of estimating a location of the mobile station on the basis of change of the information about the power occurring with change in the combination of attenuation factors.

22. The method according to claim 21, wherein said attenuation factor changing step is to change the combination of attenuation factors so that an attenuation factor for a signal associated with one slave unit selected in order from the plurality of slave units becomes higher than an attenuation factor for a signal associated with any other slave unit, as the predetermined rule.

23. The method according to claim 22, wherein said mobile station location estimating step comprises:
- a minimum-correspondent slave unit identifying step of acquiring a minimum of the powers under the respective combinations of attenuation factors and identifying one slave unit selected in said attenuation factor changing step when said minimum is acquired; and
- a mobile station location acquiring step of acquiring a location of said identified slave unit as the location of the mobile station.

24. The method according to claim 23, the mobile communication system comprising a sub-slave unit coupled to one of the slave units and configured to radio-receive a signal from the mobile station and transmit the signal through said slave unit to the master unit,
wherein said mobile station location acquiring step is to acquire an average location of locations of a slave unit identified in the minimum-correspondent slave unit identifying step and a sub-slave unit coupled to said slave unit and acquire the average location as the location of the mobile station.

25. The method according to claim 21, wherein said attenuation factor changing step is to change the combination of attenuation factors so that an attenuation factor for a signal associated with one slave unit selected in order from the plurality of slave units becomes lower than an attenuation factor for a signal associated with any other slave unit, as the predetermined rule.

26. The method according to claim 25, wherein said mobile station location estimating step comprises:
- a maximum-correspondent slave unit identifying step of acquiring a maximum of the powers under the respective combinations of attenuation factors and identifying one slave unit selected in said attenuation factor changing step when said maximum is acquired; and
- a mobile station location acquiring step of acquiring a location of said identified slave unit as the location of the mobile station.

27. The method according to claim 26, the mobile communication system comprising a sub-slave unit coupled to one of the slave units and configured to radio-receive a signal from the mobile station and transmit the signal through said slave unit to the master unit,
wherein said mobile station location acquiring step is to acquire an average location of locations of a slave unit identified in the maximum-correspondent slave unit identifying step and a sub-slave unit coupled to said slave unit and acquire the average location as the location of the mobile station.

28. The method according to claim 21, comprising a location-specific power change storage step in which the change of the information about the power under each combination of attenuation factors changed is preliminarily stored in correspondence with locations of the mobile station in said area,
wherein the mobile station location estimating step is to compare the change of the information about the power measured in the power measuring step, with the change of the information about the power stored in the location-specific power change storage step and estimate the location of the mobile station in said area.

29. The method according to claim 21, wherein said attenuating step is to attenuate the signals received by the slave units, on a hardware basis.

30. The method according to claim 21, wherein said attenuating step is to attenuate the signals received by the slave units, on a software basis.

31. A method of estimating a location of a mobile station in a mobile communication system comprising a master unit configured to receive a signal from a base station and deliver a plurality of signals, and a plurality of slave units spaced from each other in a predetermined area and configured to receive the respective signals delivered from the master unit, radio-transmit the signals to a mobile station, and radio-receive signals from the mobile station, the method comprising:
- an attenuating step of attenuating each of the signals delivered in the master unit, by a combination of attenuation factors set for the respective slave units and transmitting the attenuated signals to the respective slave units;
- an attenuation factor changing step of changing the combination of attenuation factors on the basis of a predetermined rule;
- a power acquiring step of acquiring information about a power of a resultant signal of signals received from the plurality of slave units by the mobile station under each combination of attenuation factors thus changed, said information being transmitted from said mobile station; and
- a mobile station location estimating step of estimating a location of the mobile station on the basis of change of the information about the power occurring with change in the combination of attenuation factors.

32. The method according to claim 31, wherein said attenuation factor changing step is to change the combination of attenuation factors so that an attenuation factor for a signal transmitted to one slave unit selected in order from the plurality of slave units becomes higher than an attenuation factor for a signal transmitted to any other slave unit, as the predetermined rule.

33. The method according to claim 32, wherein said mobile station location estimating step comprises:
   a minimum-correspondent slave unit identifying step of acquiring a minimum of the powers under the respective combinations of attenuation factors and identifying one slave unit selected in said attenuation factor changing step when said minimum is acquired; and
   a mobile station location acquiring step of acquiring a location of said identified slave unit as the location of the mobile station.

34. The method according to claim 33, the mobile communication system comprising a sub-slave unit coupled to one of the slave units and configured to relay a signal transmitted from said slave unit and radio-transmit the signal to the mobile station,
   wherein the mobile station location acquiring step is to acquire an average location of locations of a slave unit identified in the minimum-correspondent slave unit identifying step and a sub-slave unit coupled to said slave unit and acquire the average location as the location of the mobile station.

35. The method according to claim 31, wherein said attenuation factor changing step is to change the combination of attenuation factors so that an attenuation factor for a signal transmitted to one slave unit selected in order from the plurality of slave units becomes lower than an attenuation factor for a signal transmitted to any other slave unit, as the predetermined rule.

36. The method according to claim 35, wherein said mobile station location estimating step comprises:
   a maximum-correspondent slave unit identifying step of acquiring a maximum of the powers under the respective combinations of attenuation factors and identifying one slave unit selected in said attenuation factor changing step when said maximum is acquired; and
   a mobile station location acquiring step of acquiring a location of said identified slave unit as the location of the mobile station.

37. The method according to claim 36, the mobile communication system comprising a sub-slave unit coupled to one of the slave units and configured to relay a signal transmitted from said slave unit and radio-transmit the signal to the mobile station,
   wherein said mobile station location acquiring step is to acquire an average location of locations of a slave unit identified in the maximum-correspondent slave unit identifying step and a sub-slave unit coupled to said slave unit and acquire the average location as the location of the mobile station.

38. The method according to claim 31, comprising a location-specific power change storage step in which the change of the information about the power under each combination of attenuation factors changed is preliminarily stored in correspondence with locations of the mobile station in said area,
   wherein said mobile station location estimating step is to compare the change of the information about the power acquired in the power acquiring step, with the change of the information about the power stored in the location-specific power change storage step and estimate the location of the mobile station in said area.

39. The method according to claim 31, wherein said attenuating step is to attenuate the signals delivered by the master unit, on a hardware basis.

40. The method according to claim 31, wherein said attenuating step is to attenuate the signals delivered by the master unit, on a software basis.

* * * * *